(12) United States Patent
Mizutani et al.

(10) Patent No.: US 11,286,893 B2
(45) Date of Patent: Mar. 29, 2022

(54) PHYSICAL QUANTITY MEASURING DEVICE, HUMIDITY DETECTOR ABNORMALITY DETECTION DEVICE, AND HUMIDITY DETECTOR ABNORMALITY DETECTION METHOD

(71) Applicant: DENSO CORPORATION, Kariya (JP)

(72) Inventors: Akitoshi Mizutani, Kariya (JP); Yasushi Goka, Kariya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 16/424,567

(22) Filed: May 29, 2019

(65) Prior Publication Data

US 2019/0277229 A1    Sep. 12, 2019

Related U.S. Application Data

(63) Continuation of application No. PCT/JP2017/036568, filed on Oct. 10, 2017.

(30) Foreign Application Priority Data

Dec. 2, 2016  (JP) .............. JP2016-235321

(51) Int. Cl.
| | |
|---|---|
| G01N 27/12 | (2006.01) |
| F02M 35/10 | (2006.01) |
| G01F 1/684 | (2006.01) |
| G01F 1/00 | (2022.01) |
| G01F 1/68 | (2006.01) |

(52) U.S. Cl.
CPC .. *F02M 35/10386* (2013.01); *F02M 35/1038* (2013.01); *F02M 35/10091* (2013.01); *F02M 35/10249* (2013.01); *F02M 35/10268* (2013.01); *F02M 35/10393* (2013.01); *G01F 1/00* (2013.01); *G01F 1/68* (2013.01); *G01F 1/684* (2013.01); *G01N 27/121* (2013.01)

(58) Field of Classification Search
CPC ....... F02M 35/10386; F02M 35/10393; G01N 27/121; G01N 27/048; G01N 27/223
See application file for complete search history.

(56) References Cited

U.S. PATENT DOCUMENTS

| | | |
|---|---|---|
| 2001/0048376 A1 | 12/2001 | Maeda et al. |
| 2005/0038567 A1 | 2/2005 | Maeda et al. |

(Continued)

FOREIGN PATENT DOCUMENTS

| | | |
|---|---|---|
| JP | 2006-105412 | 4/2006 |
| JP | 2007-113913 | 5/2007 |

(Continued)

*Primary Examiner* — Eric S. McCall
*Assistant Examiner* — Timothy P Graves
(74) *Attorney, Agent, or Firm* — Nixon & Vanderhye P.C.

(57) ABSTRACT

A physical quantity measuring device is configured to measure a physical quantity of a fluid. The physical quantity measuring device includes: at least two humidity detection parts configured to output a humidity signal corresponding to a humidity of the fluid; and an abnormality determination part configured to determine that an abnormality has occurred in the humidity detection parts in response to that a difference between the humidity signals obtained from the two humidity detection parts exceeds an abnormality determination threshold.

24 Claims, 55 Drawing Sheets

(56) References Cited

U.S. PATENT DOCUMENTS

| | | | |
|---|---|---|---|
| 2011/0072894 A1* | 3/2011 | Saito | G01F 15/02 |
| | | | 73/114.34 |
| 2013/0036806 A1 | 2/2013 | Kohno | |
| 2013/0069176 A1* | 3/2013 | Daamen | H01L 21/565 |
| | | | 257/414 |
| 2014/0369888 A1 | 12/2014 | Yoshida | |
| 2016/0356656 A1 | 12/2016 | Hoshika et al. | |
| 2017/0002821 A1* | 1/2017 | Claussen | F04D 29/701 |
| 2017/0037819 A1 | 2/2017 | Hosokawa et al. | |
| 2017/0205261 A1 | 7/2017 | Yogo et al. | |
| 2017/0248455 A1 | 8/2017 | Miki et al. | |

FOREIGN PATENT DOCUMENTS

| | | | |
|---|---|---|---|
| JP | 2009180587 A * | 8/2009 | |
| JP | 2010-151795 | 7/2010 | |
| JP | 2012154632 A * | 8/2012 | |
| JP | 2015-078637 | 4/2015 | |
| JP | 2015-183608 | 10/2015 | |
| JP | 2016-031341 | 3/2016 | |
| WO | 2015/068569 | 5/2015 | |

* cited by examiner

US 11,286,893 B2

PHYSICAL QUANTITY MEASURING DEVICE, HUMIDITY DETECTOR ABNORMALITY DETECTION DEVICE, AND HUMIDITY DETECTOR ABNORMALITY DETECTION METHOD

CROSS REFERENCE TO RELATED APPLICATION

The present application is a continuation application of International Patent Application No. PCT/JP2017/036568 filed on Oct. 10, 2017, which designated the U.S. and claims the benefit of priority from Japanese Patent Application No. 2016-235321 filed on Dec. 2, 2016. The entire disclosures of all of the above applications are incorporated herein by reference.

TECHNICAL FIELD

The present disclosure relates to a physical quantity measuring device, an abnormality detection device, and an abnormality detection method.

BACKGROUND

Conventionally, a physical quantity measuring device is employed to measure a physical quantity of fluid such as an air flow rate and a humidity of fluid.

SUMMARY

According to an aspect of the present disclosure, a physical quantity measuring device is configured to measure a physical quantity of a fluid. The physical quantity measuring device is configured to determine an abnormality based on a signal from a detection part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
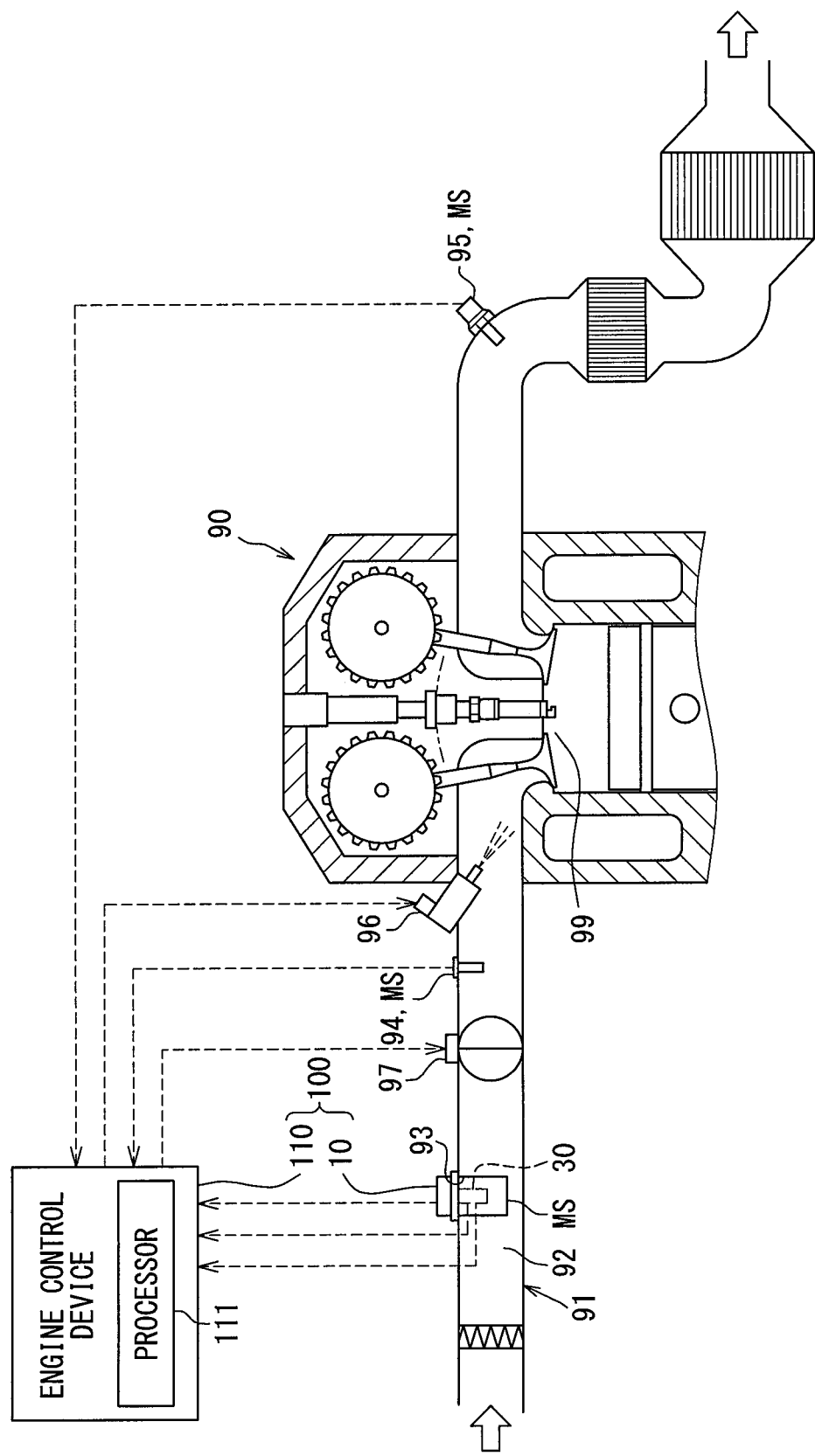
FIG. 1 is a diagram showing an overall image of a system including a measuring device according to a first embodiment and an internal-combustion engine to which the measuring device is applied.

Hereinafter, an example of the present disclosure will be described. According to one example, a physical quantity measuring device such as air flow rate measuring device has a humidity sensor configured to measure a humidity of an air. According to an assumable example, a humidity sensor of a physical quantity measuring device has a singular, i.e., only one sensing part to output a signal corresponding to the humidity of the air. In the assumable configuration, if an abnormality occurs in the humidity sensor due to, for example, a failure, deterioration, or the like, the abnormality of the humidity sensor can be hardly detected.

According to an example of the present disclosure, a physical quantity measuring device is configured to measure a physical quantity of a fluid. The physical quantity measuring device comprises at least two humidity detection parts configured to output a humidity signal corresponding to a humidity of the fluid. The physical quantity measuring device further comprises an abnormality determination part configured to determine that an abnormality has occurred in the humidity detection parts when a difference between the humidity signals obtained from the two humidity detection parts exceeds an abnormality determination threshold.

According to another example of the present disclosure, an abnormality detection device is for detecting an abnormality of a measuring component. The measuring component is configured to measure a physical quantity of a fluid. The abnormality detection device comprises a signal obtaining part configured to obtain humidity signals corresponding to a humidity of the fluid from at least two humidity detection parts included in the measuring component. The abnormality detection device further comprises an abnormality determination part configured to determine that an abnormality has occurred in the humidity detection parts when a difference between the humidity signals obtained from the two humidity detection parts exceeds an abnormality determination threshold.

According to another example of the present disclosure, an abnormality detection method is for detecting an abnormality in a measuring component. The measuring component is configured to obtain a physical quantity of a fluid. The method comprises obtaining humidity signals corresponding to a humidity of the fluid from at least two humidity detection parts included in the measuring component. The method further comprises determining that an abnormality has occurred in the humidity detection part when a difference between the humidity signals obtained from the two humidity detection parts exceeds an abnormality determination threshold.

According to the above example of the present disclosure, the humidity signals are obtained from at least two humidity detection parts. Therefore, the obtained humidity signals can be compared with each other. Thus, the abnormality occurring in the humidity detection part can be detected on determination that an abnormality occurs in response to that a difference between the two humidity signals exceeds an abnormality determination threshold.

In this way, the above examples of the present disclosure may enable to provide a physical quantity measuring device, an abnormality detection device, and an abnormality detection method, which are capable of detecting an abnormality.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to the other parts of the configuration. Further, not only the combinations of the configurations explicitly shown in the description of the respective embodiments, but also the configurations of the plurality of embodiments can be partially combined even if the combinations are not explicitly shown if there is no problem in the combination in particular. Unspecified combinations of the configurations described in the plurality of embodiments and the modification examples are also disclosed in the following description.

First Embodiment

A measuring device 100 according to a first embodiment of the present disclosure shown in FIG. 1 includes an air flow meter 10, an engine control device 110, and the like. The measuring device 100 can measure a physical quantity of an intake air as a fluid to be supplied to each cylinder including a combustion chamber 99, specifically, a flow rate, a humidity, and the like. The measurement result obtained by the measuring device 100 is used for controlling the opening degree of a throttle valve 97, the fuel injection amount of an injector 96, and the amount of EGR (Exhaust Gas Recirculation).

The air flow meter 10 is one of a large number of measuring components MS provided in an internal-combustion engine 90. In an intake system and an exhaust system of the internal-combustion engine 90, for example, an intake air temperature sensor 94, an air-fuel ratio sensor 95, a throttle opening degree sensor, and the like are provided as the measuring components MS in addition to the air flow meter 10. Further, the internal-combustion engine 90 is provided with a crank angle sensor or the like as a measuring component MS.

The air flow meter 10 has a humidity measuring function for measuring the humidity of the intake air in addition to a flow rate measuring function for measuring the flow rate of the intake air taken into each combustion chamber 99 of the internal-combustion engine 90. The air flow meter 10 measures not only the intake air flow rate but also the humidity of the intake air with high response and high accuracy, thereby making it possible to optimally control the EGR amount and contributing to a low fuel consumption and a low exhaust gas of the internal-combustion engine 90. The air flow meter 10 outputs a flow rate signal corresponding to the flow rate of the intake air flowing through an intake flow channel 92 of the internal-combustion engine 90 and a humidity signal corresponding to the humidity of the intake air flowing through the intake flow channel 92 to an engine control device 110 which is an external device. In the following description, an inlet side of an intake pipe 91 into which an air is introduced is defined as an upstream side of the intake flow channel 92, and the combustion chamber 99 side is defined as a downstream side of the intake flow channel 92.

Figure 2:
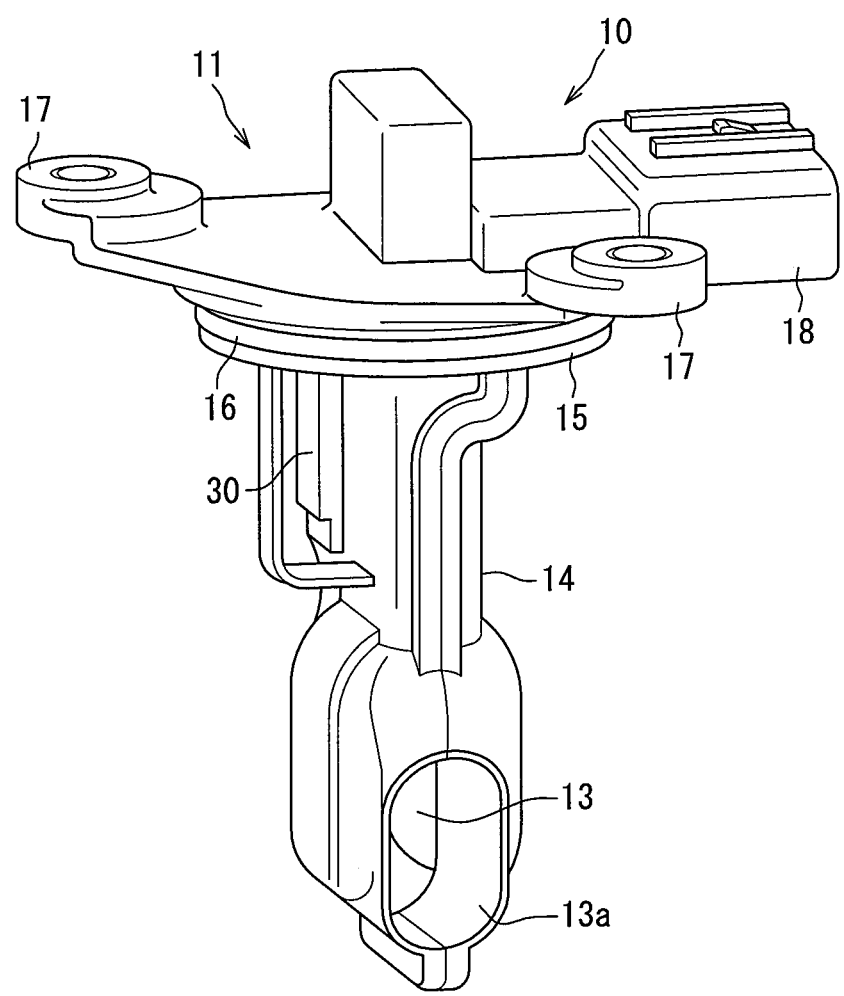
FIG. 2 is a perspective view showing a configuration of an air flow meter.
Figure 3:
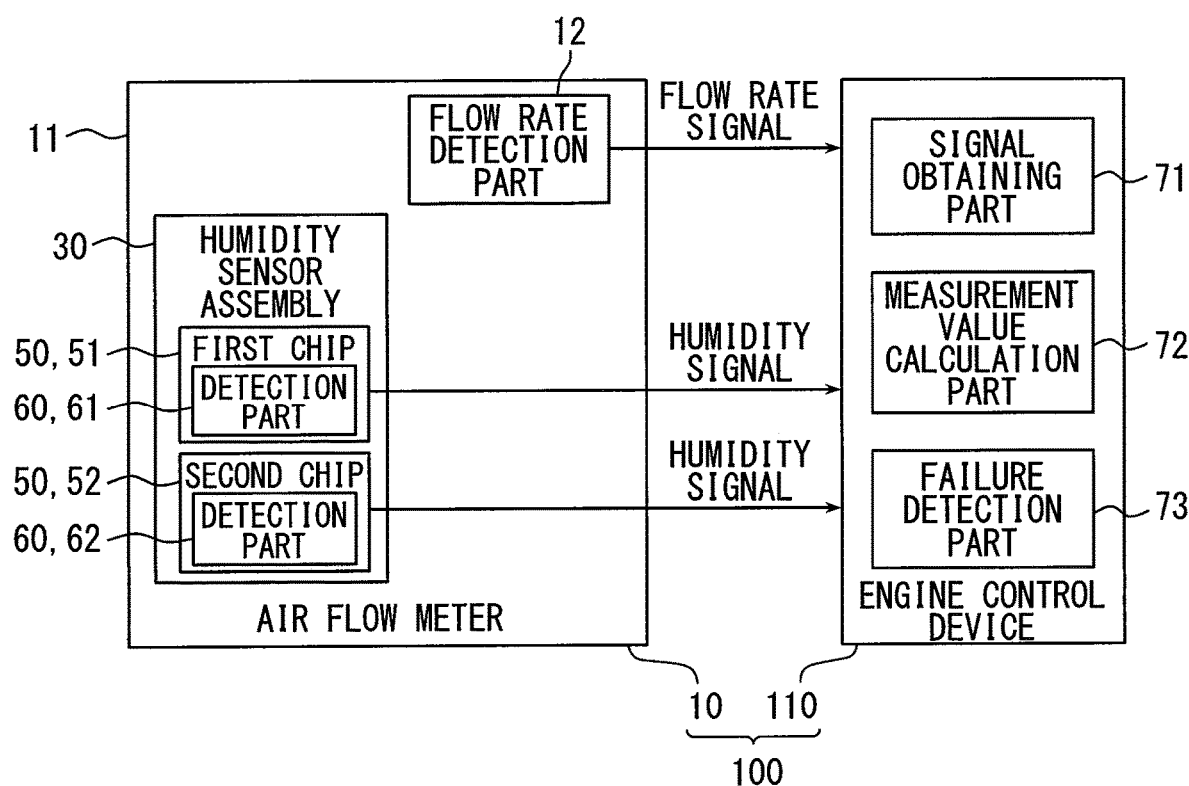
FIG. 3 is a block diagram showing an electrical configuration of the measuring device.

The air flow meter 10 shown in FIGS. 1 to 3 is detachably attached to an intake pipe 91 defining the intake flow channel 92. The air flow meter 10 is inserted into a sensor insertion hole 93 provided to penetrate a cylinder wall of the intake pipe 91, and at least a part of the air flow meter 10 is positioned in the intake flow channel 92. The air flow meter 10 includes a housing 11, a flow rate detection part 12, a humidity sensor assembly 30, and the like.

The housing 11 is made of, for example, a resin material or the like. With the attachment of the air flow meter 10 to the intake pipe 91, the housing 11 can bring the flow rate detection part 12 and the humidity sensor assembly 30 into contact with the intake air flowing through the intake flow channel 92. The housing 11 is provided with a bypass part 14, a fitting part 15, an O-ring 16, a fixing part 17, a connector part 18, and the like.

The bypass part 14 forms a bypass passage 13. The bypass passage 13 introduces a part of the intake air flowing through the intake flow channel 92 into the interior of the housing 11. An inlet opening 13a of the bypass passage 13 is directed to the upstream side of the intake flow channel 92. The bypass passage 13 is branched into multiple branches in the housing 11. Some of the branch passages are shaped to circulate inside the bypass part 14.

The fitting part 15 is a part that is fitted into the sensor insertion hole 93 through the O-ring 16. The O-ring 16 is a member for sealing the intake flow channel 92 and the outside of the intake pipe 91. The O-ring 16 is externally fitted to the fitting part 15, and is interposed between the fitting part 15 and the sensor insertion hole 93. The fixing part 17 is a part for fixing the air flow meter 10 to the intake pipe 91 in a state where a main part of the housing 11 is inserted into the sensor insertion hole 93.

The connector part 18 surrounds multiple terminals. A plug part is inserted into the connector part 18. The plug part is provided at an end of a connection line electrically connected directly or indirectly to the engine control device 110, and mates with the connector part 18. With attachment of the plug part to the connector part 18, the air flow meter 10 can output a flow rate signal and a humidity signal to the engine control device 110.

The flow rate detection part 12 is, for example, a thermal type flow rate sensor formed of a heating resistor. The flow rate detection part 12 is located in the bypass passage 13 that circulates inside the bypass part 14. With the attachment of the housing 11 to the intake pipe 91, an intake air flowing through the bypass passage 13 is supplied to the flow rate detection part 12. The flow rate detection part 12 is electrically connected to multiple terminals provided in the connector part 18. The flow rate detection part 12 outputs, as a flow rate signal, a sensor signal corresponding to a flow rate of the air flowing through the bypass passage 13, which is a sensor signal corresponding to an intake flow rate. The flow rate detection part 12 is not limited to the thermal type flow rate sensor, and may be a movable flap type flow rate sensor, a Kalman vortex type flow rate sensor, or the like.

The humidity sensor assembly 30 is installed on a side surface of the bypass part 14 of the housing 11. The humidity sensor assembly 30 includes multiple (two) humidity detection parts 60. The humidity sensor assembly 30 according to the first embodiment is provided with two humidity sensor chips 50 each having one humidity detection part 60. In other words, the two humidity detection parts 60 are provided in one humidity sensor assembly 30. Each of the humidity detection parts 60 is located in the intake flow channel 92 by attaching the housing 11 to the intake pipe 91.

The humidity sensor assembly 30 is electrically connected to multiple terminals provided in the connector part 18. The humidity sensor assembly 30 outputs a sensor signal corresponding to the humidity of the intake air flowing through the intake flow channel 92 as a humidity signal. The humidity signal is a signal transmitted and received according to a communication method such as I2C (Inter-Integrated Circuit, registered trademark). The humidity signal is not limited to the I2C communication method, and may be an analog signal such as a SENT (Single Edge Nibble Transmission) communication method or a simple potential.

Figure 4:
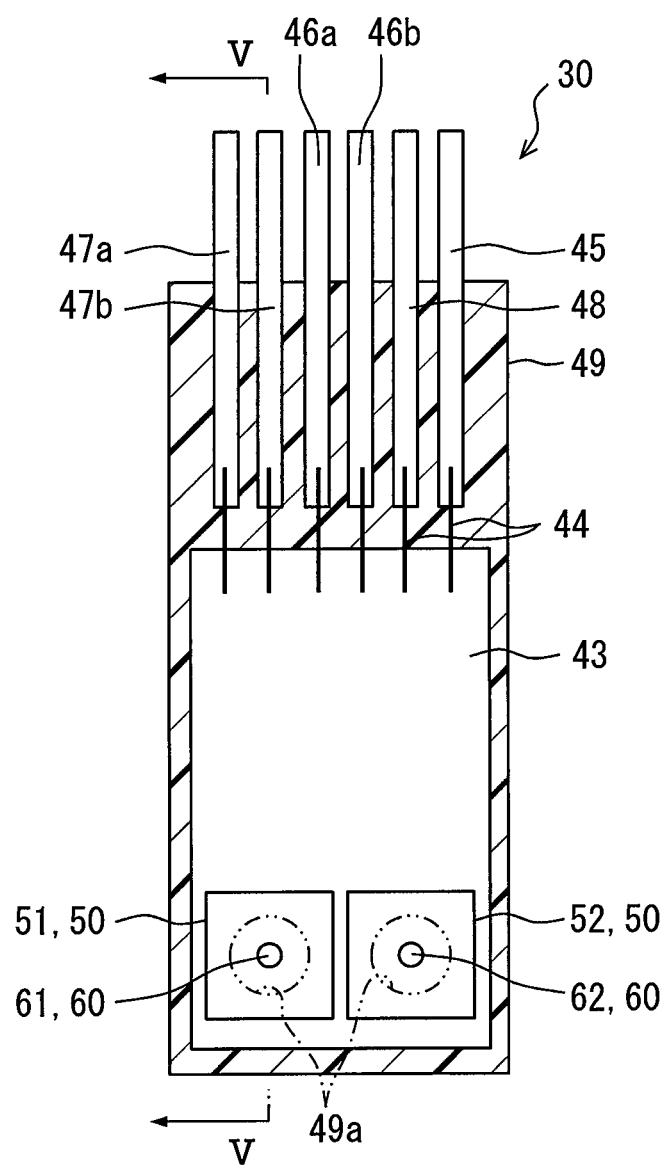
FIG. 4 is a front view showing a configuration of a humidity sensor assembly, and is a cross-sectional view taken along a line IV-IV of FIG. 5.
Figure 5:
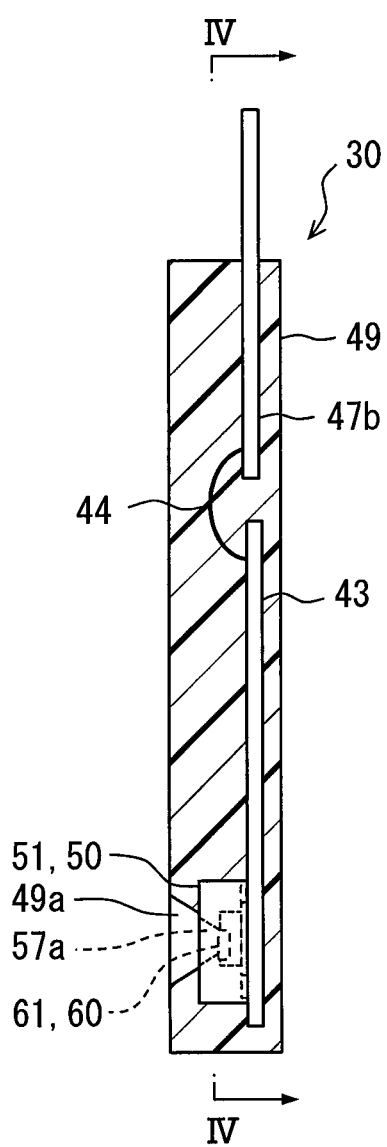
FIG. 5 is a cross-sectional view taken along a line V-V of FIG. 4.

The humidity sensor assembly 30 shown in FIGS. 3 to 5 includes a sensor circuit board 43, multiple (two) humidity sensor chips 50, multiple (six) terminals, a sensor housing 49, and the like. The sensor circuit board 43 has a configuration in which a wiring made of a conductive material is formed on an insulating base material. The sensor circuit board 43 is formed in a rectangular plate-shape as a whole. The sensor circuit board 43 is embedded in the sensor housing 49.

The humidity sensor assembly 30 is provided with a first sensor chip 51 and a second sensor chip 52 as the multiple humidity sensor chips 50. The first sensor chip 51 and the second sensor chip 52 have substantially the same configuration. The humidity sensor chip 50 is formed in the shape of a flat square prism as a whole. Each humidity sensor chip 50 is provided with a humidity detection part 60. In the following description, the humidity detection part 60 of the first sensor chip 51 is referred to as a first humidity detection part 61, and the humidity detection part 60 of the second sensor chip 52 is referred to as a second humidity detection part 62.

The first sensor chip 51 and the sensor chip 52 are both mounted on one mounting surface of the sensor circuit board 43. The first sensor chip 51 and the second sensor chip 52 are fixed at positions closer to one edge than a center in a longitudinal direction on the mounting surface of the sensor circuit board 43. The positions of the first humidity detection part 61 and the second humidity detection part 62 in the longitudinal direction are aligned with each other by placement in which the two sensor chips 51 and 52 are aligned in a short direction of the mounting surface. In addition, since the sensor chips 51 and 52 are located on the same mounting surface, the first humidity detection part 61 and the second humidity detection part 62 are oriented in the same direction.

Figure 6:
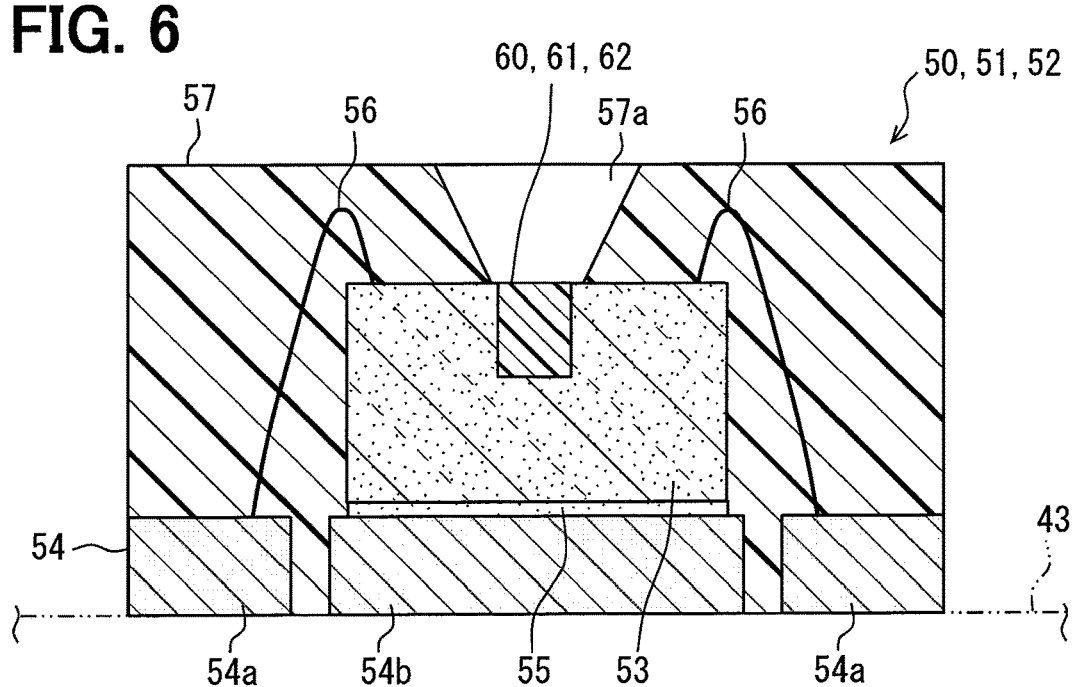
FIG. 6 is a cross-sectional view of a humidity sensor chip.

As shown in FIG. 6, each humidity sensor chip 50 includes a chip substrate 53, an electrode plate 54, a bonding material 55, a chip wire 56, and a sealing part 57.

The chip substrate 53 is made of a semiconductor material such as silicon, and is formed in a rectangular prism shape which is flat as a whole. A humidity detection part 60 is formed at the center of a top face of the chip substrate 53. The humidity detection part 60 is a humidity sensor that measures a relative humidity of air. The humidity detection part 60 is, for example, a capacitive type humidity sensor that measures a capacitance of a moisture sensitive material that absorbs and dehumidifies a moisture contained in air using a pair of electrodes that sandwich the moisture sensitive material. As the humidity detection part 60, a resistive humidity sensor or the like can be employed.

The electrode plate 54 is a thin plate-shape member made of a conductive material. The electrode plate 54 forms a bottom surface of the humidity sensor chip 50. A chip electrode 54a, a die pad 54b, and the like are formed on the electrode plate 54. The chip electrode 54a is electrically connected to the wiring provided on the sensor circuit board 43 by mounting the humidity sensor chip 50 on the sensor circuit board 43.

The bonding material 55 bonds a bottom surface of the chip substrate 53 to the die pad 54b of the electrode plate 54. The chip wire 56 is formed of a wire-like member made of a conductive material. The chip wire 56 electrically connects each electrode of the humidity detection part 60 provided on the chip substrate 53 to the chip electrode 54a.

The sealing part 57 is in close contact with the electrode plate 54, and covers the chip substrate 53, the chip wire 56, and the like. A detection hole 57a is provided in the sealing part 57. The detection hole 57a is a partially conical through hole provided at a position overlapping with the humidity detection part 60 formed on the top face of the chip substrate 53. The detection hole 57a exposes the humidity detection part 60 from the sealing part 57.

As shown in FIGS. 4 and 5, the multiple terminals are formed of a sheet member made of a metal material extending in a belt shape. One end of each terminal is exposed from the sensor housing 49. Each terminal is electrically connected to a wiring provided on the sensor circuit board 43 through a connection wire 44 made of metal.

The multiple terminals include a power supply terminal 45, a set of first output terminals 46a, 46b, a set of second output terminals 47a, 47b, and a ground terminal 48. The power supply terminal 45 supplies a supply voltage necessary for detecting the humidity to the first sensor chip 51 and the second sensor chip 52. Each of the first output terminals 46a and 46b indicates the case of the I2C communication method described above, and a humidity signal from the first humidity detection part 61 is supplied from the first sensor chip 51. Each of the second output terminals 47a and 47b indicates the case of the 120 communication method described above, and the humidity signal from the second humidity detection part 62 is supplied from the second sensor chip 52. The ground terminal 48 supplies a ground voltage to the first sensor chip 51 and the second sensor chip 52.

The sensor housing 49 is made of a resin material in a rectangular thick plate-shape. The sensor housing 49 covers the sensor circuit board 43, the terminals, and the sensor chips 51 and 52. The sensor housing 49 exposes one end of each terminal and the first humidity detection part 61 and the second humidity detection part 62 to the outside of the sensor housing 49. Two detection holes 49a are provided in the sensor housing 49. Each detection hole 49a is provided at a position overlapping with each detection hole 57a of each of the sensor chips 51 and 52. With the configuration described above, the first humidity detection part 61 and the second humidity detection part 62 can come in contact with the air in the intake flow channel 92 (refer to FIG. 1) through the respective detection holes 57a and 49a.

The engine control device 110 shown in FIGS. 1 and 3 is a calculation processing circuit including a processor 111, a storage medium such as a RAM, a ROM, and a flash memory, a microcomputer including an input and output part, a power supply circuit, and the like. In addition to the flow rate signal output from the air flow meter 10 and the humidity signal of two systems, sensor signals output from a large number of vehicle-mounted sensors are input to the engine control device 110.

The storage medium of the engine control device 110 stores an abnormality detection program for causing the engine control device 110 to function as an abnormality detection device for detecting an abnormality of the humidity sensor assembly 30. The storage medium is a non-transitory tangible storage medium and is not limited to the ROM and the storage medium described above. According to the execution of the abnormality detection program by the processor 111, the engine control device 110 includes functional blocks such as a signal obtaining part 71, a measurement value calculation part 72, and a failure detection part 73.

The signal obtaining part 71 obtains various sensor signals used for control of the internal-combustion engine 90 from the measuring component MS attached to the internal-combustion engine 90, a vehicle-mounted sensor mounted on the vehicle, and the like. The signal obtaining part 71 obtains humidity signals of two systems corresponding to the humidity of the intake air from at least the first humidity detection part 61 and the second humidity detection part 62. In addition, the signal obtaining part 71 can obtain sensor signals from a vehicle speed sensor, an outside air temperature sensor, an atmospheric pressure sensor, and the like, in addition to the sensor signals from the measuring component MS described above.

The measurement value calculation part 72 calculates the measurement result of a physical quantity used for controlling the throttle opening degree, the fuel injection amount, the EGR amount, and the like based on the flow rate signal, each humidity signal, each sensor signal, and the like obtained by the signal obtaining part 71. The operation of the internal-combustion engine 90 is controlled based on the numerical value calculated by the measurement value calculation part 72.

The failure detection part 73 detects a failure occurring in at least one of the two humidity detection parts 60 based on a comparison of the outputs of the humidity sensors of two systems as one of the abnormality determinations of the measuring component MS. The failure detection part 73 determines whether or not an output difference between the humidity signals of two systems obtained from the first humidity detection part 61 and the second humidity detection part 62 exceeds an abnormality determination threshold Th. When a deviation state in which the output difference between the humidity signals exceeds the abnormality determination threshold Th continues beyond an abnormality determination time RT, the failure detection part 73 performs a failure determination indicating that the first humidity detection part 61 or the second humidity detection part 62 is in an abnormal state. The abnormality determination threshold Th and the abnormality determination time RT are set in advance, for example, on the basis of the output characteristics of each humidity detection part 60, specifically, a variation in the responsiveness of the output, and the like.

Figure 7:
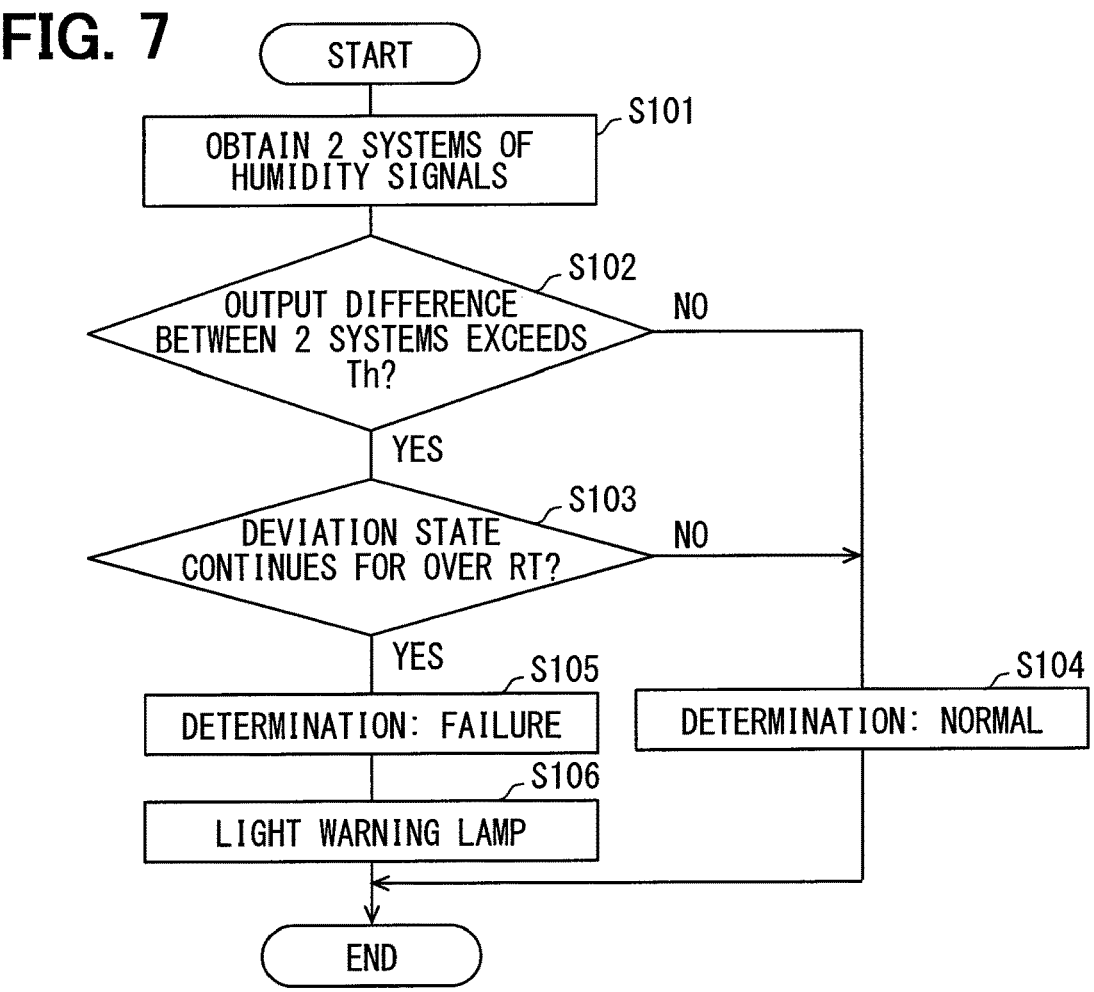
FIG. 7 is a flowchart showing the details of an abnormality detection process.

Next, an abnormality detection method in which the engine control device 110 described above detects an abnormality of each humidity detection part 60 will be described in detail with reference to FIGS. 7 and 8, and with reference to FIGS. 1 and 3. An abnormality detection process shown in FIG. 7 is started by the engine control device 110 based on the condition that the ignition of the internal-combustion engine 90 is turned on. The abnormality detection process of FIG. 7 may be repeatedly performed at predetermined time intervals during the operation of the internal-combustion engine 90, or may be performed only once at the start of the operation.

Figure 8:
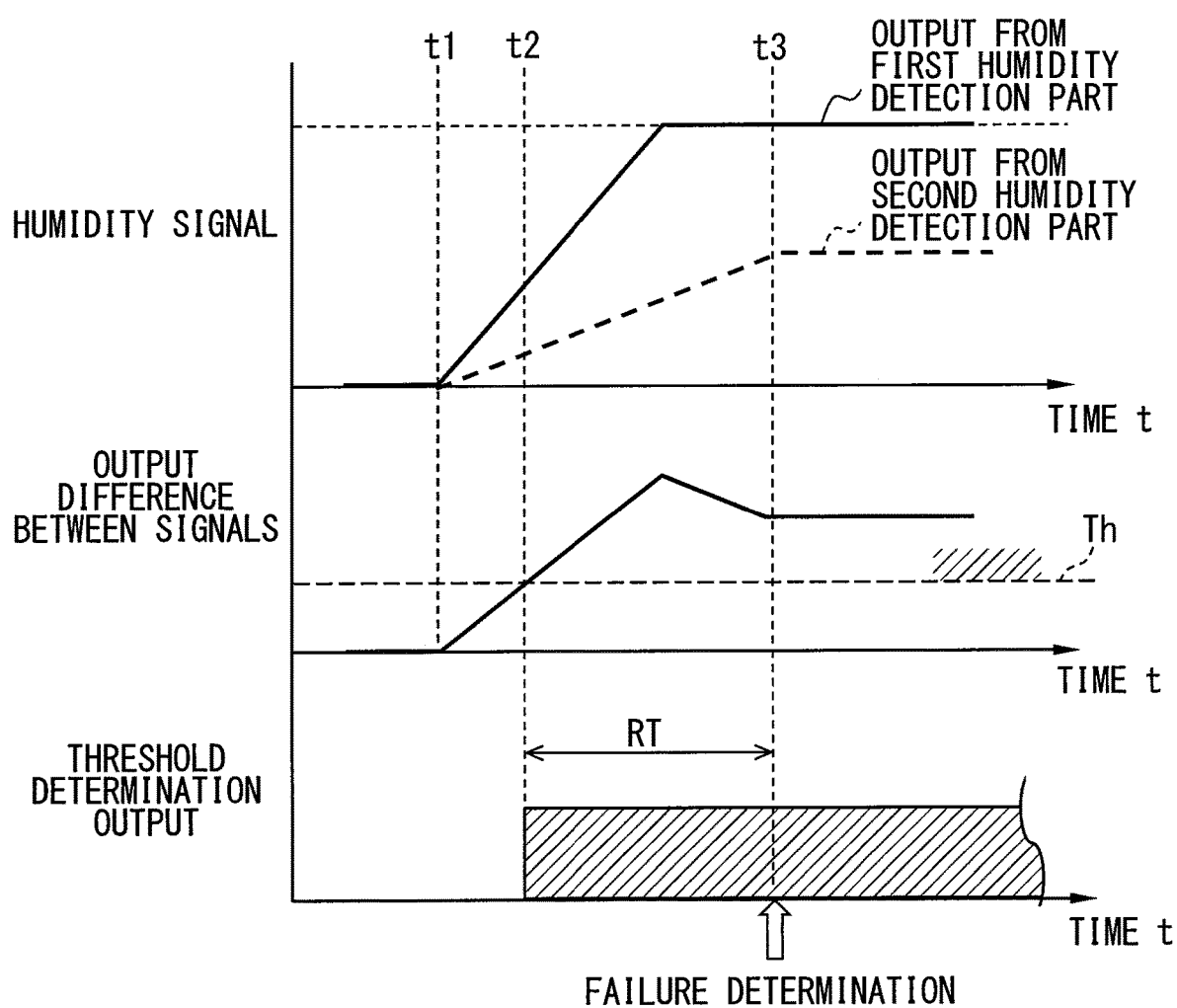
FIG. 8 is a time chart showing the details of the abnormality detection process.

In S101, a process of obtaining two the humidity signals of two systems output from the humidity sensor assembly 30 is started, and the process proceeds to S102 (refer to a time t1 in FIG. 8). Based on the processing in S101, the signal obtaining part 71 obtains the outputs of the first humidity detection part 61 and the second humidity detection part 62, and the failure detection part 73 calculates the output differences between the humidity signals. The output difference may be calculated either when the output of the second humidity detection part 62 is subtracted from the output of the first humidity detection part 61 or when the output of the first humidity detection part 61 is subtracted from the output of the second humidity detection part 62. When a reference numeral of the output difference becomes negative, an absolute value of the output difference may be used as a final output difference. The calculations by the signal obtaining part 71 and the measurement value calculation part 72 are continued until at least the abnormality detection process is completed.

In S102, it is determined whether or not the output difference between the humidity signals exceed an abnormality determination threshold Th and the outputs of the first humidity detection part 61 and the second humidity detection part 62 are deviated from each other. In S102, when a specified test time has elapsed while the output difference is less than the abnormality determination threshold Th, the process proceeds to S104. In S104, it is determined that the two humidity detection parts 60 are normal, and the abnormality detection process is terminated.

On the other hand, when it is determined in S102 that the output difference exceeds the abnormality determination threshold Th (refer to a time t2 in FIG. 8), the process proceeds to S103. In S103, it is determined whether or not the deviation state of the output difference continues beyond the abnormality determination time RT. In S103, when the deviation state is eliminated before the continuation of the deviation state exceeds the abnormality determination time RT, the normal determination is performed in S104, and the abnormality detection process is terminated. On the other hand, when it is determined in S103 that the deviation state continues beyond the abnormality determination time RT (refer to a time t3 in FIG. 8), the process proceeds to S105.

In S105, a failure determination indicating that at least one of the first humidity detection part 61 and the second humidity detection part 62 is abnormal is performed, and the process proceeds to S106. In order to notify a user of the vehicle of a failure determination, S106 performs a process of outputting a signal for instructing a warning lamp to light, and completes the abnormality detection process. When the signal output by S106 is obtained by the control unit of a combination meter, the warning lamp of the combination meter is lighted.

In the measuring device 100 according to the first embodiment described so far, the humidity signals of two systems are obtained with the use of the two humidity detection parts 60, and the obtained humidity signals can be compared with each other. Therefore, if it is determined that an abnormality occurs when the difference between the two humidity signals exceeds the abnormality determination threshold Th, the measuring device 100 can detect an abnormality such as a failure occurring in the humidity detection part 60.

In addition, the failure detection part 73 according to the first embodiment performs a failure determination when the deviation state exceeding the abnormality determination threshold Th continues for the abnormality determination time RT or longer. As described above, with the use of the abnormality determination time RT, erroneous determination caused by mixing of noise or the like into the humidity signal is inhibited.

According to the first embodiment, the first humidity detection part 61 and the second humidity detection part 62 are provided in one humidity sensor assembly 30. Therefore, even if two humidity detection parts 60 are provided, an increase in a space for installing each humidity detection part 60 can be reduced.

Further, in the humidity sensor assembly 30 according to the first embodiment, two humidity sensor chips 50 are provided on one sensor circuit board 43. As described above, according to the sharing of the circuit board on which the humidity sensor chips 50 are mounted, even the humidity sensor assembly 30 having the multiple humidity detection parts 60 can reduce an increase in size.

In addition, as in the first embodiment, if the engine control device 110, which is an external device of the air flow meter 10, is the measuring device 100 used as the calculation processing circuit, the air flow meter 10 may not have a calculation processing configuration for determining abnormality such as a failure. Therefore, the measuring device 100 in which the humidity signals of two systems are input to the engine control device 110 can perform the abnormality determination while avoiding the complication of the hardware configuration of the air flow meter 10 and the like.

According to the first embodiment, the first humidity detection part 61 and the second humidity detection part 62 are oriented in the same direction. Therefore, each humidity detection part 60 can grasp the flow of air coming from the same direction. As a result, variations in the responsiveness of the two humidity detection parts 60 can be reduced, and therefore, the failure detection part 73 can perform failure determination with high accuracy.

According to the first embodiment, the failure detection part 73 corresponds to an abnormality determination part, and the measuring device 100 corresponds to a physical quantity measuring device. The processor 111 corresponds to a processing unit, and the engine control device 110 corresponds to a calculation processing circuit and an abnormality detection device.

Second Embodiment

Figure 9:
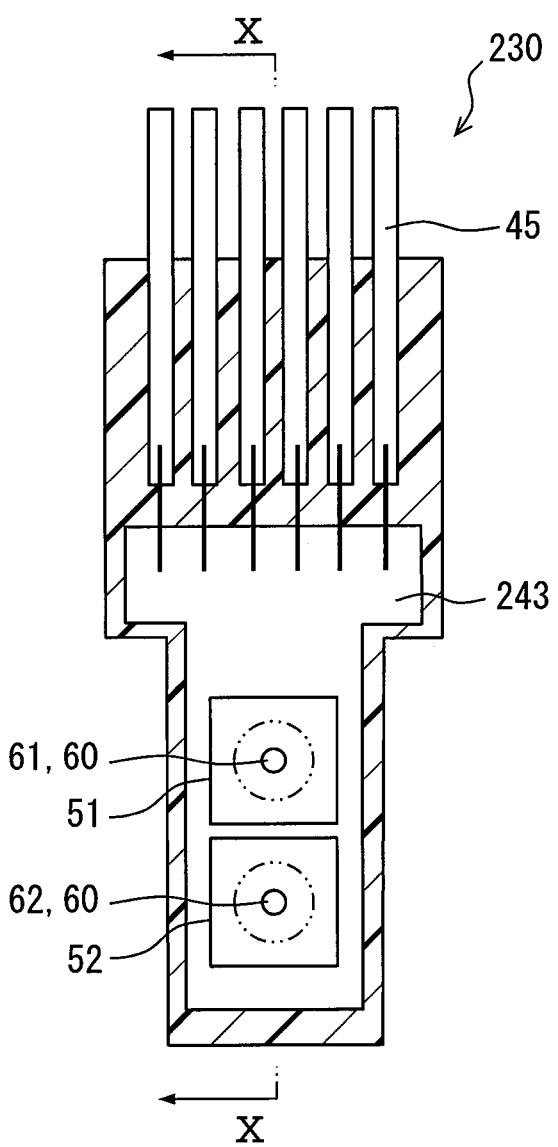
FIG. 9 is a front view showing a configuration of a humidity sensor assembly according to a second embodiment, and is a cross-sectional view taken along a line IX-IX of FIG. 10.
Figure 10:
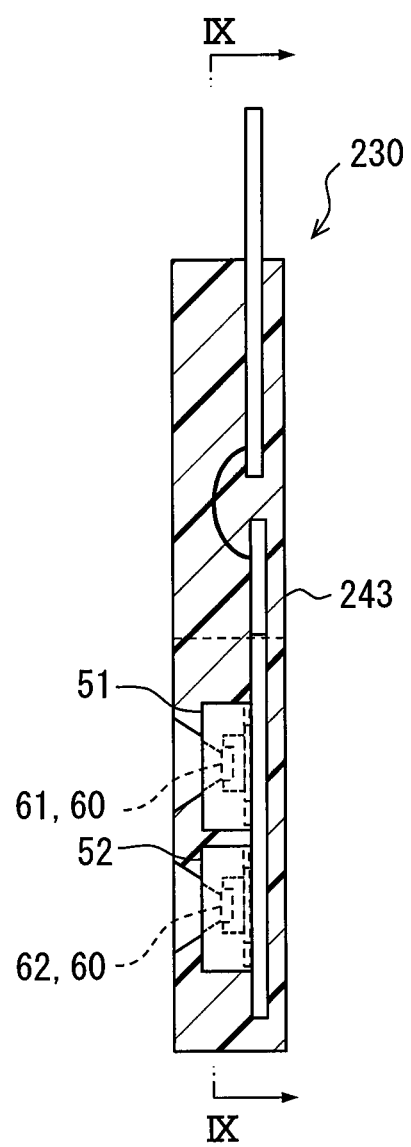
FIG. 10 is a cross-sectional view taken along a line X-X of FIG. 9.

The second embodiment of the present disclosure shown in FIGS. 9 to 12 is a modification of the first embodiment. In a humidity sensor assembly 230 according to the second embodiment, as shown in FIGS. 9 and 10, placement of a first sensor chip 51 and a second sensor chip 52 on a sensor circuit board 243 is different from that of the first embodiment. The first sensor chip 51 and the second sensor chip 52 are aligned along a longitudinal direction of the sensor circuit board 243. The positions of the first sensor chip 51 and the second sensor chip 52 in a short direction are aligned with each other. With the placement described above, both of the first humidity detection part 61 and the second humidity detection part 62 are located on a center line of the sensor circuit board 243 along the longitudinal direction. In the humidity sensor assembly 230, the humidity detection parts 60 are oriented in the same direction.

Figure 11:
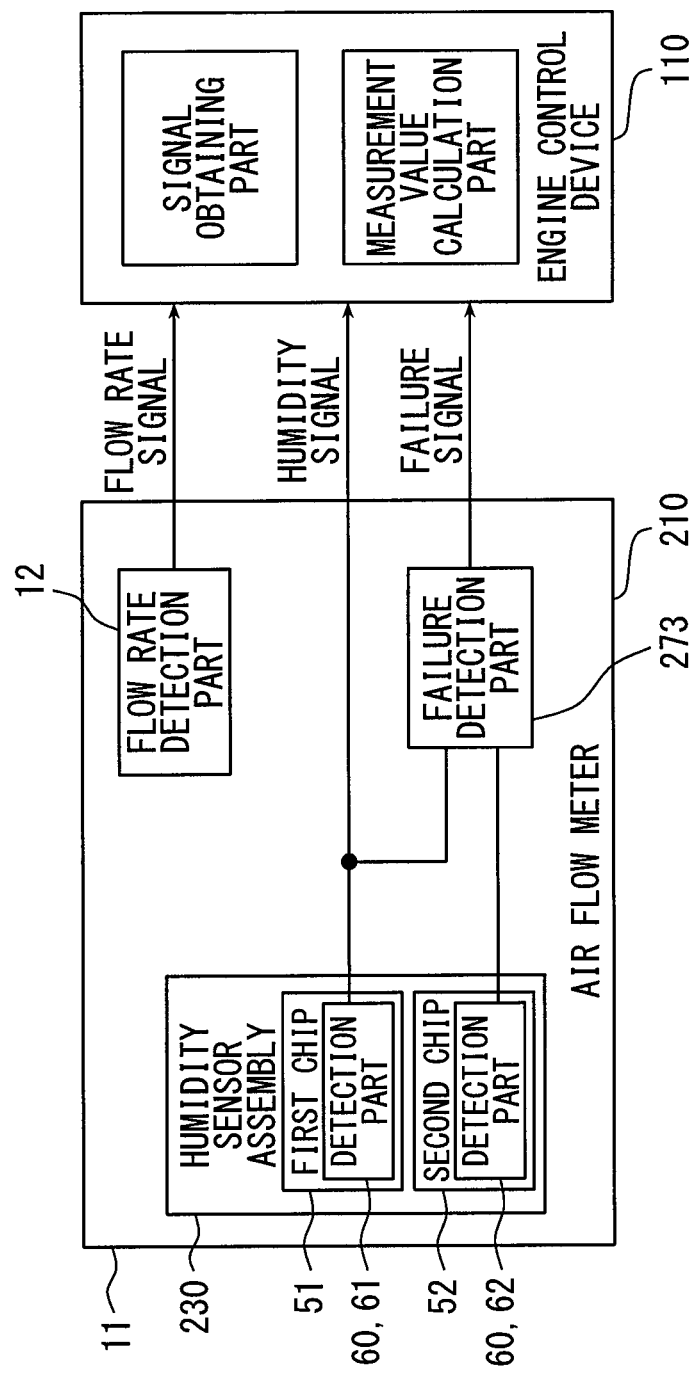
FIG. 11 is a block diagram showing an electrical configuration of an air flow meter according to a second embodiment.

As shown in FIG. 11, an air flow meter 210 according to the second embodiment includes a failure detection part 273. The failure detection part 273 is an electronic circuit accommodated in the housing 11 (refer to also FIG. 2) together with a flow rate detection part 12 and the like. Similar to the first sensor chip 51 and the second sensor chip 52, an actuation electric power is supplied to the failure detection part 273 through a power supply terminal 45 (refer to FIG. 9). The failure detection part 273 detects a failure occurring in at least one of the two humidity detection parts 60 by comparing humidity signals of two systems with each other, similarly to the failure detection part 73 (refer to FIG. 3) according to the first embodiment.

Figure 12:
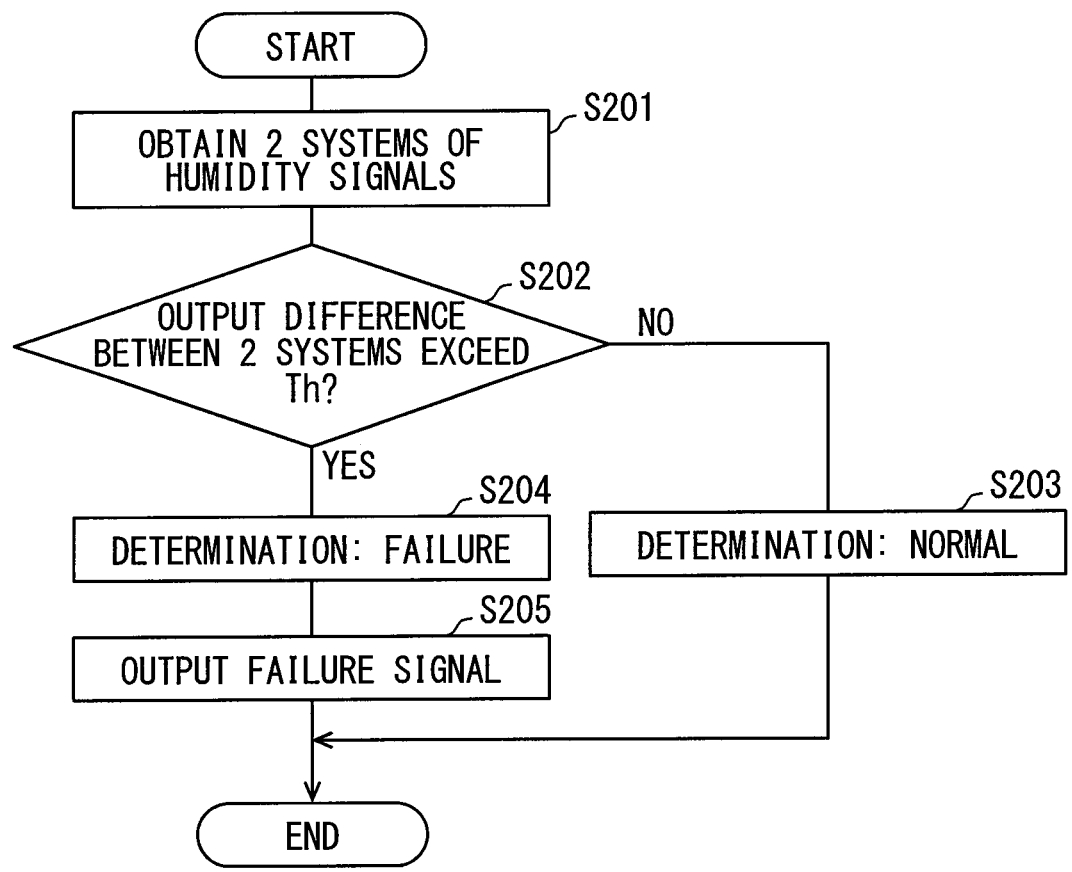
FIG. 12 is a flowchart showing details of an abnormality detection process according to the second embodiment.
Figure 13:
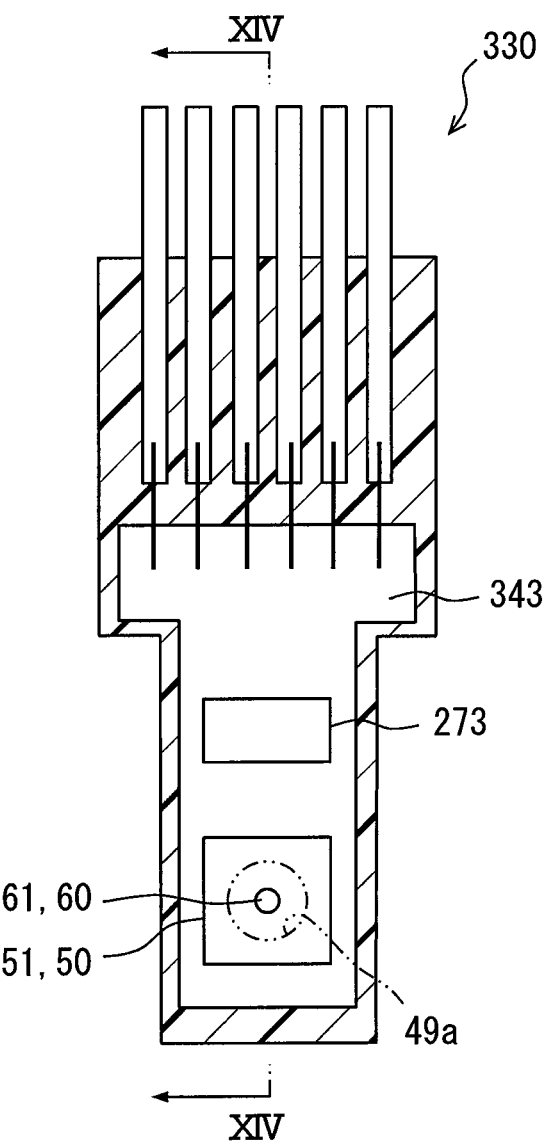
FIG. 13 is a front view showing a configuration of a humidity sensor assembly according to a third embodiment, and is a cross-sectional view taken along a line XIII-XIII of FIG. 14.
Figure 14:
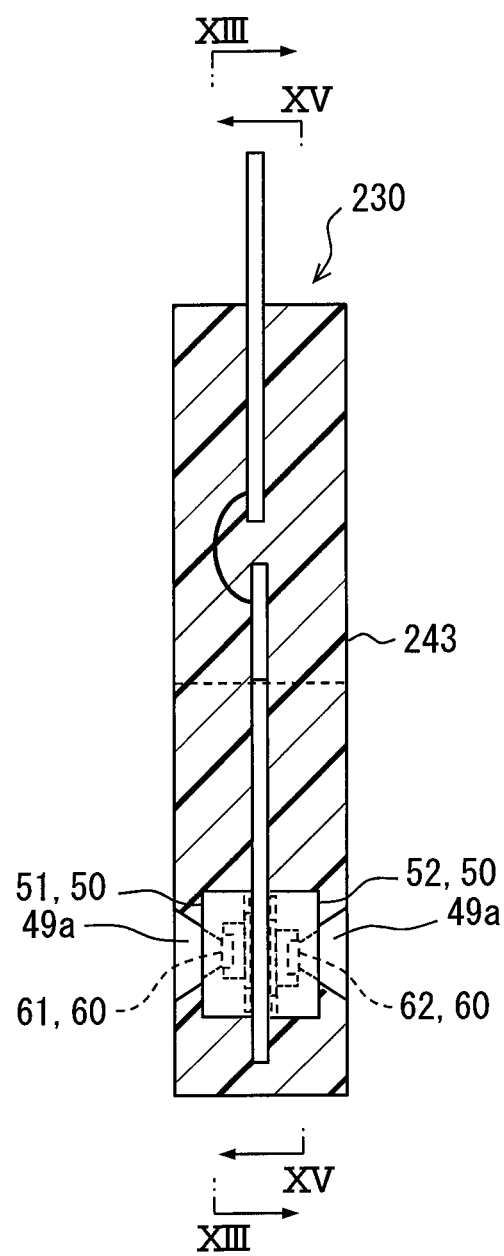
FIG. 14 is a cross-sectional view taken along a line XIV-XIV of FIG. 13.
Figure 15:
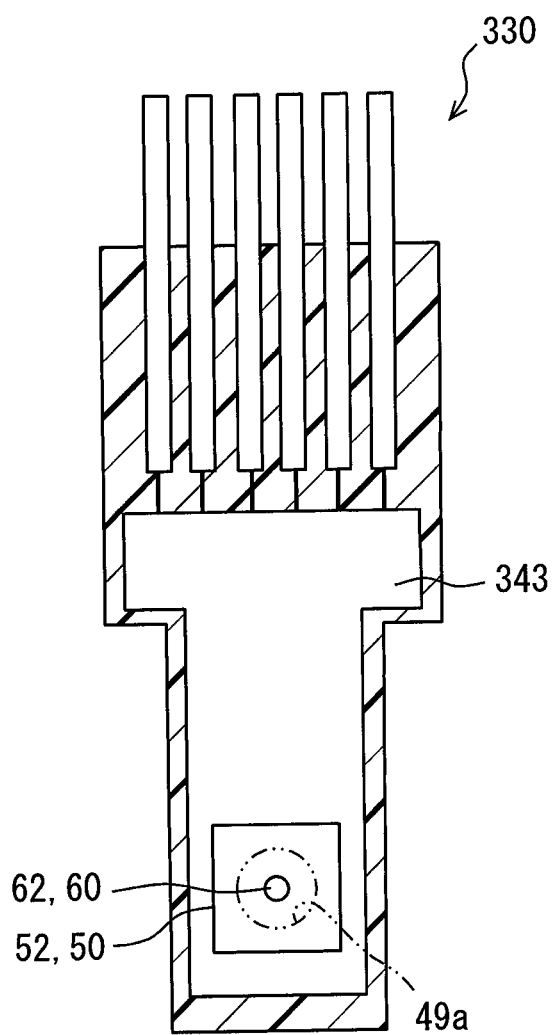
FIG. 15 is a rear view of the humidity sensor assembly and is a cross-sectional view taken along a line XV-XV of FIG. 14.
Figure 16:
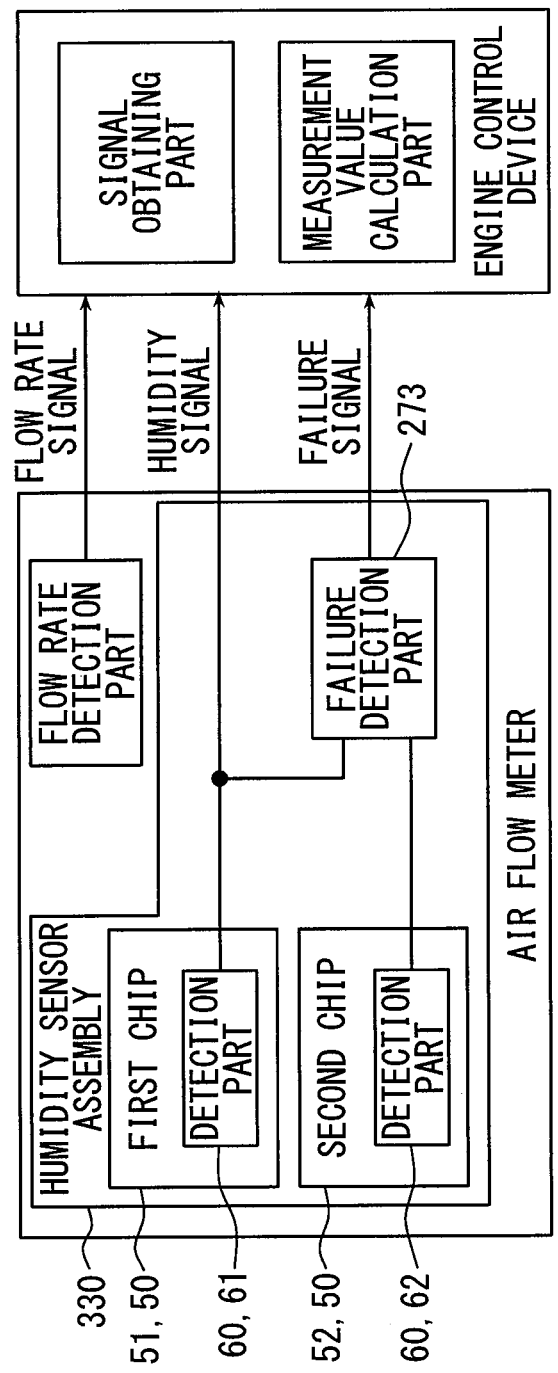
FIG. 16 is a block diagram showing an electrical configuration of an air flow meter according to a third embodiment.

Details of the abnormality detection process of each humidity detection part 60 by the failure detection part 273 described above will be described with reference to FIG. 11 based on FIG. 12. The abnormality detection process shown in FIG. 12 is started based on a start of the power supply to each element of the air flow meter 210 including the failure detection part 273, and is repeatedly started at a predetermined cycle until the power supply is terminated.

In S201 and S202, similarly to S101 and S102 of the first embodiment, obtaining the humidity signals of two systems and calculating the output difference between those humidity signals are started, and it is determined whether or not the calculated output difference is in a deviation state exceeding an abnormality determination threshold Th. In S202, when the output difference is less than the abnormality determination threshold Th, S203 determines that the two humidity detection parts 60 are normal, and ends the abnormality detection process. On the other hand, when it is determined in S202 that the output difference exceeds the abnormality determination threshold Th (refer to FIG. 8), the processing proceeds to S204.

In S204, a failure determination is made which indicates that at least one of the first humidity detection part 61 and the second humidity detection part 62 is abnormal, and the process proceeds to S205. S205 starts the process of outputting the failure signals to the engine control device 110, and ends the abnormality detection process. The engine control device 110 performs a process such as lighting the warning lamp of the combination meter based on the failure signals output by S205.

Also in the second embodiment described so far, the same effects as those in the first embodiment are achieved, which makes it possible to detect an abnormality such as a failure occurring in the humidity detection part 60. In addition, according to the second embodiment, since the failure detection part 273 is provided in the air flow meter 210, a failure of the humidity detection part 60 can be detected with a reduction in an increase in the calculation load of the engine control device 110. According to the second embodiment, the air flow meter 210 corresponds to a physical quantity measuring device, and the failure detection part 273 corresponds to an abnormality determination part.

Third Embodiment

A third embodiment of the present disclosure shown in FIGS. 13 to 16 is a modification of the second embodiment. In the humidity sensor assembly 330 according to the third embodiment, a failure detection part 273 is formed on a sensor circuit board 343. The failure detection part 273 is an electronic circuit having substantially the same function as that of the second embodiment. In addition, in the humidity sensor assembly 330, humidity sensor chips 50 are mounted one by one on both sides of the sensor circuit board 343.

A first sensor chip 51 and a second sensor chip 52 are fixed to an end of the sensor circuit board 343 in a plane-symmetrical manner with the sensor circuit board 343 interposed between the first sensor chip 51 and the second sensor chip 52. With the placement in which the two humidity sensor chips 50 overlap with each other in the thickness direction of the sensor circuit board 343, the respective positions of the two humidity detection parts 60 are also placed at positions overlapping with each other in a plate thickness direction. On the other hand, a first humidity detection part 61 and a second humidity detection part 62 are oriented in opposite directions to each other. A sensor housing 349 is provided with a detection hole 49a at a position overlapping with each of the first humidity detection part 61 and the second humidity detection part 62.

Also in the third embodiment described so far, the same effects as those in the second embodiment are achieved, which makes it possible to detect an abnormality such as a failure occurring in the humidity detection part 60. In addition, according to the third embodiment, the two humidity detection parts 60 are oriented in different directions and in opposite directions. As a result, since a flow of an intake air contacting each humidity detection part 60 is different from each other, different aging changes may occur in the respective humidity detection parts 60. According to the configuration described above, since the degree of deterioration of the first humidity detection part 61 and the second humidity detection part 62 is different from each other, a failure detection part 273 (refer to FIG. 11) can easily detect an abnormality occurring in each humidity signal, and thus can accurately detect the failure of each humidity detection part 60. In the third embodiment, an air flow meter including the humidity sensor assembly 330 corresponds to a physical quantity measuring device.

Fourth Embodiment

Figure 17:
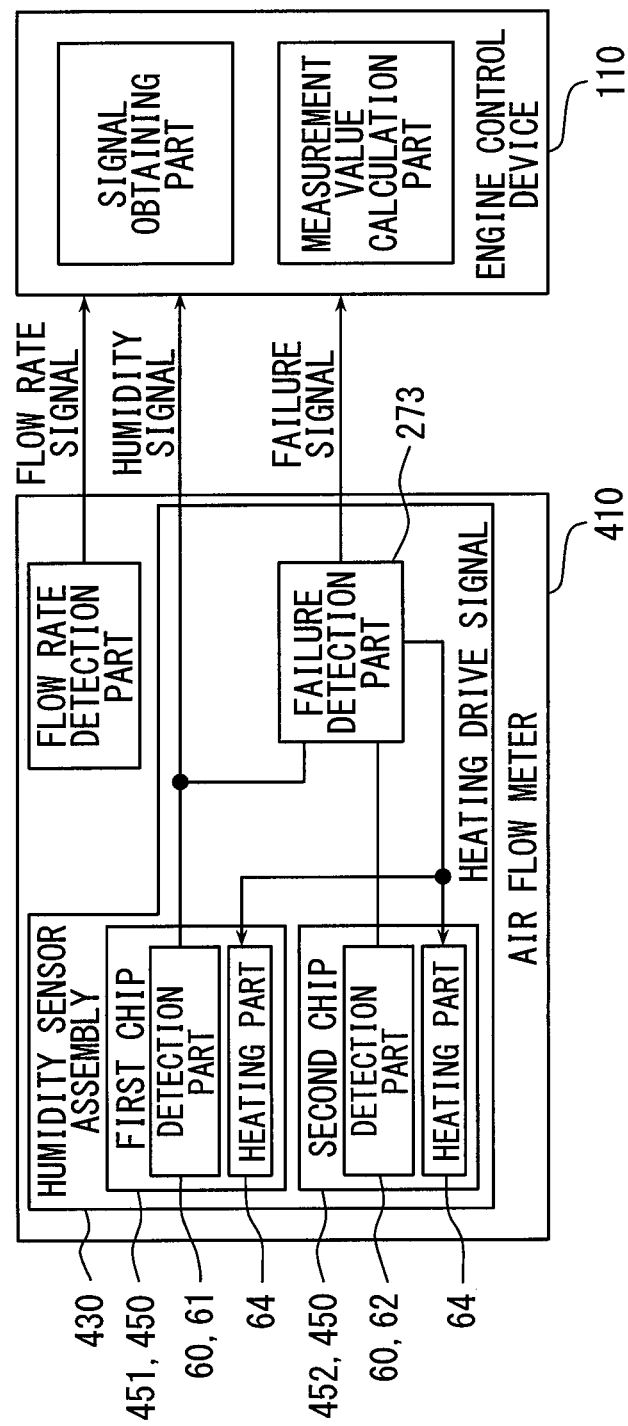
FIG. 17 is a block diagram showing an electrical configuration of an air flow meter according to a fourth embodiment.
Figure 18:
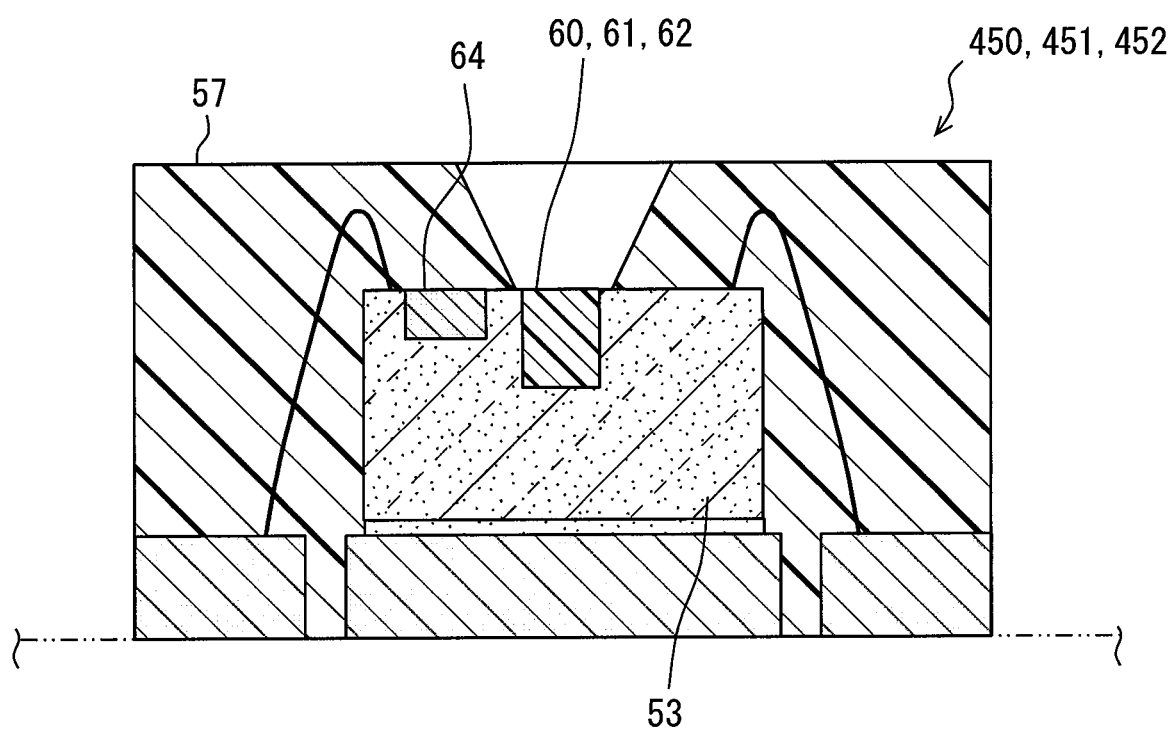
FIG. 18 is a cross-sectional view of a humidity sensor chip according to the fourth embodiment.
Figure 19:
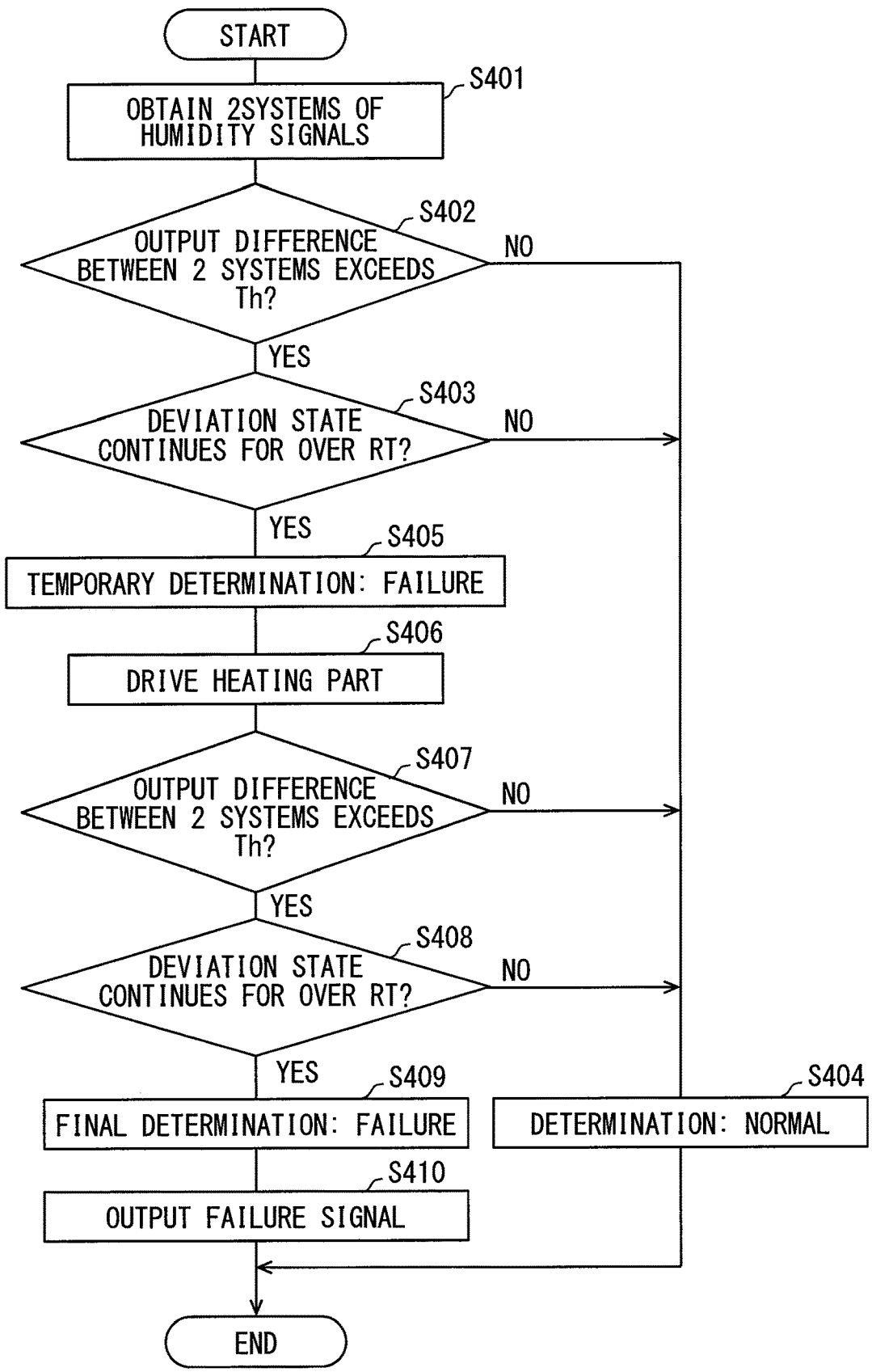
FIG. 19 is a flowchart showing details of an abnormality detection process according to the fourth embodiment.

A fourth embodiment of the present disclosure shown in FIGS. 17 to 19 is another modification of the first embodiment. In an air flow meter 410 according to the fourth embodiment, similarly to the third embodiment, a failure detection part 273 is provided in a humidity sensor assembly 430. In addition, as shown in FIGS. 17 and 18, heating parts 64 are formed on two humidity sensor chips 450 provided in the humidity sensor assembly 430.

The heating part 64 is configured to generate a thermal energy by energization. The heating part 64 is formed on a top face of a chip substrate 53 at a position adjacent to a humidity detection part 60. The heating part 64 and the humidity detection part 60 are placed at a distance from each other. The heating part 64 is covered with a sealing part 57. The heating part 64 heats the humidity detection part 60 to evaporate a moisture adsorbed on a moisture sensitive material of the humidity detection part 60.

The failure detection part 273 is electrically connected directly or indirectly to the heating parts 64 provided in a first sensor chip 451 and a second sensor chip 452. The failure detection part 273 has a function of driving each heating part 64 in addition to a failure diagnosis function of the first humidity detection part 61 and the second humidity detection part 62. The failure detection part 273 outputs a heating drive signal to each heating part 64 to turn on each heating part 64, thereby causing each heating part 64 to generate a heat and evaporate a moisture of the humidity detection part 60.

Details of the abnormality detection process of each humidity detection part 60 by the failure detection part 273 described above will be described with reference to FIG. 17 based on FIG. 19. The abnormality detection process shown in FIG. 19 is started based on a start of a power supply to each element of the air flow meter 410, and is repeatedly started at a predetermined cycle until the power supply is terminated. The processes up to S401 to S404 are substantially the same as those in S101 to S104 in the first embodiment (refer to FIG. 7), and therefore descriptions of those processes will be omitted.

In S405 where it is determined in S403 that the deviation state continues beyond an abnormality determination time RT, a temporal determination of a failure is made which indicates that an abnormality has occurred in the first humidity detection part 61 or the second humidity detection part 62, and the process proceeds to S406. In S406, based on the determination of S405 indicating that the abnormality has occurred, the drive process for outputting heating drive signals to the respective heating parts 64 is started, and the process proceeds to S407. According to a drive process in S406, since the first humidity detection part 61 and the second humidity detection part 62 are heated by the heating parts 64, the moisture of the moisture sensitive materials evaporates. As described above, a refresh of each humidity detection part 60 is performed.

In S407, it is determined whether or not an output difference between the respective humidity signals of the refreshed humidity detection parts 60 remains in a deviation state exceeding an abnormality determination threshold Th. When it is determined in S407 that the output difference is less than the abnormality determination threshold Th, the normal determination is performed in S404, and the abnormality detection process is terminated.

On the other hand, when it is determined in S407 that the output difference exceeds the abnormality determination threshold Th, the process proceeds to S408. In S408, similarly to S403, it is determined again whether or not the deviation state of the output difference continues beyond an abnormality determination time RT. If S408 determines that the deviation state has been eliminated before the lapse of the abnormality determination time RT, S404 performs a normal determination, and ends the abnormality detection process. On the other hand, when it is determined in S408 that the deviation state continues beyond the abnormality determination time RT, the process proceeds to S409.

In S409, it is determined whether or not a failure has occurred in at least one of the first humidity detection part 61 and the second humidity detection part 62, and the process proceeds to S410. In S410, similarly to S205 (refer to FIG. 12) of the second embodiment, the warning lamp of the combination meter is lighted by outputting a failure signal to an engine control device 110, and an abnormality detection process is terminated.

Also in the fourth embodiment described so far, the same effects as in the first embodiment are achieved, which makes it possible to detect an abnormality such as a failure occurring in the humidity detection part 60. In addition, after heating by the heating part 64, the failure detection part 273 according to the fourth embodiment performs re-determination of the abnormality based on the difference between the humidity signals obtained from the two humidity detection parts 60. As described above, when the two humidity detection parts 60 are heated together by the respective heating parts 64, a moisture can be removed from the respective humidity detection parts 60 even when, for example, the humidity detection parts 60 are left in a high temperature and high humidity state and a large amount of moisture is adsorbed on the moisture sensitive material. As a result of the heat treatment, if the difference between the humidity signals from the respective refreshed humidity detection parts 60 is verified, an erroneous determination of an abnormality caused by high temperature and high humidity can be inhibited. In the fourth embodiment, an air flow meter 410 corresponds to a physical quantity measuring device.

Fifth Embodiment

Figure 20:
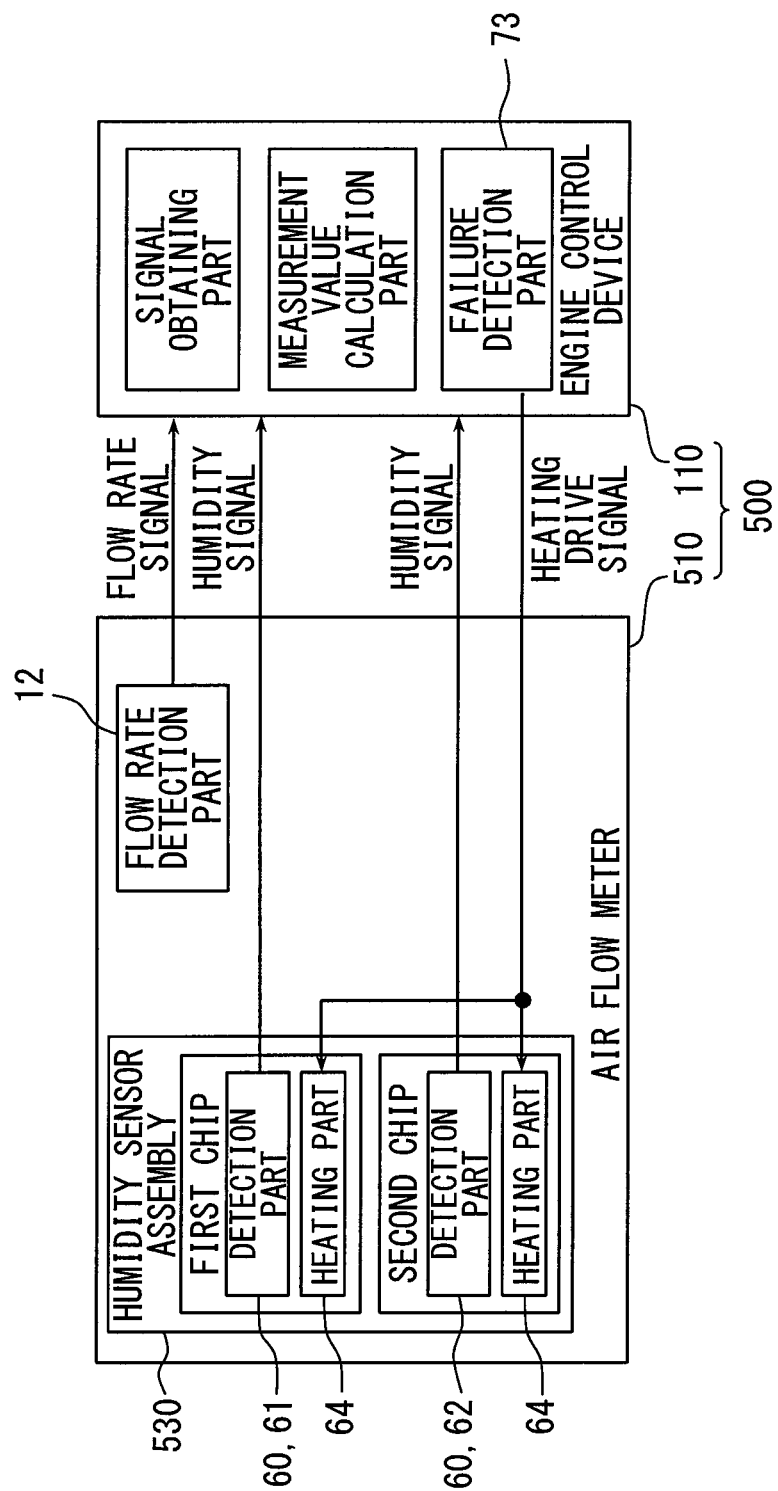
FIG. 20 is a block diagram showing an electrical configuration of a measuring device according to a fifth embodiment.
Figure 21:
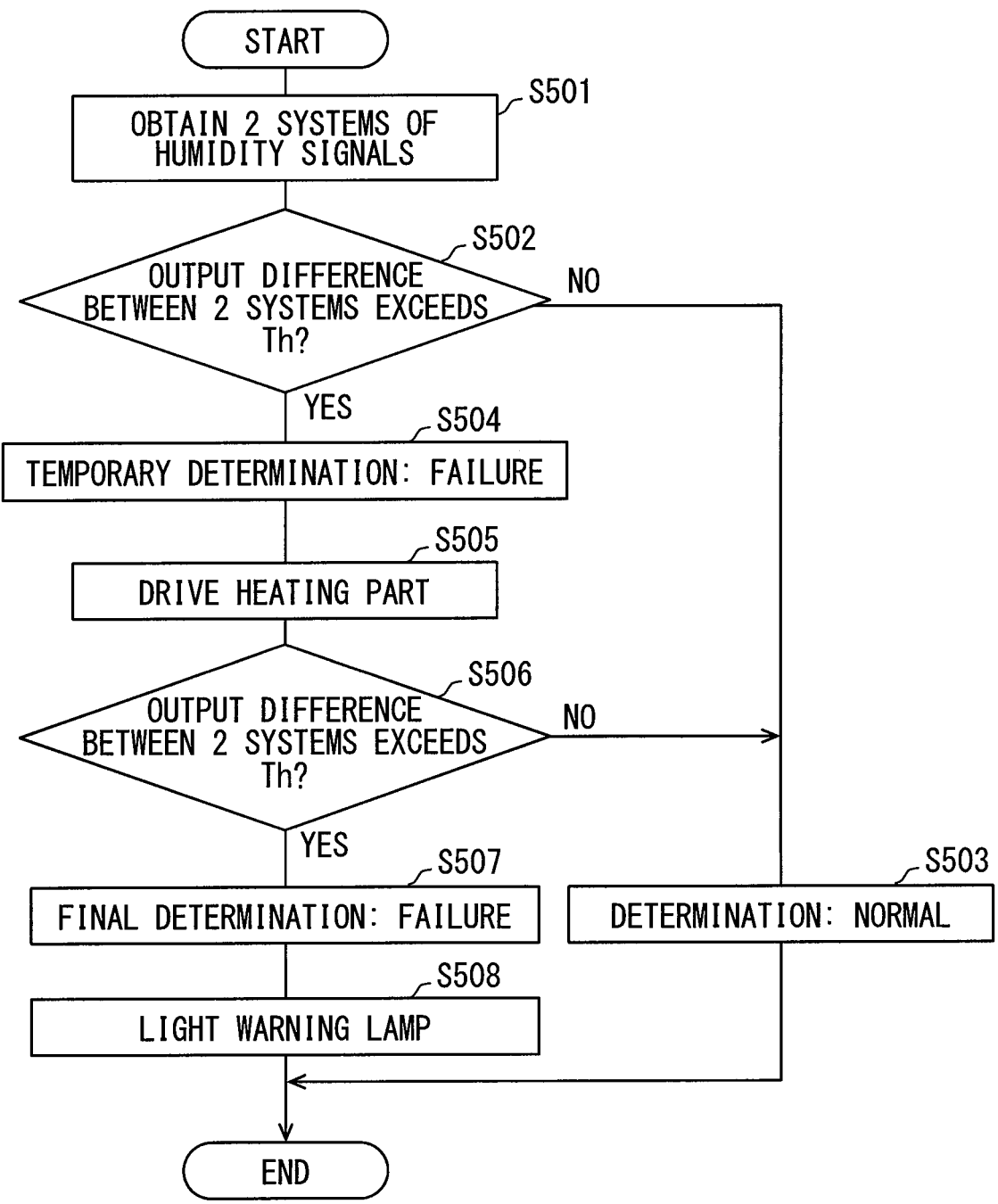
FIG. 21 is a flowchart showing details of an abnormality detection process according to the fifth embodiment.

A fifth embodiment of the present disclosure shown in FIGS. 20 and 21 is a modification of the fourth embodiment. An air flow meter 510 according to the fifth embodiment includes a flow rate detection part 12 and a humidity sensor assembly 530. A failure detection part 273 (refer to FIG. 17) as in the fourth embodiment is omitted from the humidity sensor assembly 530. The heat generation of each heating part 64 is controlled by a failure detection part 73 of an engine control device 110. Hereinafter, the details of a process in which the failure detection part 73 detects the abnormality of each humidity detection part 60 will be described with reference to FIG. 20 based on FIG. 21.

In S501 and S502, similarly to S401 and S402 of the fourth embodiment (refer to FIG. 19), obtaining the humidity signals of two systems and calculating the output difference between those humidity signals are started, and it is determined whether or not the calculated output difference is in a deviation state exceeding an abnormality determination threshold Th. In S502, when the output difference is less than the abnormality determination threshold Th, S503 determines that the two humidity detection parts 60 are normal, and ends the abnormality detection process. On the other hand, when it is determined in S502 that the output difference exceeds the abnormality determination threshold Th, the process proceeds to S504.

In S504 and S505, similarly to S405 and S406 (refer to FIG. 19) according to the fourth embodiment, a temporal determination of a failure indicating that an abnormality has occurred is made, and a driving process for outputting heating drive signals to the respective heating parts 64 is started, and the process proceeds to S506. As described above, a refresh of each humidity detection part 60 is performed.

In S506, it is determined whether or not the output difference between the respective humidity signals of the refreshed humidity detection parts 60 remains in the deviation state exceeding the abnormality determination threshold Th. When it is determined in S506 that the output difference is less than the abnormality determination threshold Th, the normal determination is performed in S503, and the abnormality detection process is terminated.

On the other hand, when it is determined in S506 that the output difference exceeds the abnormality determination threshold Th, it is determined in S507 that at least one of the first humidity detection part 61 and the second humidity detection part 62 has an abnormality, and the process proceeds to S508. In S508, the warning lamp of the combination meter is lighted on to terminate the abnormality detection process.

Also in the fifth embodiment described so far, the same effects as in the fourth embodiment are achieved, which makes it possible to detect an abnormality such as a failure occurring in the humidity detection part 60. In addition, as in the fifth embodiment, the failure detection part 73 of the engine control device 110, which is an external device of the air flow meter 510, may be configured to control each heating part 64. In the fifth embodiment, the measuring device 500 including the air flow meter 510 and the engine control device 110 corresponds to a physical quantity measuring device.

Sixth Embodiment

Figure 22:
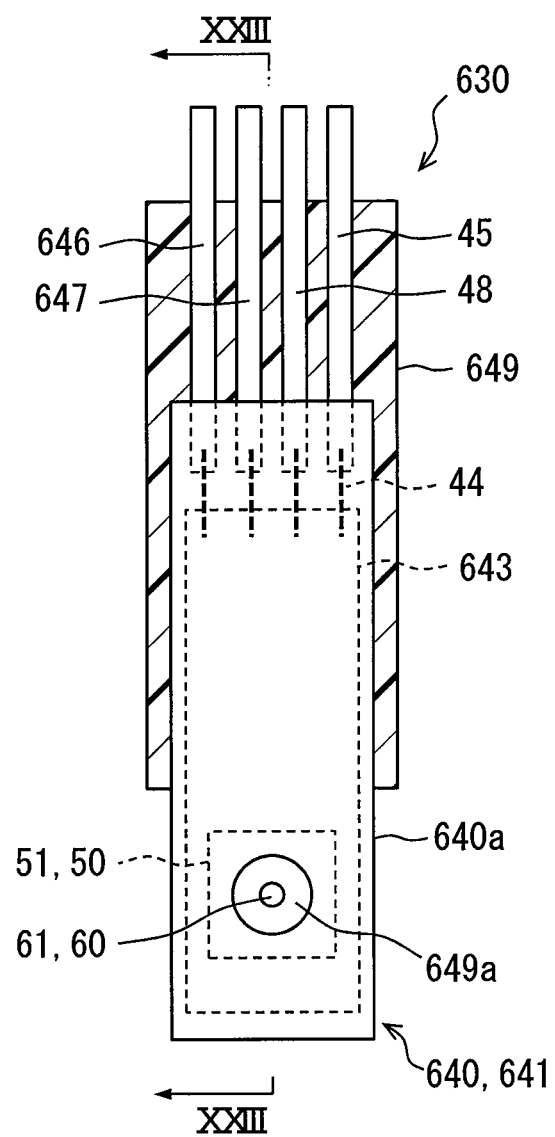
FIG. 22 is a front view showing a configuration of a humidity sensor assembly according to a sixth embodiment, and is a cross-sectional view taken along a line XXII-XXII of FIG. 23.
Figure 23:
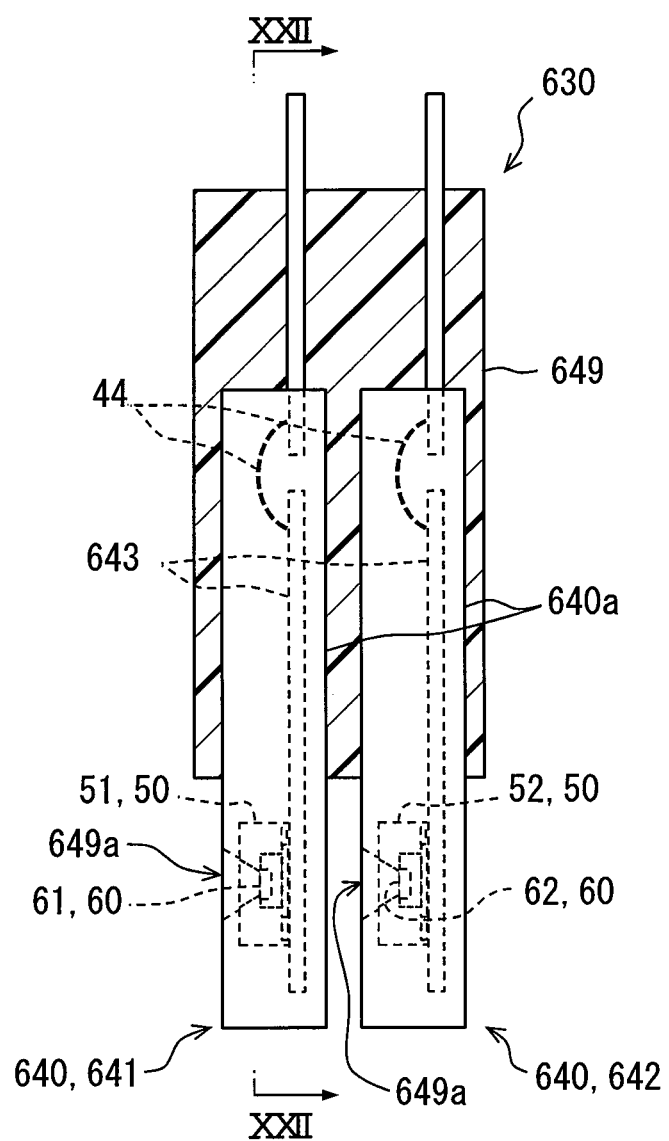
FIG. 23 is a cross-sectional view taken along a line XXIII-XXIII of FIG. 22.
Figure 24:
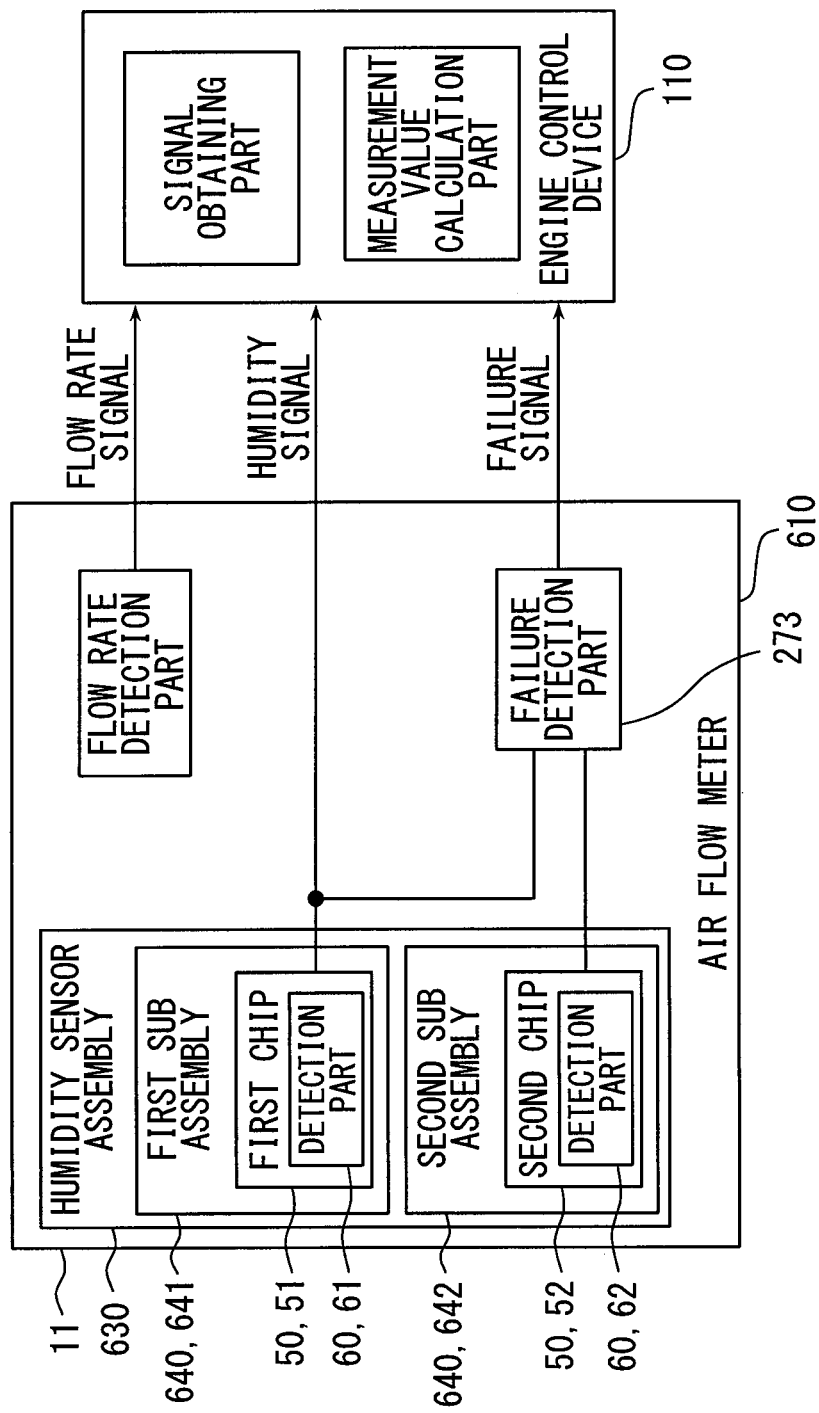
FIG. 24 is a block diagram showing an electrical configuration of an air flow meter according to a sixth embodiment.

A sixth embodiment of the present disclosure shown in FIGS. 22 to 24 is another modification of the second embodiment. A humidity sensor assembly 630 according to the sixth embodiment includes multiple (two) humidity sensor sub-assemblies 640. In the present embodiment, the humidity sensor sub-assemblies 640 are sub-assemblies 640. The two sub-assemblies 640 are of substantially identical configuration with each other. Each of the sub-assemblies 640 has one humidity detection part 60.

The sub-assembly 640 is formed in a generally rectangular thick plate-shape. The sub-assembly 640 includes, in addition to one humidity sensor chip 50, a sensor circuit board 643, a power supply terminal 45, a pair of output terminals 646 and 647, a ground terminal 48, a connection wire 44, a sub housing 640a, and the like.

The sensor circuit board 643 and each terminal are embedded in the sub housing 640a by a primary mold made of a resin material for molding the sub housing 640a. A detection hole 649a for exposing a humidity detection part 60 to the outside of the sub housing 640a is provided in the sub housing 640a. One of two surfaces of the sub-assembly 640 in a thickness direction in which the detection hole 649a is opened is a front surface, and the other is a back surface.

One of the two sub-assemblies 640 is a first sub-assembly 641 and the other is a second sub-assembly 642. The humidity sensor chip 50 and the humidity detection part 60 of the first sub-assembly 641 are a first sensor chip 51 and a first humidity detection part 61, respectively. The humidity sensor chip 50 and the humidity detection part 60 of the second sub-assembly 642 are a second sensor chip 52 and a second humidity detection part 62, respectively.

The first sub-assembly 641 and the second sub-assembly 642 are held by a sensor housing 649 aligned in the thickness direction by a secondary mold made of a resin material for molding the sensor housing 649. The positions of the first sub-assembly 641 and the second sub-assembly 642 in the longitudinal direction and the short direction are aligned with each other. A space in the thickness direction is defined between the back surface of the first sub-assembly 641 and the front surface of the second sub-assembly 642. The first humidity detection part 61 of the first sub-assembly 641 and the second humidity detection part 62 of the second sub-assembly 642 are oriented in the same direction. The second humidity detection part 62 can measure a humidity of an air flowing into the detection hole 649a through a gap provided between the sub housings 640a.

Also in the sixth embodiment described above, the same effects as in the second embodiment can be achieved, and the failure detection part 273 can detect an abnormality such as a failure occurring in the humidity detection part 60 based on the humidity signal output from each humidity detection part 60 of each sub-assembly 640.

In addition, according to the sixth embodiment, the humidity sensor assembly 630 is formed by integrating the two sub-assemblies 640 by a secondary mold. Each sub-assembly 640 may be substantially identical in configuration with a single system humidity sensor assembly. This makes it possible to efficiently mass-produce a multi-system humidity sensor assembly 630 by using a configuration used for a non-multiplex system. According to the sixth embodiment, the sub-assembly 640 corresponds to a humidity sensor sub-assembly, and the air flow meter 610 corresponds to a physical quantity measuring device.

Seventh Embodiment

Figure 25:
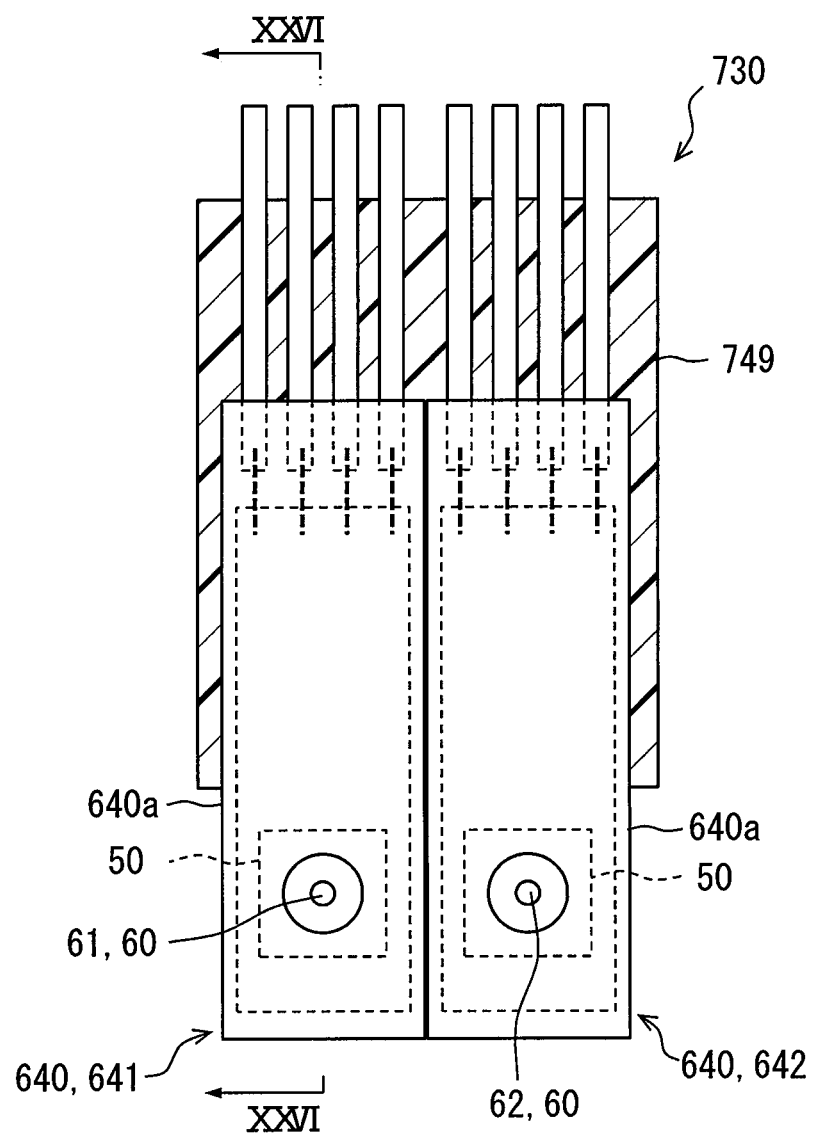
FIG. 25 is a front view showing a configuration of a humidity sensor assembly according to a seventh embodiment, and is a cross-sectional view taken along a line XXV-XXV of FIG. 26.
Figure 26:
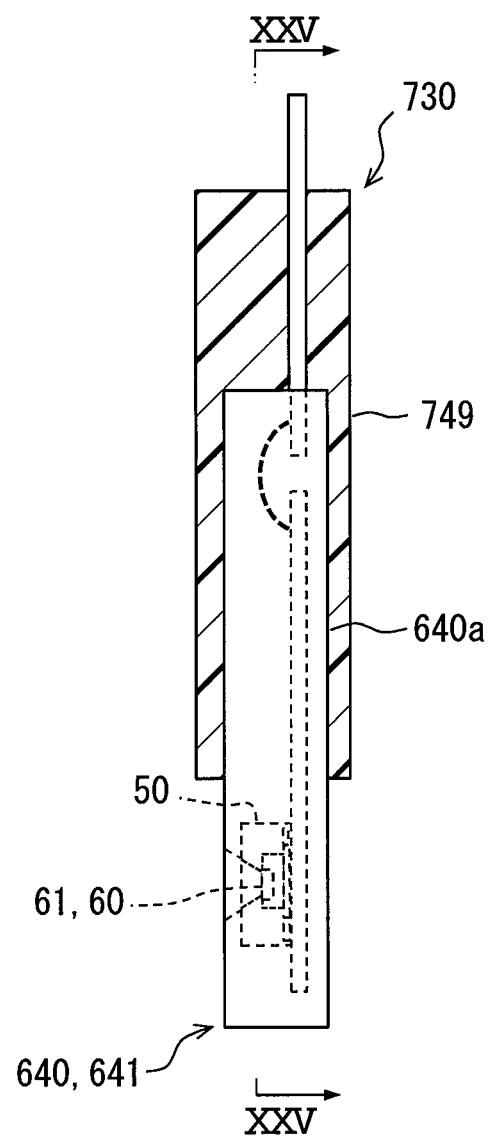
FIG. 26 is a cross-sectional view taken along a line XXVI-XXVI of FIG. 25.

A seventh embodiment of the present disclosure shown in FIGS. 25 and 26 is a modification of the sixth embodiment. In a humidity sensor assembly 730 according to the seventh embodiment, a first sub-assembly 641 and a second sub-assembly 642 are held by a sensor housing 749 in alignment in a short direction of sub-assemblies 640. Each of the sub-assemblies 640 is embedded in the sensor housing 749 in a posture in which each of the front faces is oriented in the same direction. In the thickness direction and the longitudinal direction, the positions of the first sub-assembly 641 and the second sub-assembly 642 are aligned with each other. The first sub-assembly 641 and the second sub-assembly 642 contact each side surface of a sub housing 640a facing each other.

With the configuration described above, the humidity sensor chips 50 and the humidity detection parts 60 respectively provided in the two sub-assemblies 640 are aligned along a short direction of the sub-assemblies 640. In addition, a first humidity detection part 61 and a second humidity detection part 62 are oriented in the same direction.

The seventh embodiment described so far also exhibits the same effects as those in the sixth embodiment. In the seventh embodiment, an air flow meter including a humidity sensor assembly 730 corresponds to a physical quantity measuring device.

Eighth Embodiment

Figure 27:
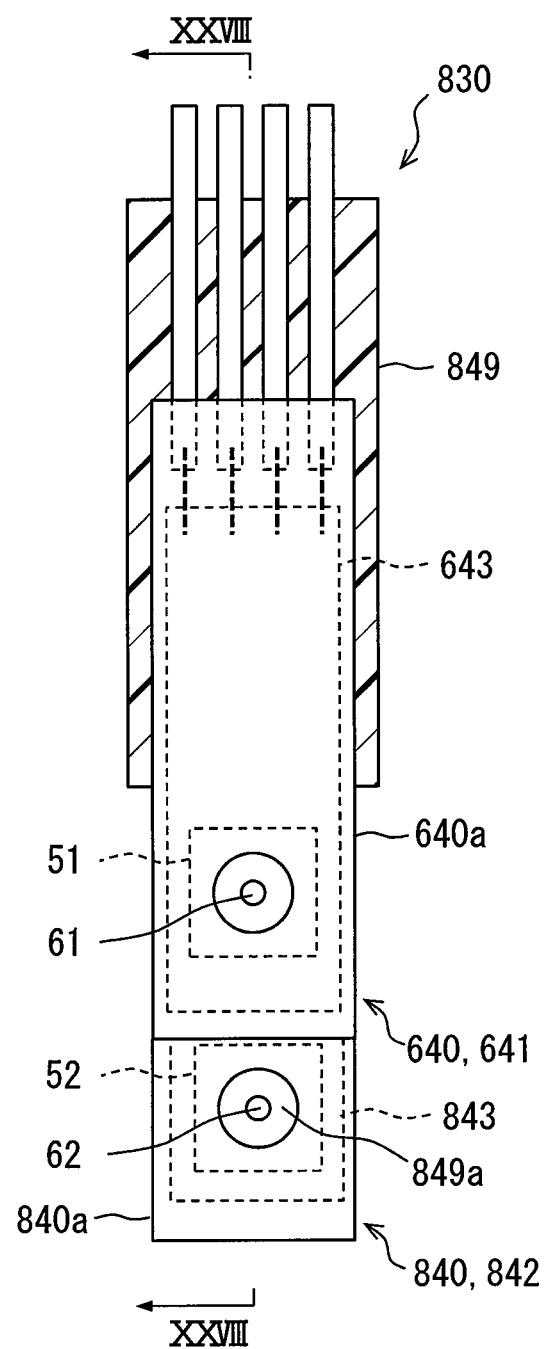
FIG. 27 is a front view showing a configuration of a humidity sensor assembly according to an eighth embodiment, and is a cross-sectional view taken along a line XXVII-XXVII of FIG. 28.
Figure 28:
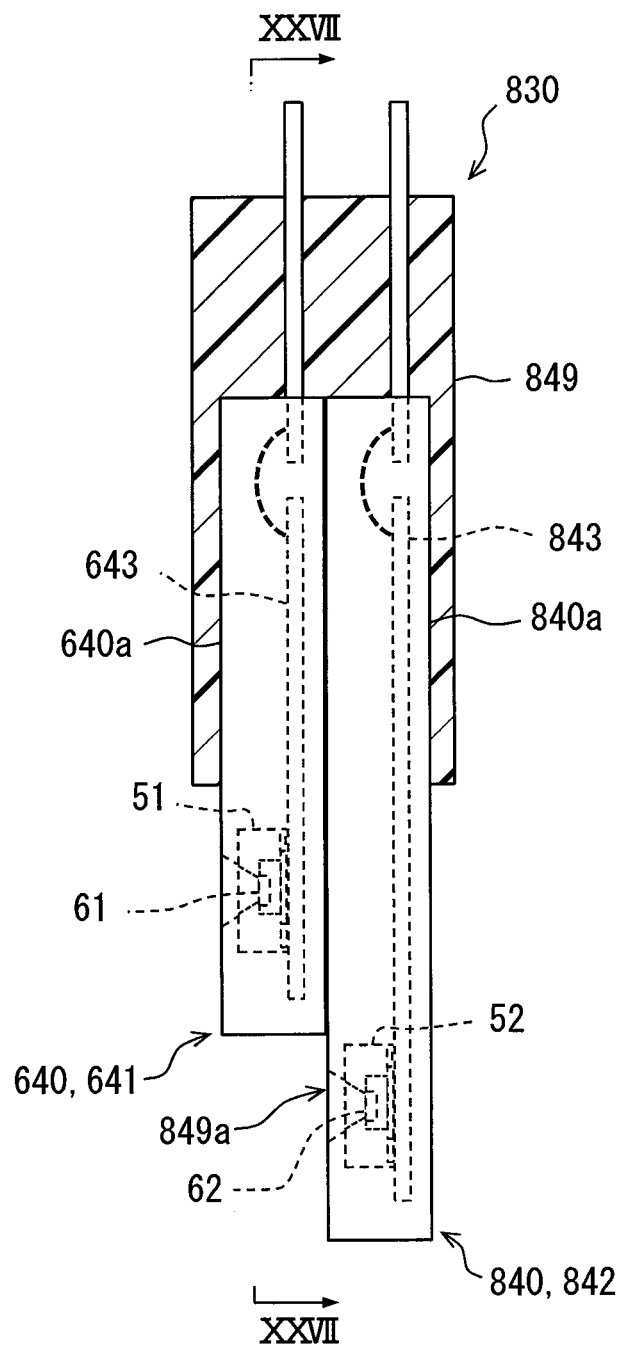
FIG. 28 is a cross-sectional view taken along a line XXVIII-XXVIII of FIG. 27.

An eighth embodiment of the present disclosure shown in FIGS. 27 and 28 is another modification of the sixth embodiment. A humidity sensor assembly 830 according to the eighth embodiment includes sub-assemblies 640 and 840 having different longitudinal dimensions. The sub-assembly 840, which is a second sub-assembly 842, is defined to have a longer longitudinal dimension than the sub-assembly 640, which is a first sub-assembly 641.

The first sub-assembly 641 and the second sub-assembly 842 are held by a sensor housing 849 in alignment in a thickness direction. The first sub-assembly 641 and the second sub-assembly 842 are embedded in a sensor housing 849 in a posture in which the respective front faces are oriented in the same direction. A back surface of the first sub-assembly 641 is in contact with the front surface of the second sub-assembly 842. The first humidity detection part 61 and the second humidity detection part 62 are oriented in the same direction.

The sub-assembly 840 includes a sensor circuit board 843 and a sub housing 840*a*. Each dimension in the longitudinal direction of the sensor circuit board 843 and the sub housing 840*a* is longer than that of the sensor circuit board 643 and the sub housing 640*a* of the sub-assembly 640. Due to such a shape of the sub-assembly 840 described above, the second sensor chip 52 is mounted on a region of the sensor circuit board 843 which does not overlap with the first sub-assembly 641 in the thickness direction. As a result, the first sensor chip 51 and the second sensor chip 52 are located side by side along the longitudinal direction of each of the sub-assemblies 640 and 840. In addition, a detection hole 849*a* of the second sub-assembly 842 opens in a region on the front surface of the sub housing 840*a* that does not overlap with the first sub-assembly 641.

The eighth embodiment described above also exhibits the same effects as those in the sixth embodiment. In the eighth embodiment, the sub-assembly 840 corresponds to a humidity sensor sub-assembly, and an air flow meter including the humidity sensor assembly 830 corresponds to a physical quantity measuring device.

Ninth Embodiment

Figure 29:
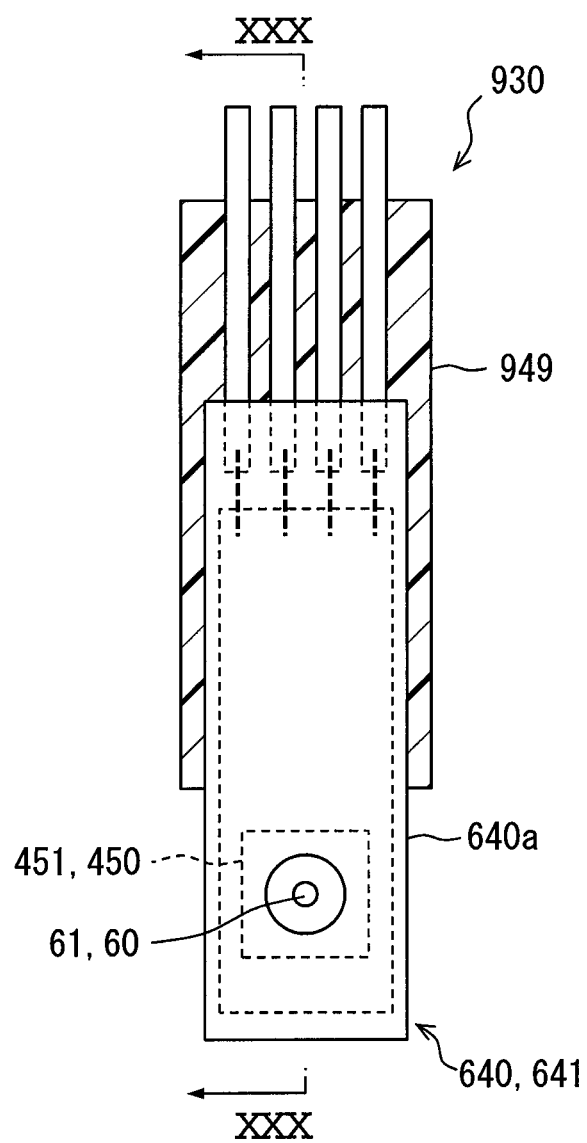
FIG. 29 is a front view showing a configuration of a humidity sensor assembly according to a ninth embodiment, and is a cross-sectional view taken along a line XXIX-XXIX of FIG. 30.
Figure 30:
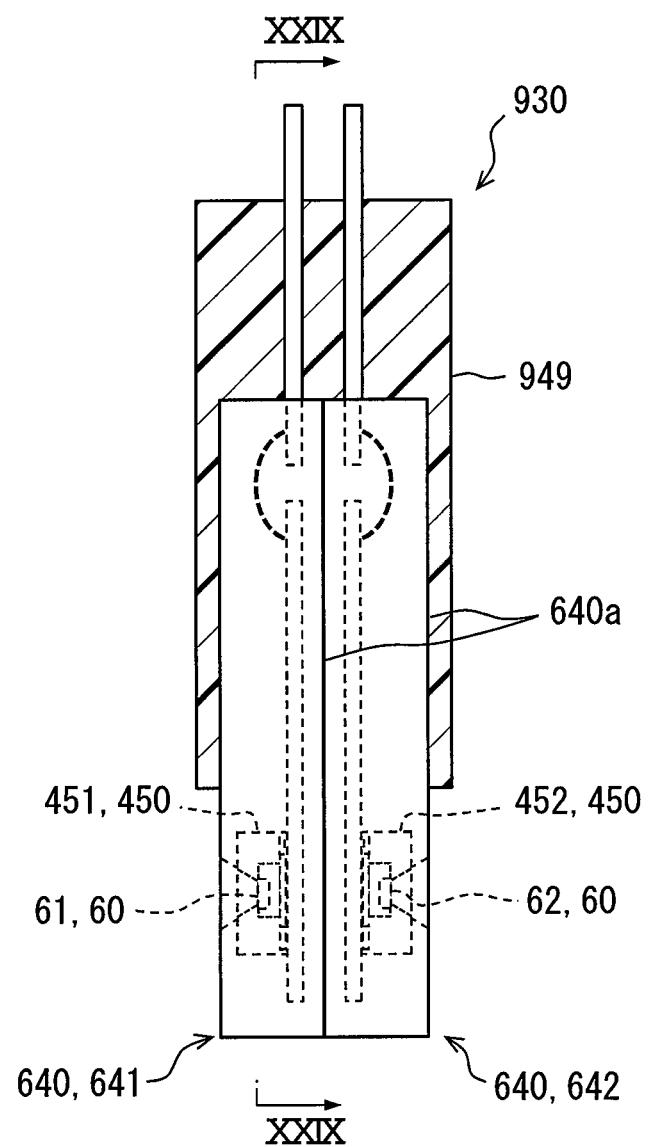
FIG. 30 is a cross-sectional view taken along a line XXX-XXX of FIG. 29.
Figure 31:
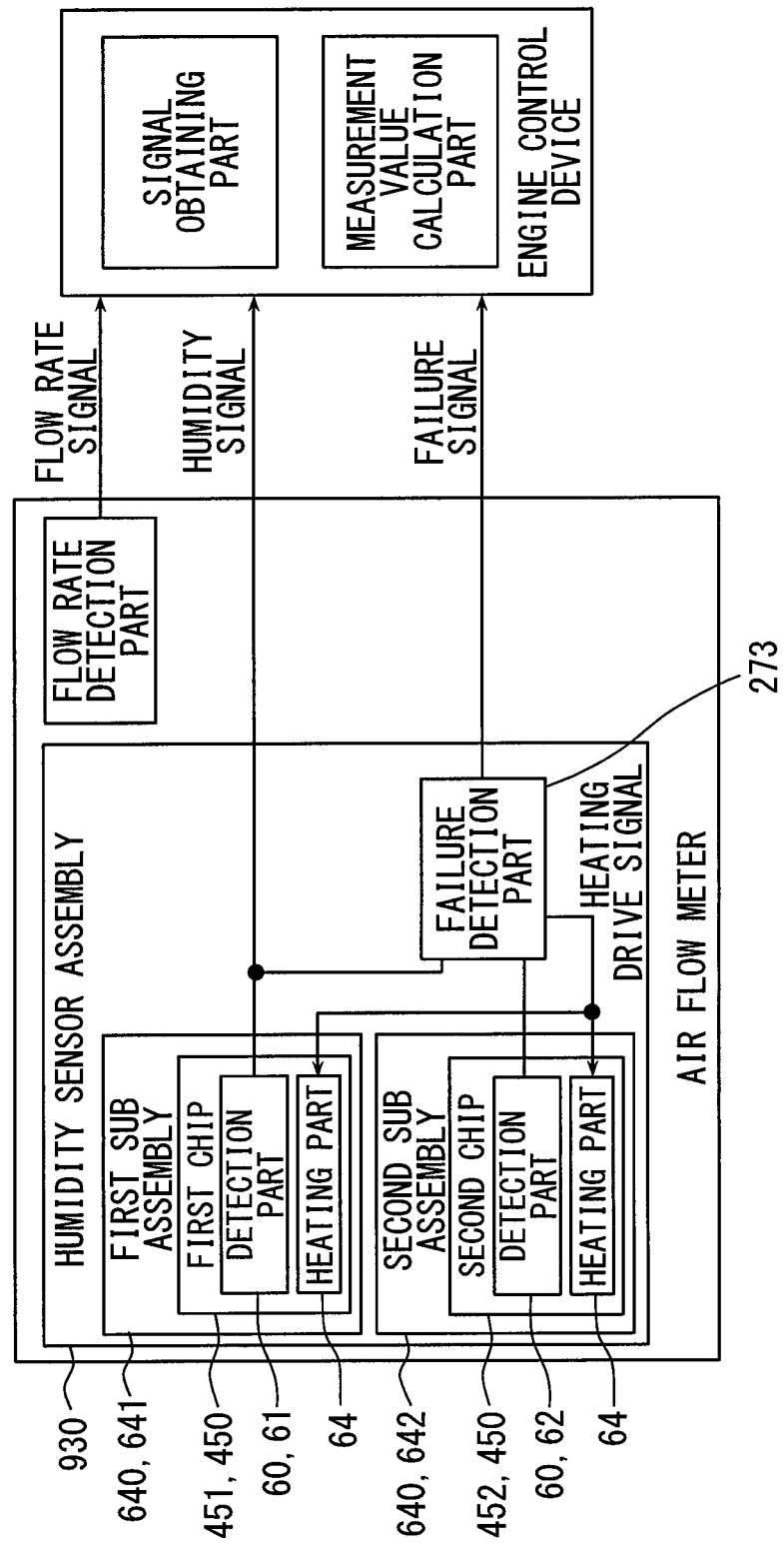
FIG. 31 is a block diagram showing an electrical configuration of an air flow meter according to a ninth embodiment.
Figure 32:
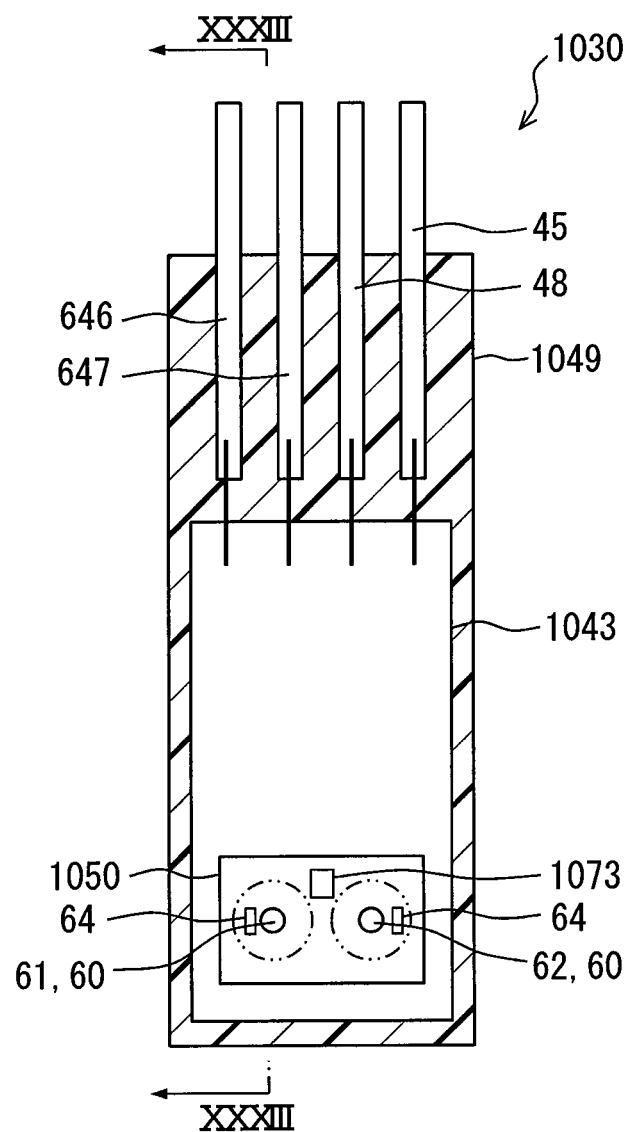
FIG. 32 is a front view showing a configuration of a humidity sensor assembly according to a tenth embodiment, and is a cross-sectional view taken along a line XXXII-XXXII of FIG. 33.
Figure 33:
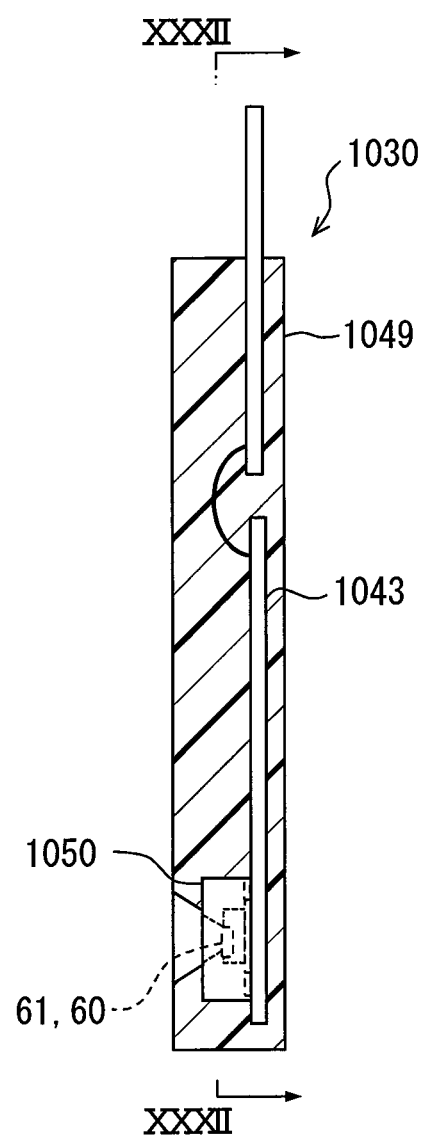
FIG. 33 is a cross-sectional view taken along a line XXXIII-XXXIII line of FIG. 32.
Figure 34:
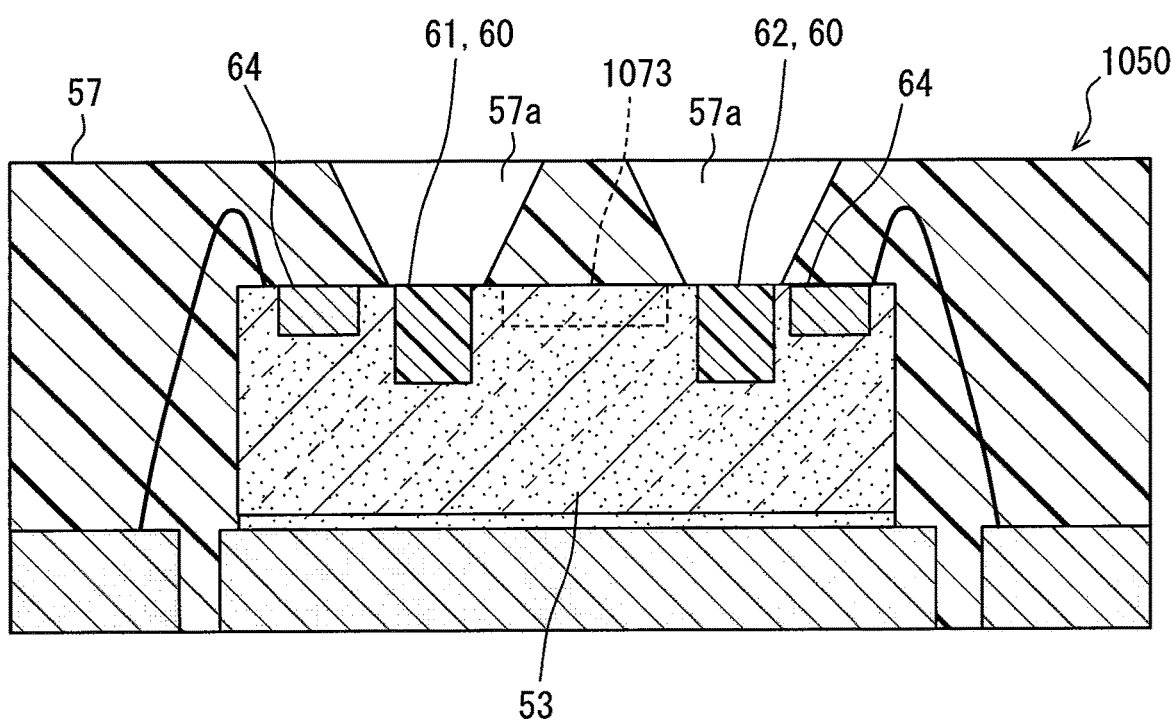
FIG. 34 is a cross-sectional view of a humidity sensor chip according to the tenth embodiment.
Figure 35:
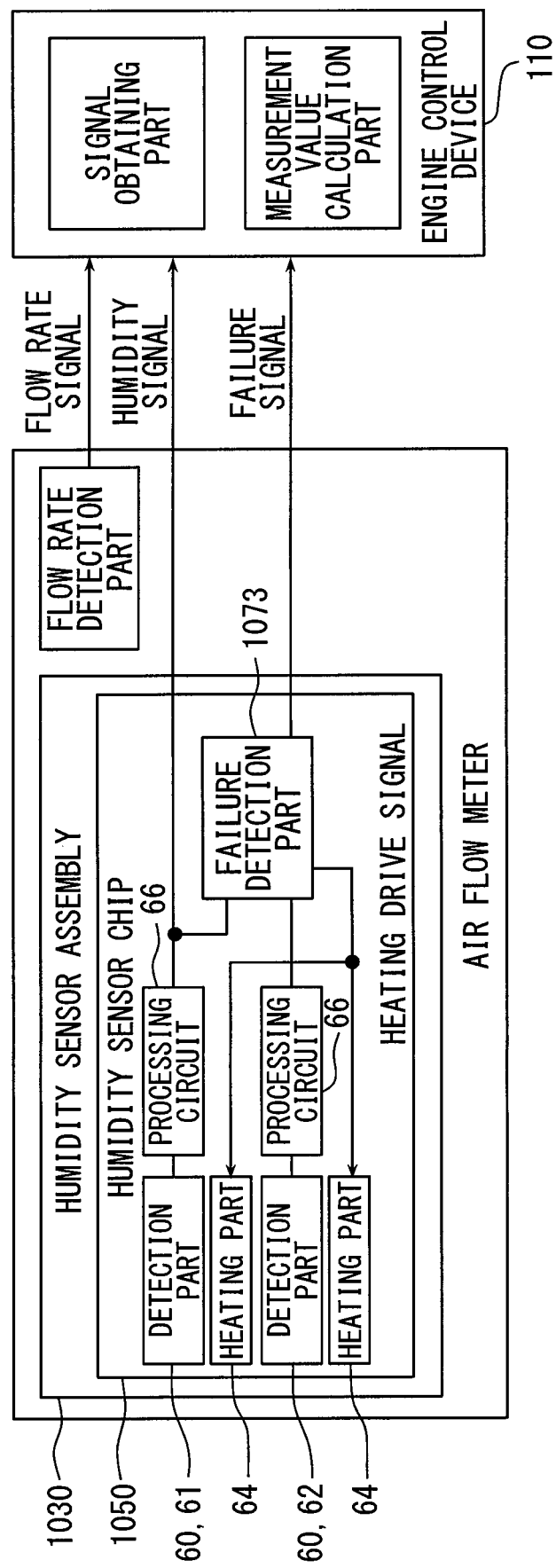
FIG. 35 is a block diagram showing an electrical configuration of the humidity sensor assembly according to the tenth embodiment.

A ninth embodiment of the present disclosure shown in FIGS. 29 to 31 is still another modification of the sixth embodiment. In a humidity sensor assembly 930 according to the ninth embodiment, each sub-assembly 640 is provided with a humidity sensor chip 450 having a heating part 64. In addition, the humidity sensor assembly 930 is provided with a failure detection part 273. The failure detection part 273 is embedded in, for example, a sensor housing 949. The failure detection part 273 has substantially the same configuration as that of the failure detection part 273 (refer to FIG. 24) according to the sixth embodiment, and has a failure diagnosis function of the first humidity detection part 61 and the second humidity detection part 62, and a function of driving each heating part 64 to refresh each humidity detection part 60.

The first sub-assembly 641 and the second sub-assembly 642 are held by the sensor housing 949 in a posture in which back surfaces of the sub housings 640*a* are abutted against each other. The respective positions of the first sub-assembly 641 and the second sub-assembly 642 in the longitudinal direction and the short direction are aligned with each other. The first humidity detection part 61 and the second humidity detection part 62 are oriented in opposite directions to each other.

The ninth embodiment described so far also exhibits the same effects as those in the sixth embodiment. In the ninth embodiment, the humidity sensor assembly 930 corresponds to a humidity sensor assembly and a physical quantity measuring device.

Tenth Embodiment

A tenth embodiment of the present disclosure shown in FIGS. 32 to 35 is still another modification of the first embodiment. A humidity sensor assembly 1030 according to the tenth embodiment includes a humidity sensor chip 1050 having two humidity detection parts 60. The two humidity detection parts 60 are respectively a first humidity detection part 61 and a second humidity detection part 62. The humidity sensor assembly 1030 uses one of the two humidity detection parts 60, for example, the first humidity detection part 61, as a master, and outputs a humidity signal based on the measurement of the humidity detection part 60, which is the master, to an engine control device 110. In addition to the humidity sensor chip 1050, the humidity sensor assembly 1030 includes a sensor circuit board 1043, a power supply terminal 45, a pair of output terminals 646 and 647, a ground terminal 48, a sensor housing 1049, and the like.

The humidity sensor chip 1050 includes a chip substrate 53 and a sealing part 57, similarly to the humidity sensor chip 50 (refer to FIG. 5) of the first embodiment. The first humidity detection part 61 and the second humidity detection part 62 are formed on a top face of the chip substrate 53 so as to be spaced apart from each other. In the sealing part 57, detection holes 57*a* are provided in respective regions overlapping with the first humidity detection part 61 and the second humidity detection part 62 (refer to FIG. 34). Also according to the tenth embodiment, the first humidity detection part 61 and the second humidity detection part 62 are oriented in the same direction. The humidity sensor chip 1050 is mounted on the sensor circuit board 1043 in a direction in which the first humidity detection part 61 and the second humidity detection part 62 are aligned in the short direction of the sensor circuit board 1043.

The humidity sensor chip 1050 is further provided with a pair of heating parts 64 and a failure detection part 1073. Each heating part 64 is formed on the top face of the chip substrate 53 at a position adjacent to each humidity detection part 60. The heating parts 64 are provided one by one on both sides of each humidity detection part 60 in the longitudinal direction.

The failure detection part 1073 is formed on the top face of the chip substrate 53 at a position away from the heating parts 64 and the humidity detection parts 60. The humidity signals of two systems output by the respective humidity detection parts 60 and processed by the respective processing circuits 66 are input to the failure detection part 1073. The failure detection part 1073 has a configuration corresponding to the failure detection part 273 (refer to FIG. 24) of the sixth embodiment, and has a failure diagnosis function based on comparison of humidity signals of two systems with each other, and a function of driving each heating part 64.

The tenth embodiment described so far also exhibits the same effects as those in the first embodiment. In addition, according to the configuration in which the two humidity detection parts 60 are provided in one humidity sensor chip 1050 as in the tenth embodiment, the enlargement of the sensor circuit board 1043 and thus the humidity sensor assembly 1030 can be further reduced. In the tenth embodiment, the failure detection part 1073 corresponds to an abnormality determination part, and the humidity sensor assembly 1030 corresponds to a humidity sensor assembly and a physical quantity measuring device.

Eleventh Embodiment

Figure 36:
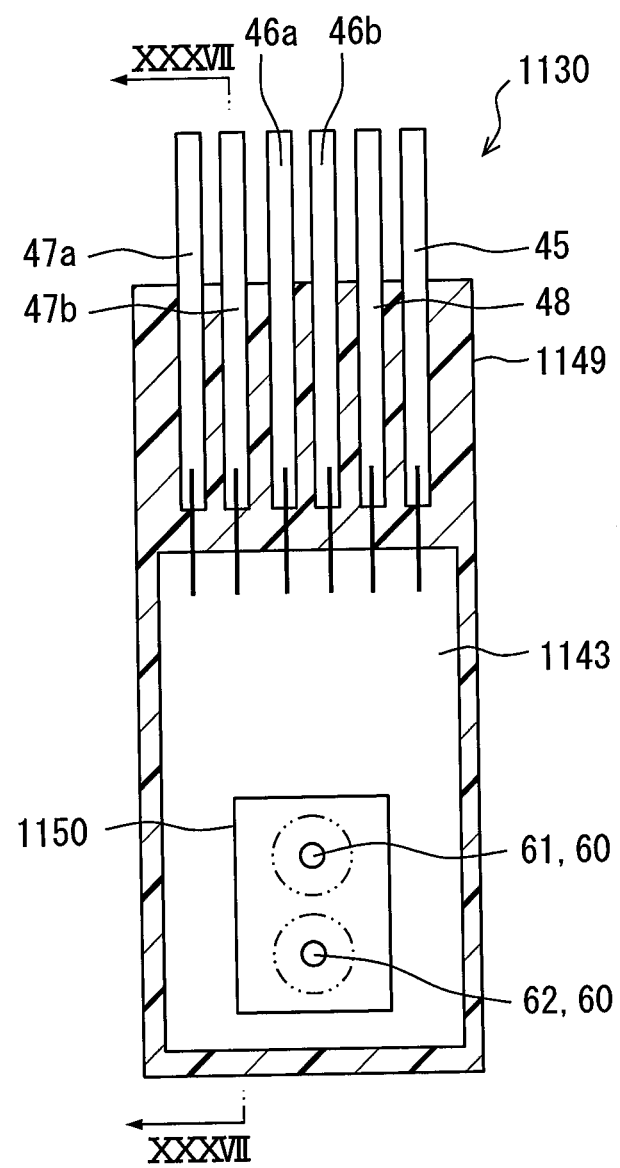
FIG. 36 is a front view showing a configuration of a humidity sensor assembly according to an eleventh embodiment, and is a cross-sectional view taken along a line XXXVI-XXXVI of FIG. 37.
Figure 37:
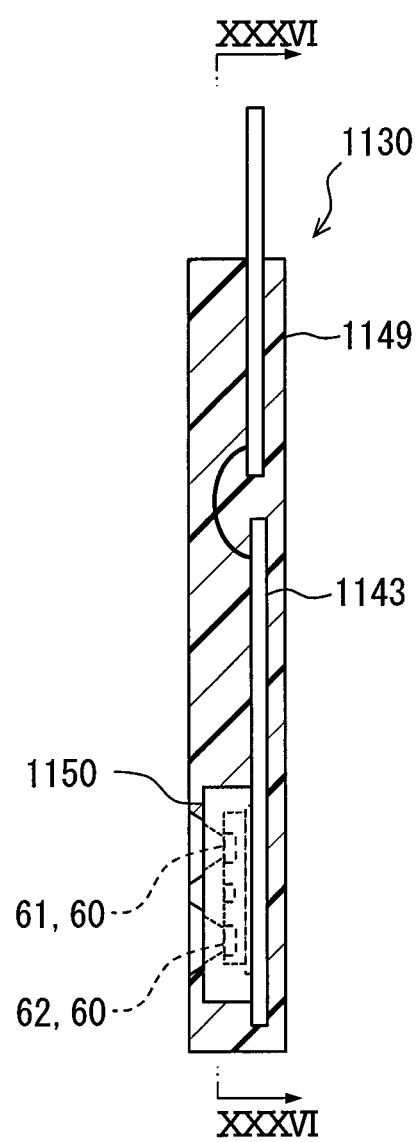
FIG. 37 is a cross-sectional view taken along a line XXXVII-XXXVII line of FIG. 36.
Figure 38:
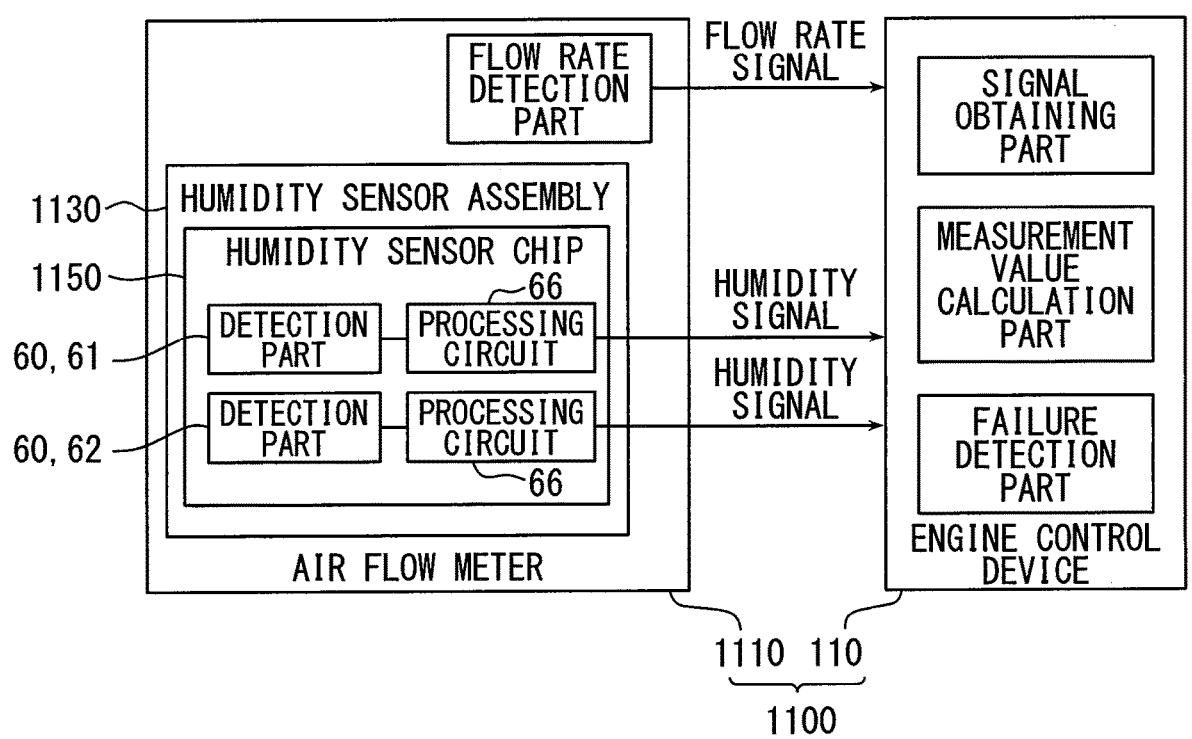
FIG. 38 is a block diagram showing an electrical configuration of a measuring device according to the eleventh embodiment.

An eleventh embodiment according to the present disclosure shown in FIGS. 36 to 38 is a modification of the tenth embodiment. A humidity sensor chip 1150 used in the eleventh embodiment has two humidity detection parts 60, similarly to the humidity sensor chip 1050 (refer to FIG. 32) of the tenth embodiment. On the other hand, a heating part 64 (refer to FIG. 32) and a failure detection part 1073 (refer to FIG. 32) are omitted from the humidity sensor chip 1150. The humidity sensor chip 1150 processes the outputs of the two humidity detection parts 60 individually by respective processing circuits 66, and outputs the processed outputs to an engine control device 110 as humidity signals of two systems.

A humidity sensor assembly 1130 includes the humidity sensor chip 1150 described above, a sensor circuit board 1143, a power supply terminal 45, two sets of output terminals 46a, 46b, 47a, and 47b, a ground terminal 48, a sensor housing 1149, and the like. The humidity sensor chip 1150 is mounted on the sensor circuit board 1143 in a direction in which the two humidity detection parts 60 are aligned in a longitudinal direction of the sensor circuit board 1143. Also in the eleventh embodiment, a first humidity detection part 61 and a second humidity detection part 62 are oriented in the same direction.

The eleventh embodiment described so far also exhibits the same effects as those in the tenth embodiment. In the eleventh embodiment, a measuring device 1100 including an air flow meter 1110 including the humidity sensor chip 1150 and an engine control device 110 corresponds to a physical quantity measuring device.

Twelfth Embodiment

Figure 39:
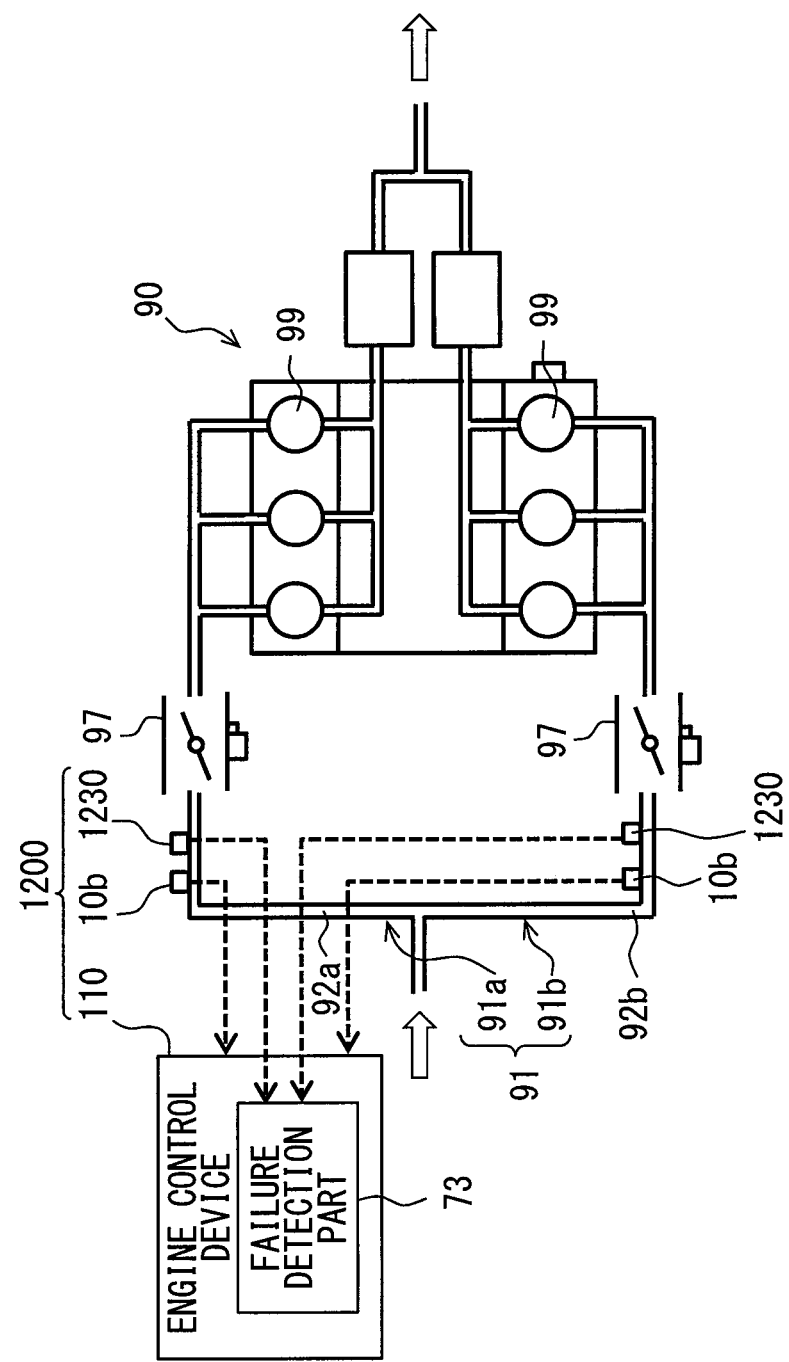
FIG. 39 is a diagram showing an overall image of a system including a measuring device according to a twelfth embodiment and an internal-combustion engine to which the measuring device is applied.
Figure 40:
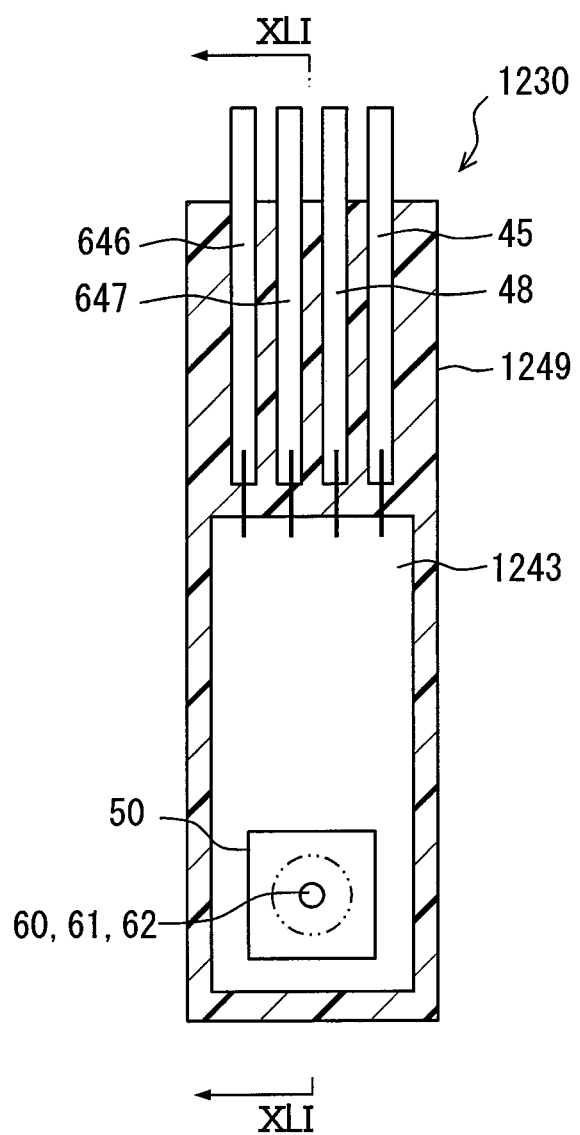
FIG. 40 is a front view of a humidity sensor assembly used in the twelfth embodiment, and is a cross-sectional view taken along a line XL-XL of FIG. 41.
Figure 41:
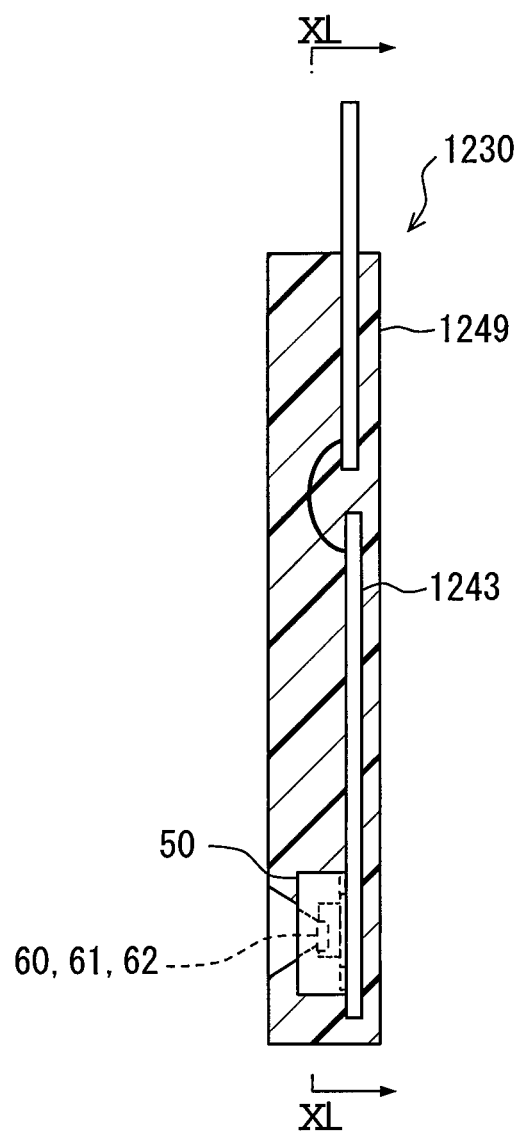
FIG. 41 is a cross-sectional view taken along a line XLI-XLI line of FIG. 40.

A tenth embodiment of the present disclosure shown in FIGS. 39 to 41 is still another modification of the first embodiment. An internal-combustion engine 90 to which a measuring device 1200 according to the twelfth embodiment is applied is of a type having multiple banks, such as a V-shaped six-cylinder, for example. An intake pipe 91 of the internal-combustion engine 90 branches into two pipes so as to supply an intake air to each combustion chamber 99 of a cylinder group provided in each bank. The intake pipe 91 has a first pipe part 91a that defines an intake flow channel 92a connected to one bank and a second pipe part 91b that defines an intake flow channel 92b connected to the other bank.

The measuring device 1200 includes an engine control device 110, a set of air flow meters 10b, and a set of humidity sensor assemblies 1230. The engine control device 110 includes a failure detection part 73, similarly to the first embodiment. The engine control device 110 obtains a flow rate signal from each air flow meter 10b and also obtains a humidity signal from each humidity sensor assembly 1230.

The air flow meters 10b and the humidity sensor assemblies 1230 are provided one by one in the first pipe 91a and the second pipe 91b, respectively. The air flow meters 10b and the humidity sensor assemblies 1230 are mounted on an upstream side of throttle valves 97 provided in the first pipe part 91a and the second pipe part 91b. The air flow meters 10b may be located on the upstream side of the humidity sensor assemblies 1230 or the downstream side of the humidity sensor assemblies 1230.

Each air flow meter 10b has a configuration in which the humidity sensor assembly 30 (refer to FIG. 2) is removed from the air flow meter 10 (refer to FIG. 2) according to the first embodiment. The two air flow meters 10b have substantially the same configuration as each other. Each of the air flow meters 10b is electrically connected directly or indirectly to the engine control device 110, and outputs a flow rate signal measured by each of the intake flow channels 92a and 92b to the engine control device 110.

The humidity sensor assemblies 1230 are substantially identical in configuration to each other. The humidity sensor assemblies 1230 are electrically connected directly or indirectly to the engine control device 110, and output a humidity signal measured in each of the intake flow channels 92a and 92b to the engine control device 110. Each of the humidity sensor assemblies 1230 is provided with one humidity sensor chip 50 having one humidity detection part 60. In addition to the humidity sensor chip 50, the humidity sensor assembly 1230 includes a sensor circuit board 1243, a power supply terminal 45, a pair of output terminals 646 and 647, a ground terminal 48, a sensor housing 1249, and the like.

In the two humidity sensor assemblies 1230 described above, one humidity detection part 60 installed in the first pipe section 91a is referred to as a first humidity detection part 61, and the other humidity detection part 60 installed in the second pipe section 91b is referred to as a second humidity detection part 62. The two humidity sensor assemblies 1230 are attached to the first pipe part 91a and the second pipe part 91b so that postures of the first humidity detection part 61 and the second humidity detection part 62 relative to a flow of the intake air are the same as each other.

The twelfth embodiment described so far also exhibits the same effects as those in the first embodiment. In addition, the humidity sensor assemblies 1230 used in the twelfth embodiment is applicable to a measuring device in which the output of a humidity signal is of only one system. As described above, even if the multiple humidity sensor assemblies 1230 that can be used in a non-multiplexed system without any excessive or insufficient capacity are combined together, the measuring device 1200 in a multiplexed system can be configured. In the twelfth embodiment, the intake flow channel 92a corresponds to a first flow channel part, the intake flow channel 92b corresponds to a second flow channel part, and the measuring device 1200 corresponds to a physical quantity measuring device. The humidity sensor assembly 1230 installed in the first pipe 91a corresponds to a first humidity sensor assembly, and the humidity sensor assembly 1230 installed in the second pipe 91b corresponds to a second humidity sensor assembly.

Thirteenth Embodiment

Figure 42:
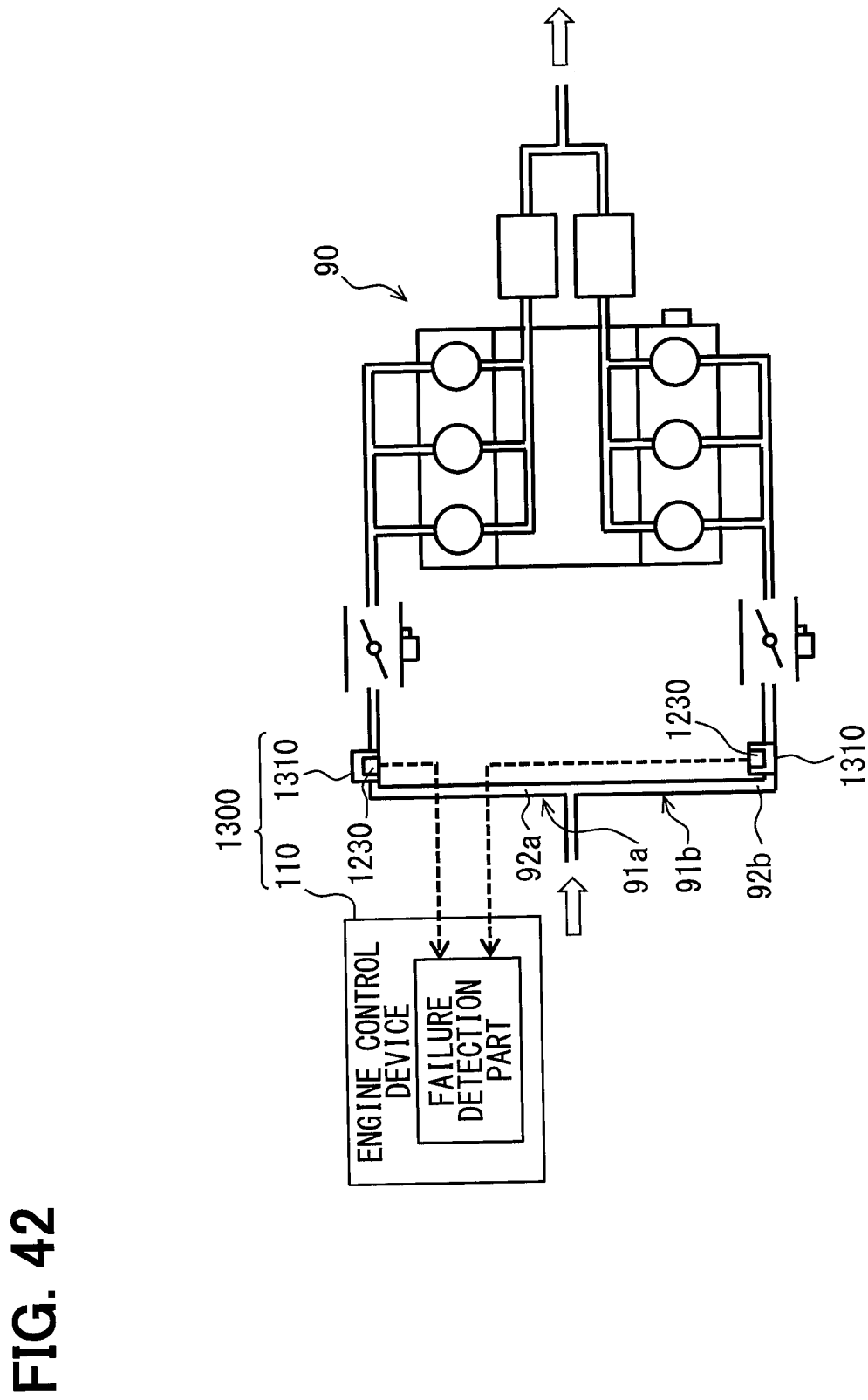
FIG. 42 is a diagram showing an overall image of a system including a measuring device according to a thirteenth embodiment and an internal-combustion engine to which the measuring device is applied.

A thirteenth embodiment of the present disclosure shown in FIG. 42 is a modification of the twelfth embodiment. A measuring device 1300 according to the thirteenth embodiment includes an engine control device 110 and a pair of air flow meters 1310. The two air flow meters 1310 are installed in a first pipe part 91*a* and a second pipe part 91*b*, respectively, and measure a flow rate and a humidity of an air in each of the intake flow channels 92*a* and 92*b*. A housing 11 (refer to FIG. 2) of each of the air flow meters 1310 is provided with one humidity sensor assembly 1230 (refer to FIGS. 40 and 41) substantially identical with that in the twelfth embodiment. The air flow meter 1310 outputs a flow rate signal and a humidity signal to the engine control device 110.

The thirteenth embodiment described so far also exhibits the same effects as those in the twelfth embodiment. In addition, the air flow meter 1310 used in the thirteenth embodiment is also applicable to a measuring device in which the output of each of the flow rate signal and the humidity signal is of only one system. As described above, even when the multiple air flow meters 1310 that can be used in a non-multiplexed system without any excessive or insufficient capacity can be combined together, the measuring device 1300 of a multiplexed system can be configured. According to the thirteenth embodiment, the measuring device 1300 corresponds to a physical quantity measuring device.

Fourteenth Embodiment

Figure 43:
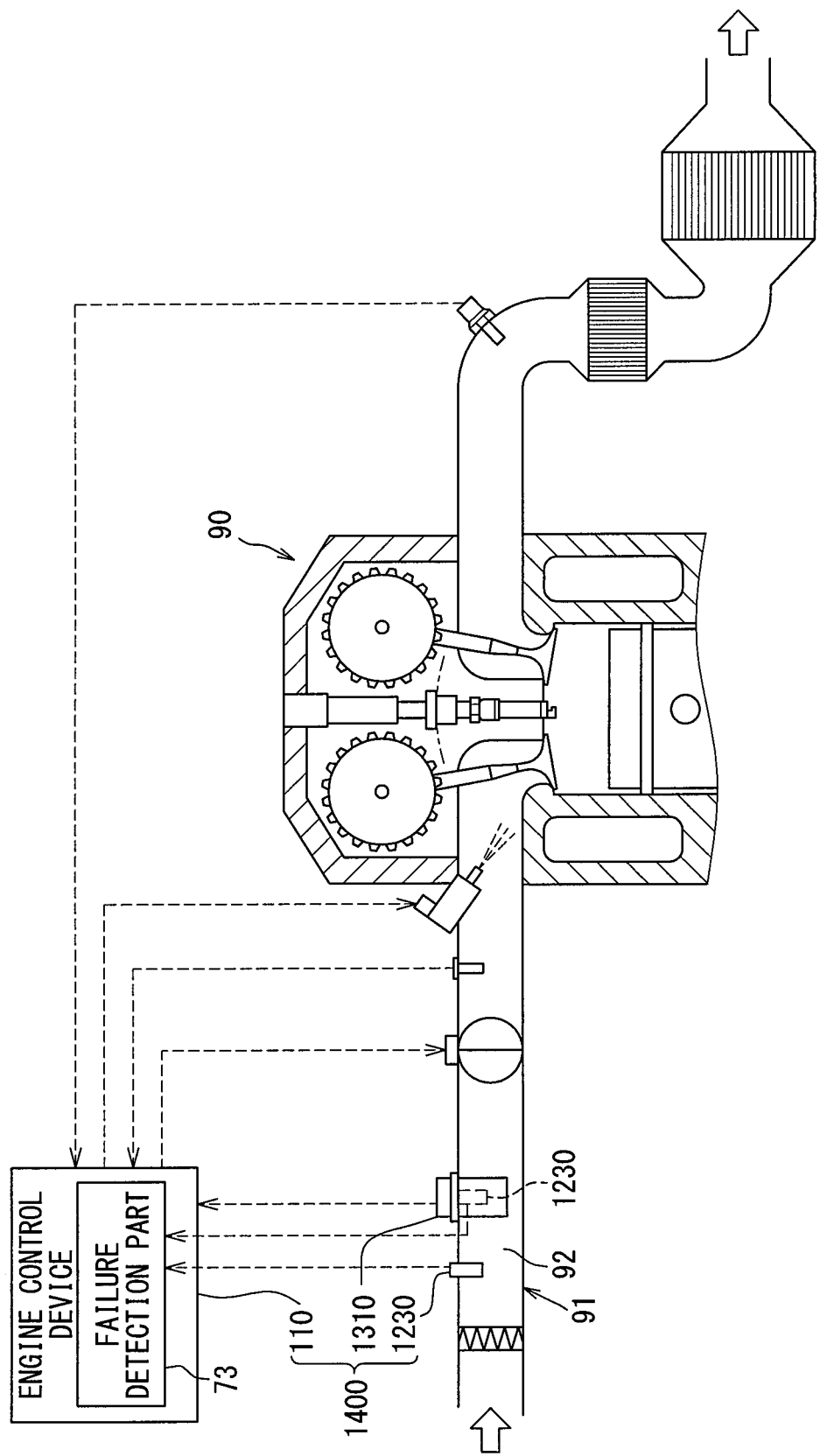
FIG. 43 is a diagram showing an overall image of a system including a measuring device according to a fourteenth embodiment and an internal-combustion engine to which the measuring device is applied.

A fourteenth embodiment of the present disclosure shown in FIG. 43 is another modification of the twelfth embodiment. An internal-combustion engine 90 to which the measuring device 1400 according to the fourteenth embodiment is applied has a configuration of a series type in which all cylinders are aligned in a row, similarly to the first embodiment. The measuring device 1400 includes an engine control device 110, a humidity sensor assembly 1230 (refer to FIGS. 40 and 41) substantially identical to that in the twelfth embodiment, and an air flow meter 1310 substantially identical with that in the thirteenth embodiment. The air flow meter 1310 is provided with a humidity sensor assembly 1230.

The engine control device 110 obtains a flow rate signal from the air flow meter 1310, and also obtains a humidity signal from each of the humidity sensor assembly 1230 and the humidity sensor assembly 1230, which are a part of the air flow meter 1310. The engine control device 110 detects the abnormality of each of the humidity sensor assemblies 1230 by comparing the humidity signals of two systems with each other by the failure detection part 73.

The humidity sensor assembly 1230 and the air flow meter 1310 are located in an intake pipe 91 in a placement spaced apart from each other. The humidity sensor assemblies 1230 are mounted on the upstream side of the air flow meter 1310. The humidity sensor assembly 1230 and the air flow meter 1310 are electrically connected directly or indirectly to the engine control device 110. The humidity sensor assembly 1230 outputs a humidity signal measured in an intake flow channel 92 to the engine control device 110. The air flow meter 1310 outputs the humidity signal and a flow channel signal measured in the intake flow channel 92 to the engine control device 110.

The fourteenth embodiment described so far also exhibits the same effects as those in the twelfth embodiment. In addition, the multi-system measuring device 1400 can be configured by combining the humidity sensor assemblies 1230 and the air flow meter 1310 used in the non-multiplex system one by one. In the fourteenth embodiment, the measuring device 1400 corresponds to a physical quantity measuring device. In addition, the humidity sensor assembly 1230 held by the housing 11 corresponds to a first humidity sensor assembly, and the humidity sensor assembly 1230 located as a single unit corresponds to a second humidity sensor assembly.

Fifteenth Embodiment

Figure 44:
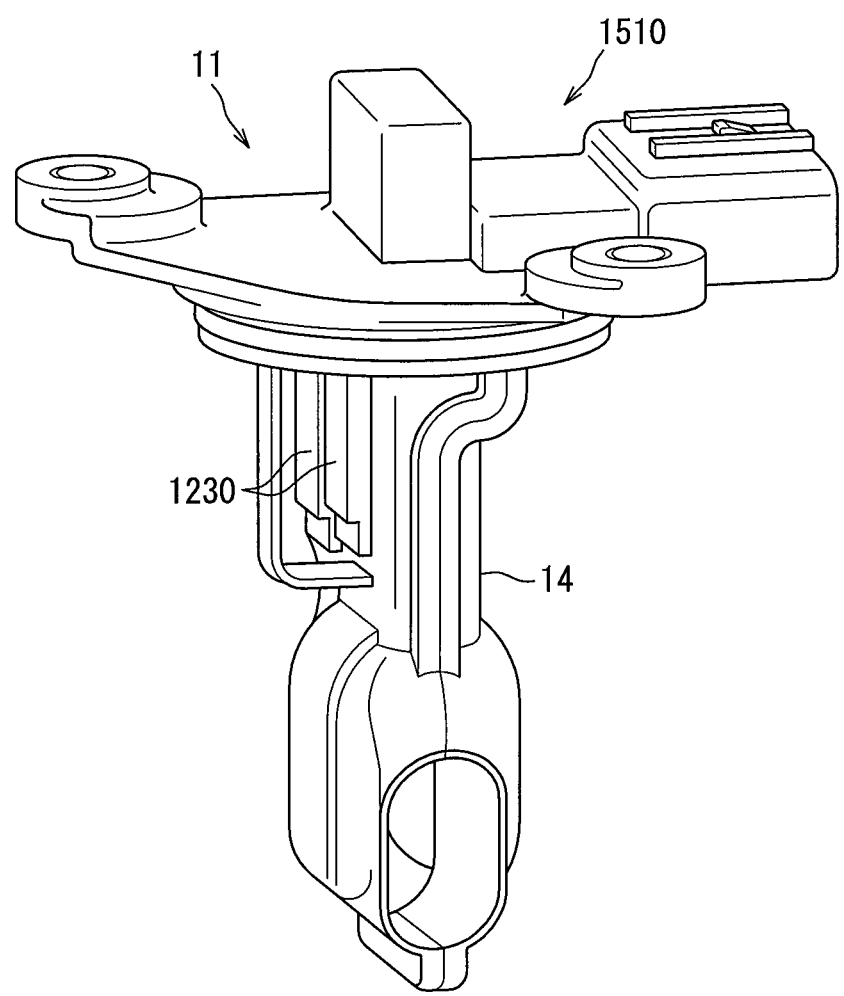
FIG. 44 is a perspective view showing a configuration of an air flow meter according to a fifteenth embodiment.
Figure 45:
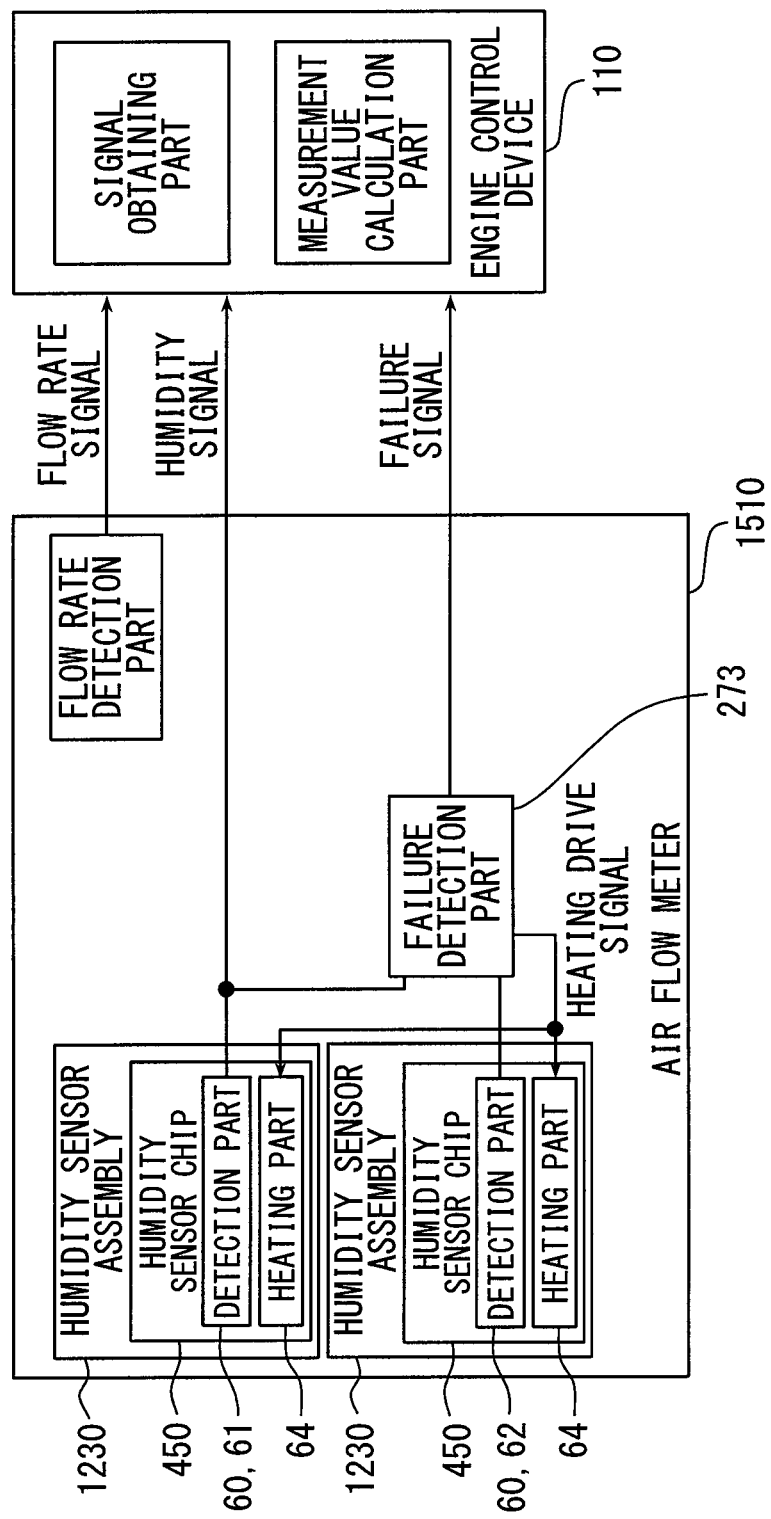
FIG. 45 is a block diagram showing an electrical configuration of the air flow meter according to the fifteenth embodiment.

A fifteenth embodiment of the present disclosure shown in FIGS. 44 and 45 is still another modification of the first embodiment. An air flow meter 1510 according to the fifteenth embodiment includes two humidity sensor assemblies 1230 (refer to FIGS. 40 and 41) substantially the same as those in the twelfth embodiment, and a failure detection part 273 having substantially the same function as that in the fourth embodiment.

Each of the humidity sensor assemblies 1230 is mounted side by side in a housing 11 of the air flow meter 1510 on a side surface of a bypass part 14. Each of the humidity sensor assemblies 1230 is provided with one humidity sensor chip 450. The humidity detection parts 60 provided in the respective humidity sensor chips 450 are aligned as a first humidity detection part 61 and a second humidity detection part 62 along an axial direction of an intake pipe 91 (refer to FIG. 1). The air flow meter 1510 outputs a humidity signal based on a measurement result of one of the humidity detection parts 60 to an engine control device 110.

The failure detection part 273 is embedded in the housing 11. The failure detection part 273 is directly or indirectly electrically connected to each of the humidity detection part 60 and a heating part 64 provided in each humidity sensor chip 450. The failure detection part 273 outputs a failure signal to the engine control device 110 based on a difference between the humidity signals of two systems obtained from the respective humidity detection parts 60. In addition, the failure detection part 273 performs an operation of evaporating moisture of each humidity detection part 60 by applying a heating drive signal to the heating part 64 provided in each humidity sensor chip 450.

The fifteenth embodiment described so far also exhibits the same effects as those in the first embodiment. In addition, as in the fifteenth embodiment, even if multiple (two) humidity sensor assemblies 1230 are provided in one air flow meter 1510, a multi-system that utilizes a configuration that can be used for a non-multiplexed system can be configured. In the fifteenth embodiment, the air flow meter 1510 corresponds to a physical quantity measuring device.

Sixteenth and Seventeenth Embodiments

Figure 46:
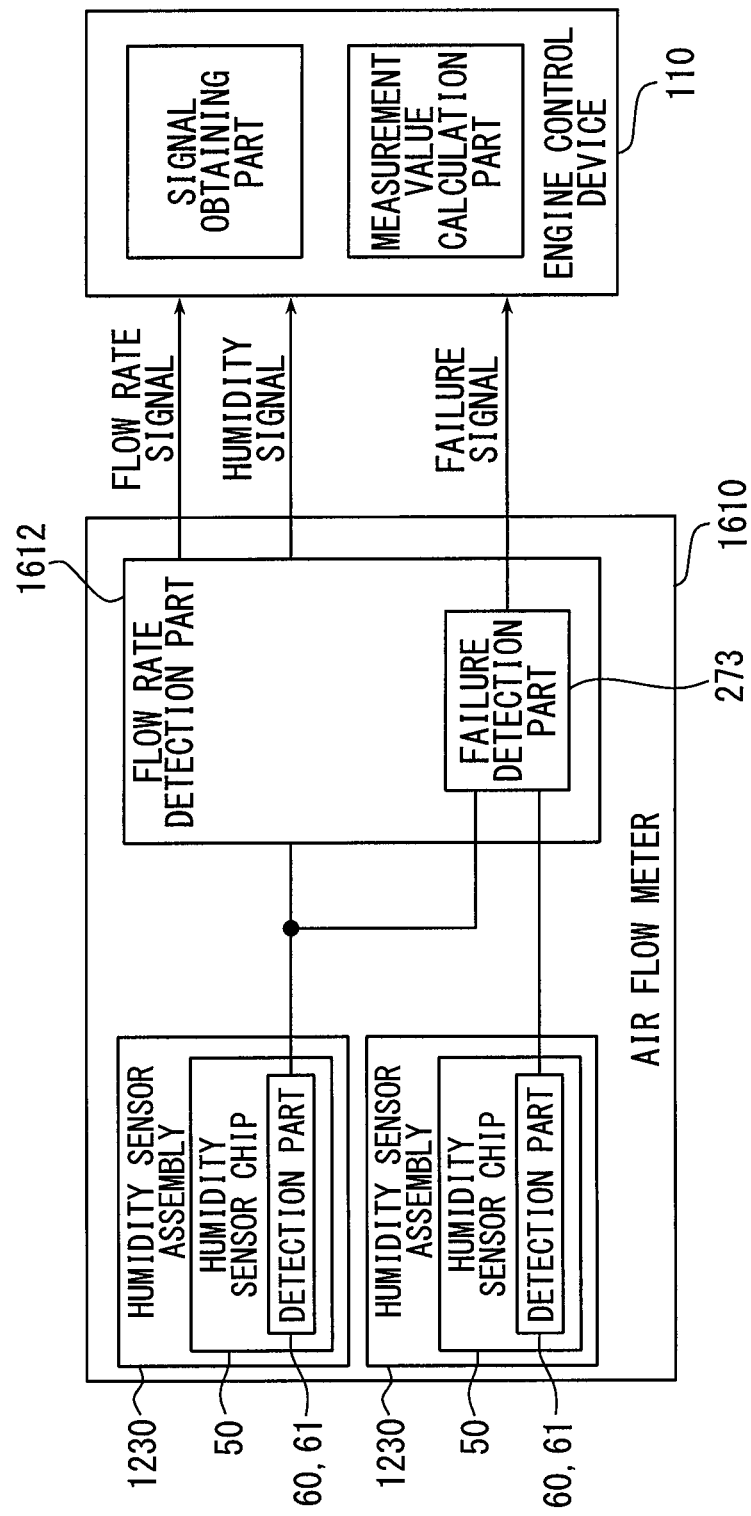
FIG. 46 is a block diagram showing an electrical configuration of an air flow meter according to a sixteenth embodiment.

A sixteenth embodiment of the present disclosure shown in FIG. 46 is another modification of the fourth embodiment. An air flow meter 1610 according to the sixteenth embodiment includes two humidity sensor assemblies 1230 and a flow rate detection part 1612. Each of the humidity sensor assemblies 1230 is provided with one humidity sensor chip 50. The flow rate detection part 1612 is provided with a circuit part corresponding to a failure detection part 273. In addition to a flow rate signal and a humidity signal, the flow rate detection part 1612 can output a failure signal based on an output difference between the humidity detection parts 60 (61, 62) to an engine control device 110.

Figure 47:
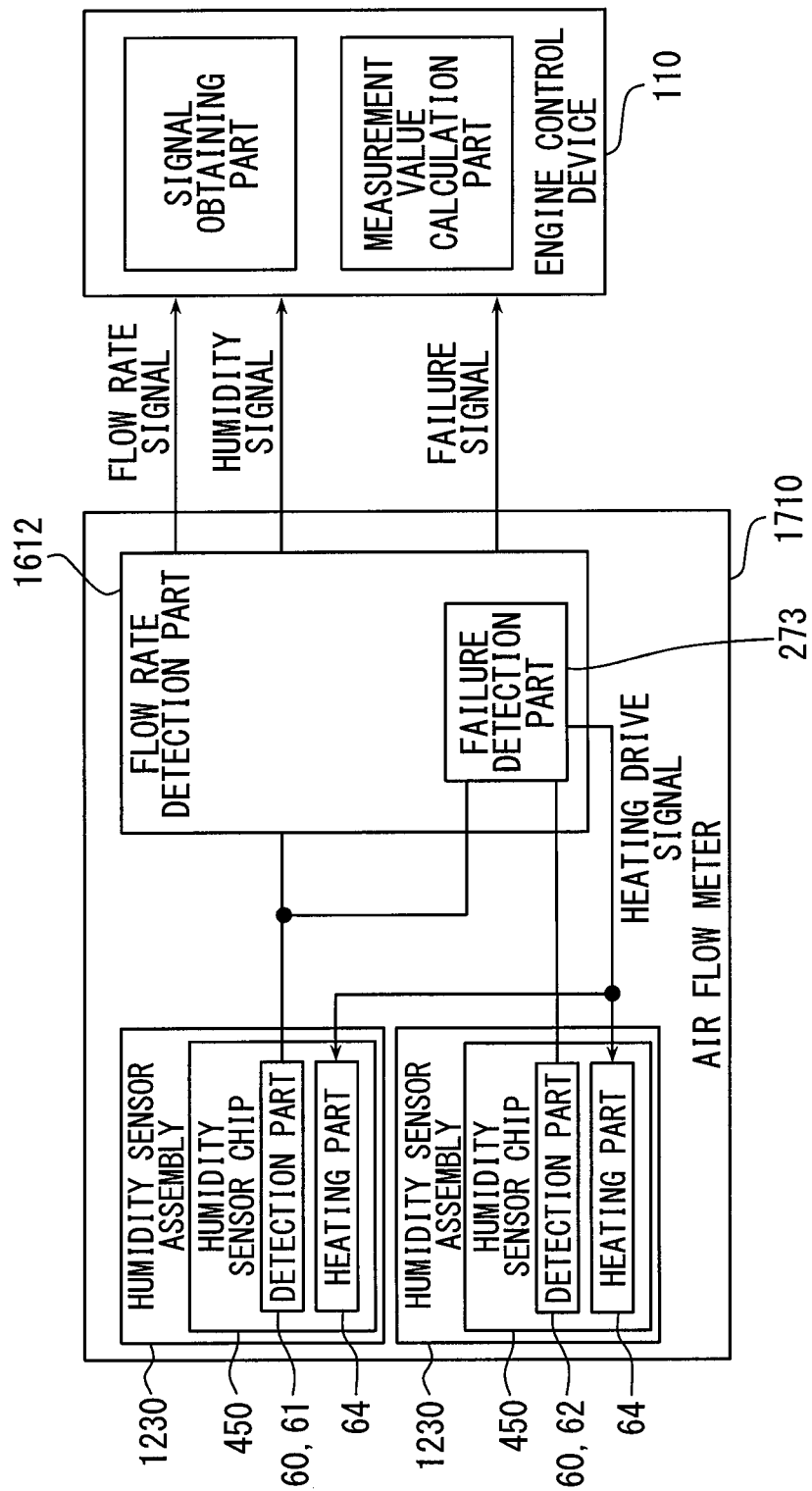
FIG. 47 is a block diagram showing an electrical configuration of an air flow meter according to a seventeenth embodiment.

A seventeenth embodiment of the present disclosure shown in FIG. 47 is a modification of the sixteenth embodiment. An air flow meter 1710 according to the sixteenth embodiment includes a flow rate detection part 1612 substantially the same as that in the sixteenth embodiment, and two humidity sensor assemblies 1230 each having a humidity sensor chip 450. A failure detection part 273 provided in the flow rate detection part 1612 can perform an operation of evaporating a moisture of each of the humidity detection parts 60 (61, 62) by applying a heating drive signal to a heating part 64 provided in each of the humidity sensor chips 450.

As in the sixteenth and seventeenth embodiments described above, the configuration in which the failure detection part 273 is a part of the flow rate detection part 1612 also exhibits the same effects as those in the fourth embodiment. In the sixteenth and seventeenth embodiments, each of the air flow meters 1610 and 1710 corresponds to a physical quantity measuring device.

Eighteenth Embodiment

Figure 48:
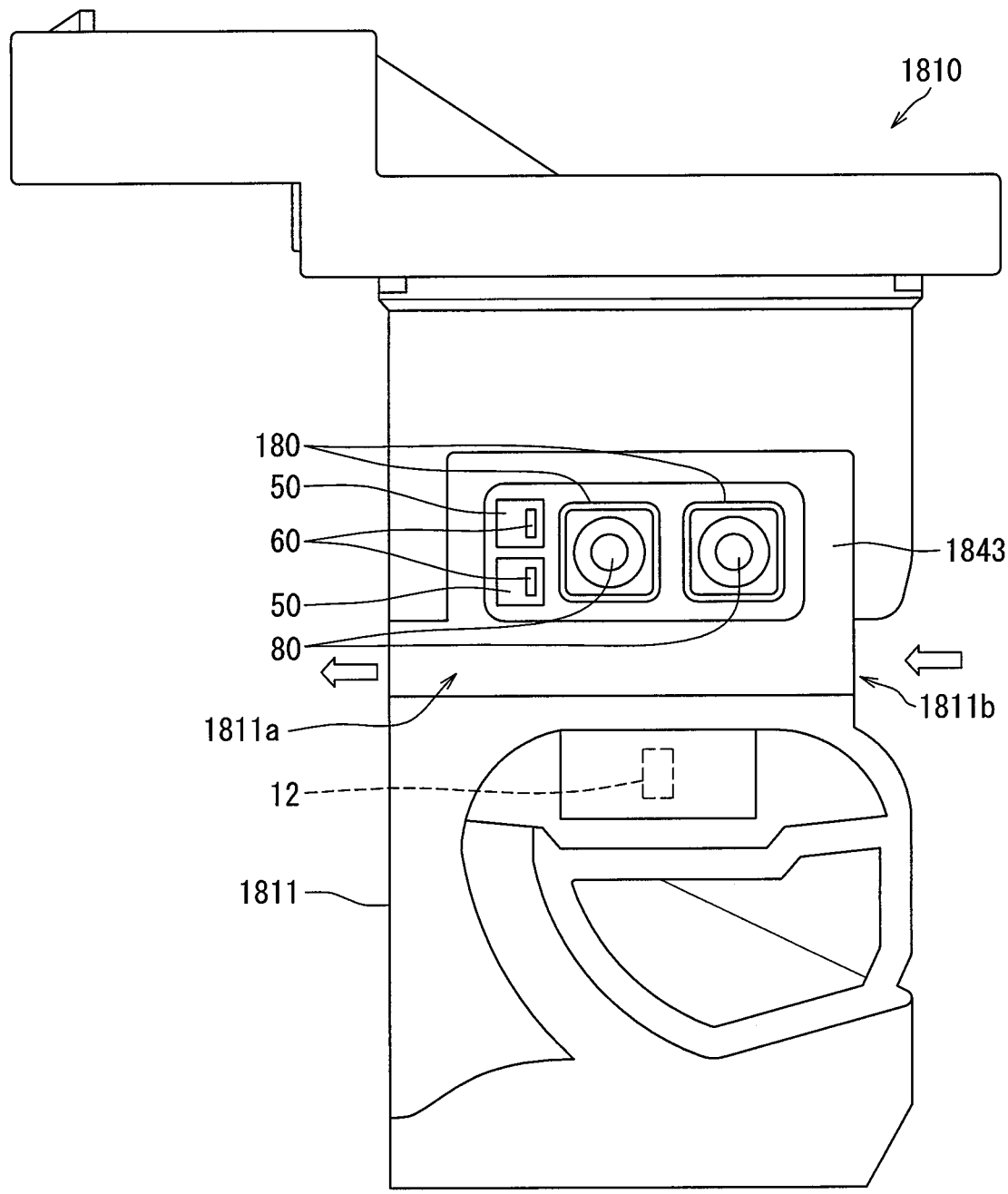
FIG. 48 is a vertical cross-sectional view showing a mechanical configuration of an air flow meter according to an eighteenth embodiment.

An eighteenth embodiment of the present disclosure shown in FIG. 48 is another modification of the first embodiment. An air flow meter 1810 according to the eighteenth embodiment is provided with two pressure detection parts 80 in addition to a flow rate detection part 12 and two humidity detection parts 60. The pressure detection parts 80 are provided in respective pressure sensor chips 180. Each of the pressure detection parts 80 outputs a measurement signal corresponding to a pressure of an intake air as a physical quantity different from the humidity as a pressure signal. The air flow meter 1810 outputs a flow rate signal, humidity signals of two systems, and pressure signals of the two systems to an engine control device 110 (refer to FIG. 1).

The air flow meter 1810 includes a sensor circuit board 1843 provided with the flow rate detection part 12, the humidity detection parts 60, and the pressure detection parts 80. The sensor circuit board 1843 is molded in a housing 1811. Two humidity sensor chips 50 each having one humidity detection part 60 and two pressure sensor chips 180 each having one pressure detection part 80 are mounted on the sensor circuit board 1843.

Each of the humidity sensor chips 50 and each of the pressure sensor chips 180 are located on a mounting surface opposite to a surface on which the flow rate detection part 12 is provided, on both sides of the sensor circuit board 1843. Each of the humidity sensor chips 50 and each of the pressure sensor chips 180 are accommodated in a sensor accommodation chamber 1811*a* provided in the housing 1811. An intake air flows into the sensor accommodation chamber 1811*a* from a passage opening 1811*b*. The two humidity sensor chips 50 are located on the downstream side of the two pressure sensor chips 180.

Even if the humidity sensor chips 50 are accommodated in the housing 1811 as in the eighteenth embodiment described above, the same effects as those in the first embodiment can be obtained, and the failure detection of the humidity detection parts 60 can be performed. In addition, as in the eighteenth embodiment, if the humidity sensor chip 50 and the pressure sensor chip 180 are provided on the same sensor circuit board 1843, even if the air flow meter 1810 is capable of measuring multiple physical quantities, the enlargement of a body size can be reduced.

In the eighteenth embodiment, the pressure detection parts 80 correspond to a physical quantity detection part, and the pressure sensor chips 180 correspond to a measurement chip. The air flow meter 1810 corresponds to a humidity sensor assembly, and the measuring device including the air flow meter 1810 and the engine control device 110 (refer to FIG. 1) corresponds to a physical quantity measuring device.

Nineteenth Embodiment

Figure 49:
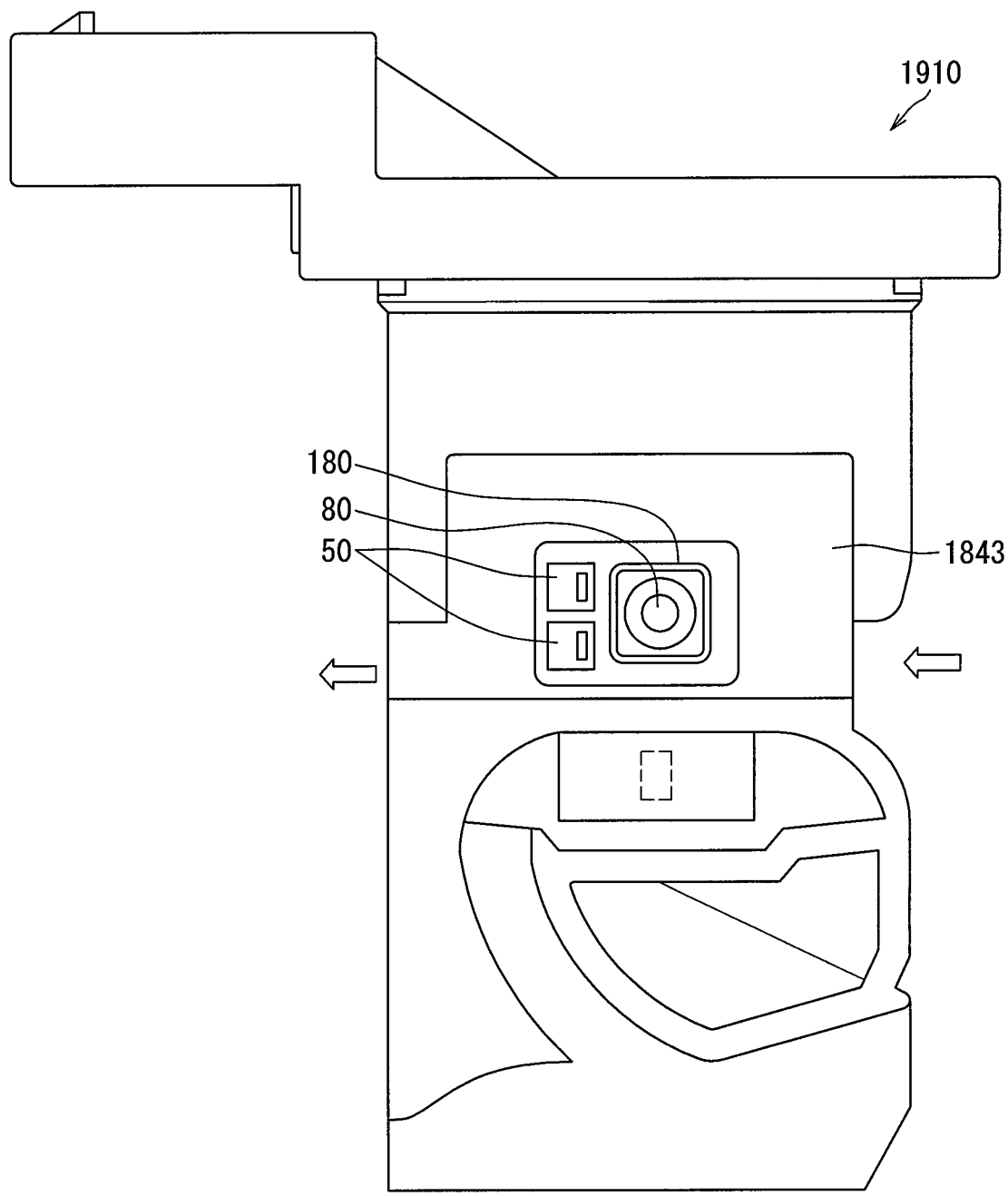
FIG. 49 is a vertical cross-sectional view showing a mechanical configuration of an air flow meter according to a nineteenth embodiment.

A nineteenth embodiment of the present disclosure shown in FIG. 49 is a modification of the eighteenth embodiment. In an air flow meter 1910 according to the nineteenth embodiment, only one pressure sensor chip 180 is mounted on a sensor circuit board 1843. Two humidity sensor chips 50 are located on a downstream side of the pressure sensor chip 180 along an outer edge of the pressure sensor chip 180. The air flow meter 1910 outputs a flow rate signal, humidity signals of two systems, and a pressure signal of only one system to an engine control device 110 (refer to FIG. 1). Also in the nineteenth embodiment described above, a failure of a humidity detection part 60 can be detected in the same manner as that in the eighteenth embodiment. In the nineteenth embodiment, the air flow meter 1910 corresponds to a humidity sensor assembly.

Twentieth Embodiment

Figure 50:
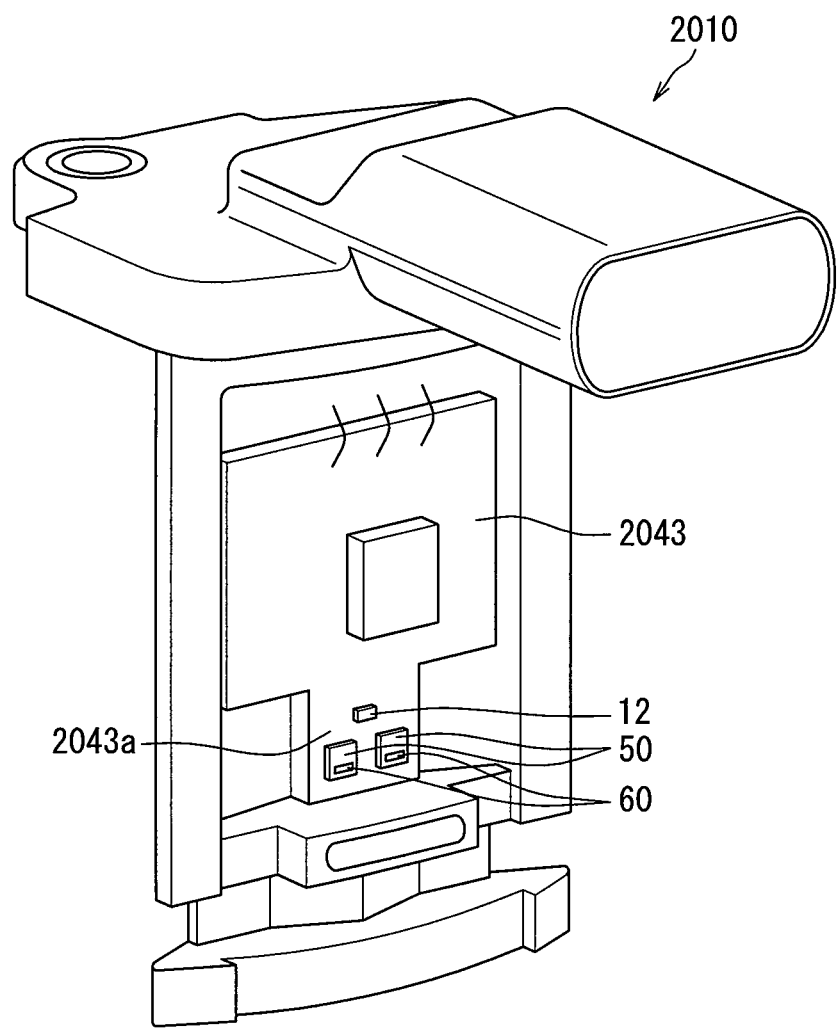
FIG. 50 is a vertical cross-sectional view showing a mechanical configuration of an air flow meter according to a twentieth embodiment.
Figure 51:
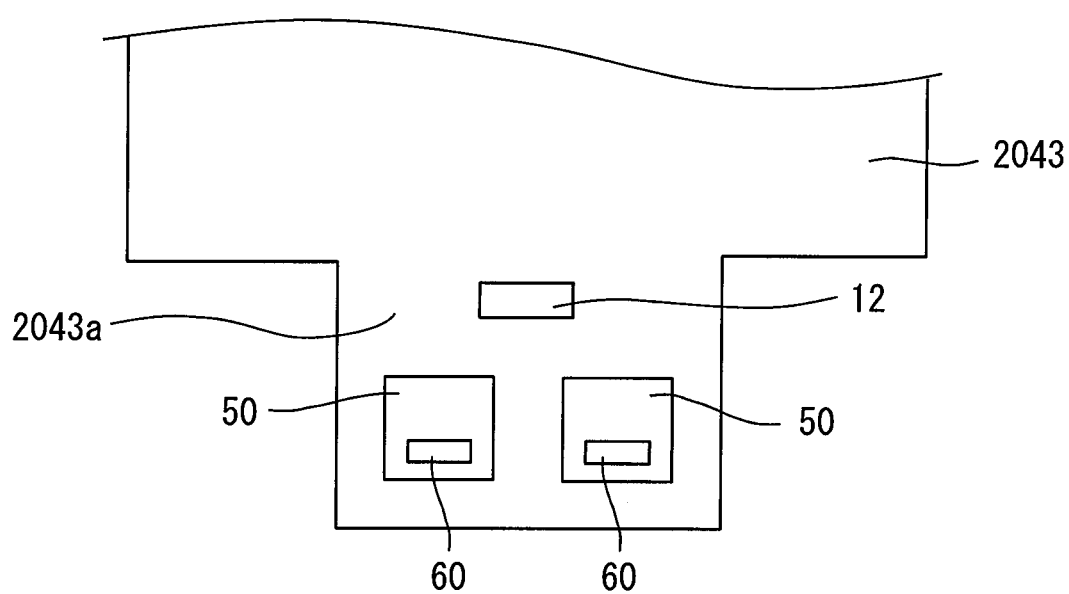
FIG. 51 is a diagram showing a placement of the humidity sensor chip.

A twentieth embodiment of the present disclosure shown in FIGS. 50 and 51 is another modification of the eighteenth embodiment. In an air flow meter 2010 of the twentieth embodiment, a flow rate detection part 12 and two humidity sensor chips 50 are provided in a sensor mounting region 2043*a* provided at an end of a sensor circuit board 2043. As described above, the flow rate detection part 12 and the two humidity detection parts 60 come into contact with an intake air at substantially the same place. Also in the twentieth embodiment described above, a failure of the humidity detection parts 60 can be detected in the same manner as in the eighteenth embodiment. In the twentieth embodiment, the air flow meter 2010 corresponds to a humidity sensor assembly.

Twenty-First Embodiment

Figure 52:
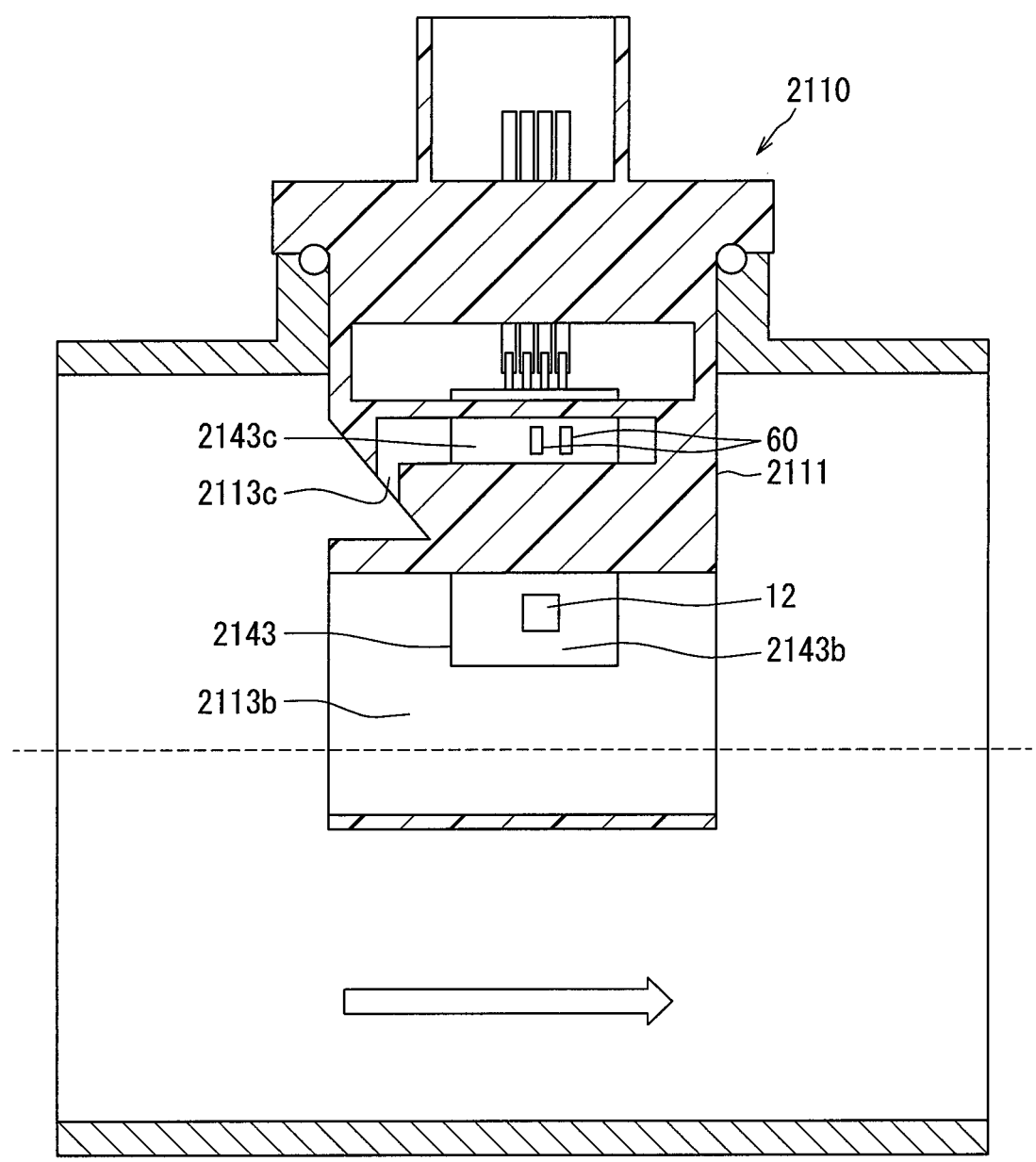
FIG. 52 is a vertical cross-sectional view showing a mechanical configuration of an air flow meter according to a twenty-first embodiment.

A twenty-first embodiment of the present disclosure shown in FIG. 52 is another modification of the eighteenth embodiment. A main bypass passage 2113*b* and a sub-bypass passage 2113*c* are provided in a housing 2111 of an air flow meter 2110 according to the twenty-first embodiment. A sensor circuit board 2143 is provided with a first mounting region 2143*b* exposed to the main bypass passage 2113*b* and a second mounting region 2143*c* exposed to the sub-bypass passage 2113*c*. A flow rate detection part 12 is provided in the first mounting region 2143*b*. In the second mounting region 2143*c*, two humidity detection parts 60 are aligned along an extension direction of the sub-bypass passage 2113*c*. Also in the twenty-first embodiment described above, a failure of the humidity detection part 60 can be detected in the same manner as that in the eighteenth embodiment. In the twenty-first embodiment, the air flow meter 2110 corresponds to a humidity sensor assembly.

Other Embodiments

Although a plurality of embodiments according to the present disclosure have been described above, the present disclosure is not construed as being limited to the embodiments described above, and can be applied to various embodiments and combinations within a scope not departing from the spirit of the present disclosure.

Figure 53:
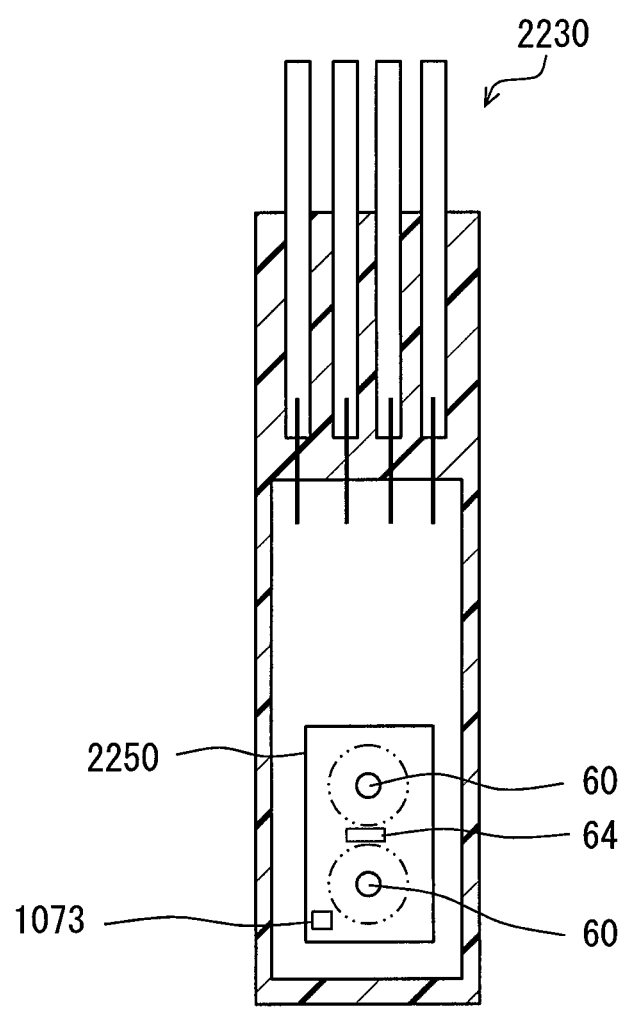
FIG. 53 is a front view showing a configuration of a humidity sensor assembly according to Modification 1.
Figure 54:
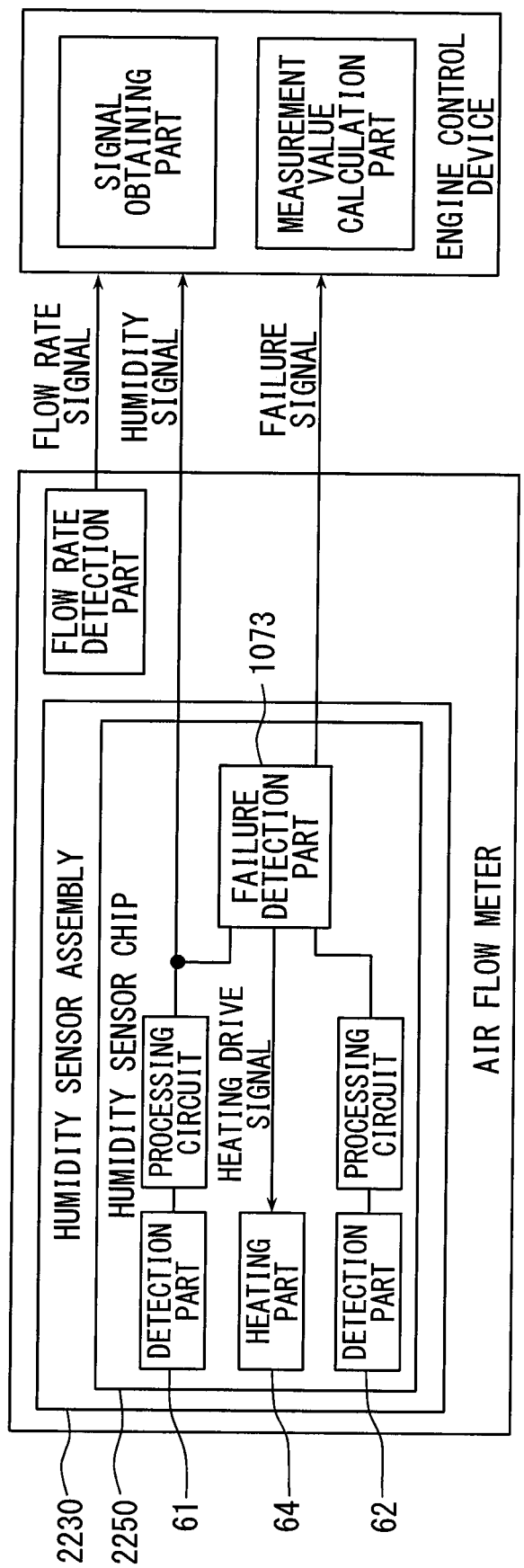
FIG. 54 is a block diagram showing an electrical configuration of the humidity sensor assembly according to Modification 1.

In a humidity sensor assembly 2230 of Modification 1 of the tenth embodiment, in a humidity sensor chip 2250 shown in FIGS. 53 and 54, a heating part 64 is provided in the middle between two humidity detection parts 60. The heating part 64 heats the two humidity detection parts 60 together under the control of the failure detection part 1073. As described above, the heating part 64 for heating each humidity detection part 60 may not be provided for each humidity detection part 60.

Figure 55:
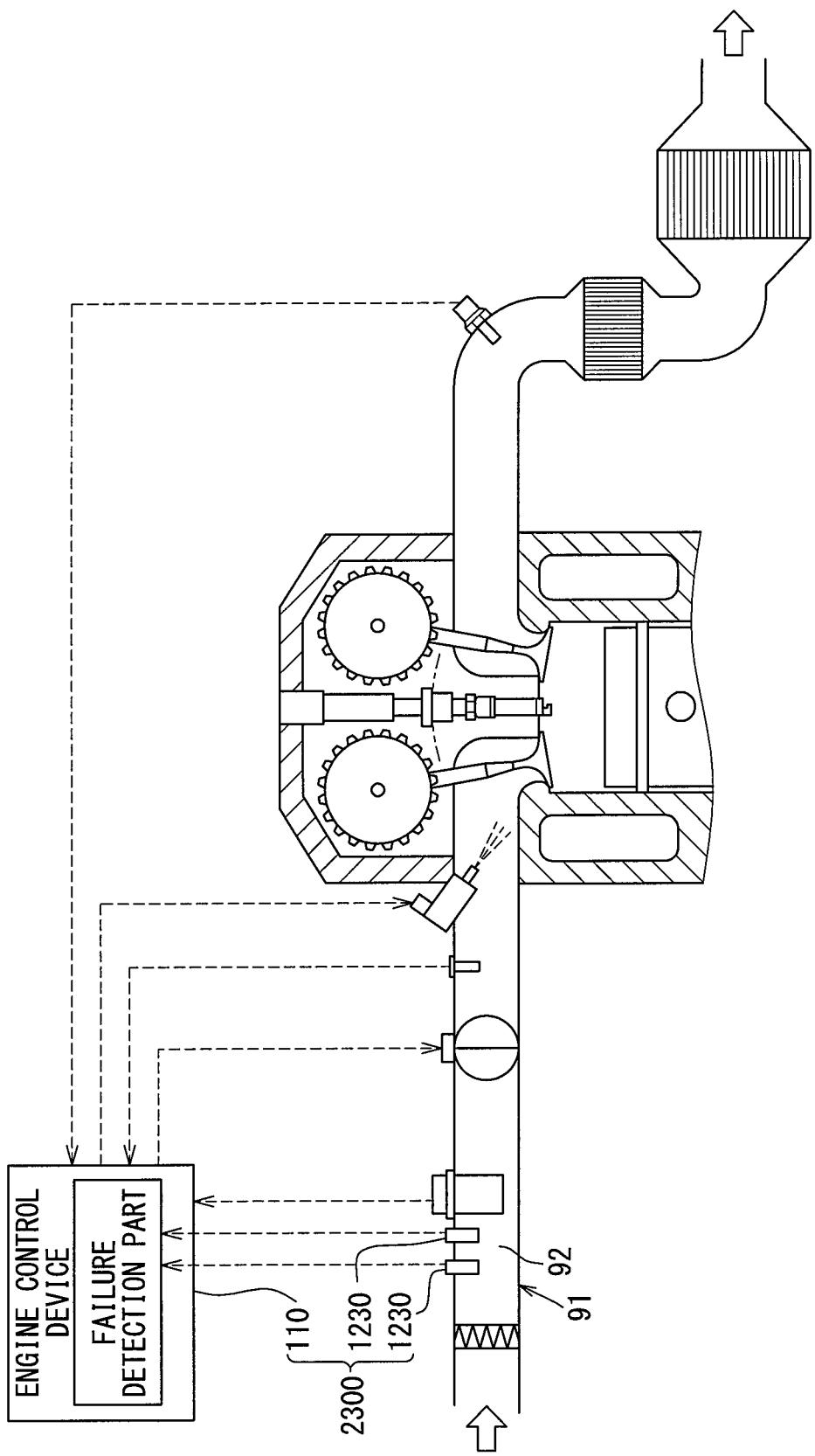
FIG. 55 is a diagram showing an overall image of a system including a measuring device according to Modification 2 and an internal-combustion engine to which the measuring device is applied.

In Modification 2 of the fourteenth embodiment, as shown in FIG. 55, a measuring device 2300 includes at least an engine control device 110 and two humidity sensor assemblies 1230 (refer to FIGS. 40 and 41). The two humidity sensor assemblies 1230 are spaced apart from each other along a flow direction of an intake flow channel 92. As described above, the multi-system measuring device 2300 can also be formed by a configuration in which multiple single humidity sensor assemblies 1230 are provided in an intake pipe 91.

Figure 56:
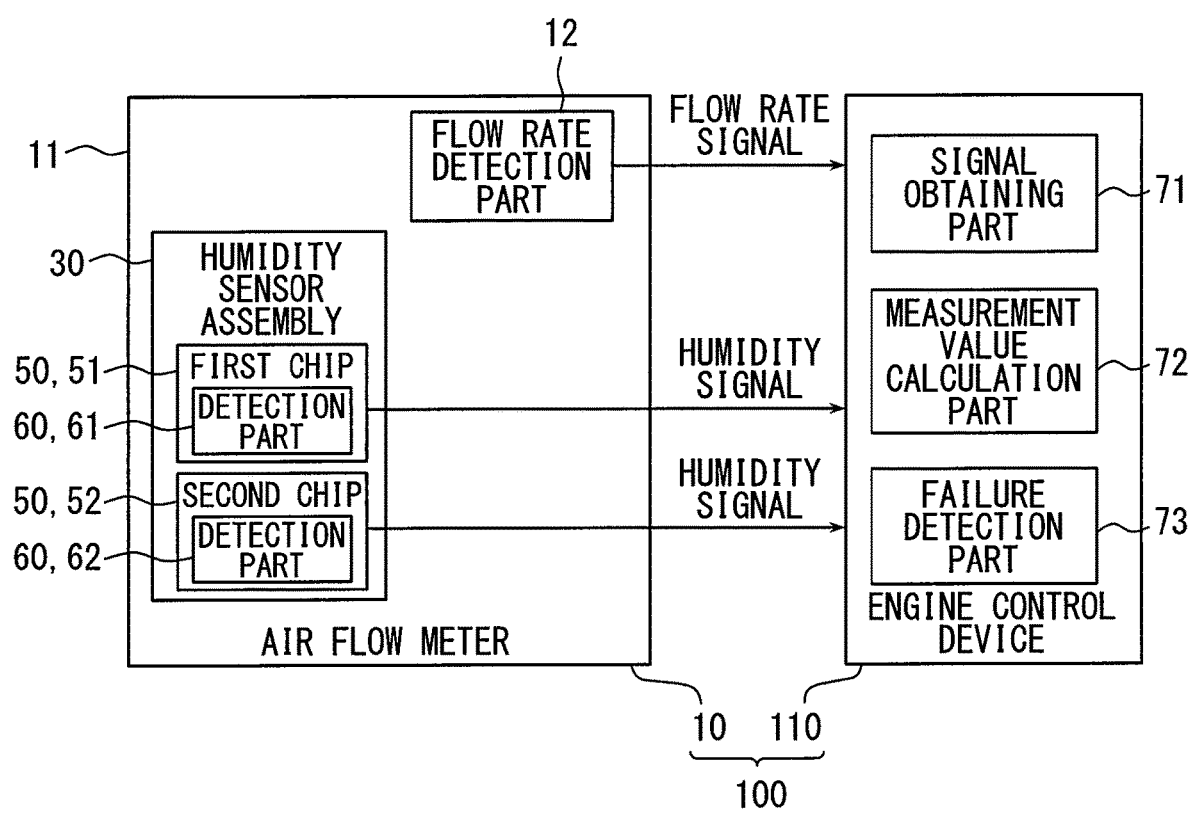
FIG. 56 is a block diagram showing an electrical configuration of a measuring device according to Modification 3.

As shown in FIG. 56, an air flow meter 2410 in Modification 3 of the first embodiment is provided with a flow rate detection part 12 and a temperature sensor assembly 2430. The temperature sensor assembly 2430 transmits humidity signals and temperature signals of two systems to an engine control device 110 by an I2C communication method. The temperature sensor assembly 2430 is provided with multiple (two) sensor chips 2450 as a first sensor chip 2451 and a second sensor chip 2452.

Each of the sensor chips 2450 is provided with a temperature detection part 194 for detecting a temperature of an air, separately from a humidity detection part 60. The humidity detection part 60 of a first sensor chip 2451 serves as a first humidity detection part 61, and the humidity detection part 60 of a second sensor chip 2452 serves as a second humidity detection part 62.

In the engine control device 110, a signal obtaining part 71 obtains a humidity signal and a temperature signal output from each of the sensor chips 2450. A measurement value calculation part 72 calculates a temperature and a humidity of an intake air by appropriately using each humidity signal and each temperature signal. The failure detection part 73 can detect the failure of the temperature detection part 194 by applying a failure detection means (failure detection method) of the present disclosure to the temperature signal, in addition to a failure detection of the humidity detection part 60 based on the humidity signal described above. Further, the failure detection means of the present disclosure can be applied to various signals other than the humidity signal and the temperature signal as described above, for example, a pressure signal or the like.

In Modification 3, the sensor chip 2450 corresponds to a humidity sensor chip, the temperature sensor assembly 2430 corresponds to a humidity sensor assembly, and the measuring device 2400 including the air flow meter 2410 and the engine control device 110 corresponds to a physical quantity measuring device.

The configuration corresponding to the failure detection part of the above embodiment may be realized by software and hardware different from those described above, or a combination of the software and the hardware. In addition, the function of the failure detection part or the like may be realized by the calculation processing circuits provided in the engine control device, the air flow meter, the humidity sensor assembly, or the like in cooperation with each other.

The invention claimed is:

1. A physical quantity measuring device configured to measure a physical quantity of a fluid, comprising:
at least two humidity detection parts configured to output humidity signals each corresponding to a humidity of the fluid;
an abnormality determination part configured to determine that an abnormality has occurred in two of the humidity detection parts in response to that a difference between the humidity signals obtained from the two humidity detection parts exceeds an abnormality determination threshold; and
a heating part configured to heat the two humidity detection parts together on determination of the abnormality determination part that the abnormality has occurred in the humidity detection parts, wherein
the abnormality determination part is configured to, after heating by the heating part is performed, perform a re-determination of the abnormality based on the difference between the humidity signals obtained from the two humidity detection parts.

2. The physical quantity measuring device according to claim 1, wherein
the two humidity detection parts are provided in one humidity sensor assembly, and
the abnormality determination part is configured to determine the abnormality of the humidity detection parts based on a comparison of the humidity signals output from the respective humidity detection parts in the humidity sensor assembly.

3. The physical quantity measuring device according to claim 2, wherein
the humidity sensor assembly includes at least two humidity sensor sub-assemblies and
each of the humidity sensor sub-assemblies includes one humidity sensor chip having one of the humidity detection parts.

4. The physical quantity measuring device according to claim 3, further comprising:
a flow rate detection part configured to output a flow rate signal according to a flow rate of an intake air to be supplied to a combustion chamber of an internal-combustion engine; and
a housing that accommodates the flow rate detection part and is located in a flow channel of the intake air, wherein
the two humidity sensor chips are both accommodated in the housing.

5. The physical quantity measuring device according to claim 3, wherein
the abnormality determination part is provided in the humidity sensor chip.

6. The physical quantity measuring device according to claim 2, wherein
the humidity sensor assembly includes one sensor circuit board provided with two humidity sensor chips each having the one humidity detection part.

7. The physical quantity measuring device according to claim 6, further comprising:
a measurement chip having a physical quantity detection part configured to output a measurement signal corresponding to a physical quantity different from the humidity of the fluid, wherein
the two the humidity sensor chips are mounted on the sensor circuit board together with the measurement chip.

8. The physical quantity measuring device according to claim 2, wherein the humidity sensor assembly includes a humidity sensor chip having at least two of the humidity detection parts, and a sensor circuit board on which the humidity sensor chip is mounted.

9. The physical quantity measuring device according to claim 2, wherein
the abnormality determination part is accommodated in the humidity sensor assembly.

10. The physical quantity measuring device according to claim 2, further comprising:
a calculation processing circuit configured to receive the humidity signal output from the humidity sensor assembly, wherein
the calculation processing circuit has the abnormality determination part.

11. The physical quantity measuring device according to claim 1, further comprising:
a plurality of humidity sensor assemblies each having one of the humidity detection parts, wherein
the abnormality determination part is configured to determine the abnormality of the humidity detection parts based on a comparison of the humidity signals output from the respective humidity detection parts of each of the humidity sensor assemblies.

12. The physical quantity measuring device according to claim 11, further comprising:
a flow rate detection part configured to output a flow rate signal corresponding to a flow rate of an intake air to be supplied to a combustion chamber of an internal-combustion engine; and
a housing that accommodates the flow rate detection part and is located in a flow channel of the intake air, wherein
the plurality of humidity sensor assemblies are held in the flow channel in parallel with the housing.

13. The physical quantity measuring device according to claim 11, wherein
a flow channel of an intake air to be supplied to a combustion chamber of an internal-combustion engine is branched into a first flow channel part and a second flow channel part, and
the plurality of humidity sensor assemblies include a first humidity sensor assembly located in the first flow channel part and a second humidity sensor assembly located in the second flow channel part.

14. The physical quantity measuring device according to claim 11, further comprising:
a flow rate detection part configured to output a flow rate signal corresponding to a flow rate of an intake air supplied to a combustion chamber of an internal-combustion engine; and
a housing that accommodates the flow rate detection part and is located in a flow channel of the intake air, wherein
a plurality of the humidity sensor assemblies include a first humidity sensor assembly located in the flow channel while being held by the housing, and a second humidity sensor assembly located in the flow channel at a position away from the housing.

15. The physical quantity measuring device according to claim 1, wherein
the two humidity detection parts are oriented in the same direction.

16. The physical quantity measuring device according to claim 1, wherein
the two humidity detection parts are oriented in different directions from each other.

17. The physical quantity measuring device according to claim 1, wherein
the abnormality determination part, after heating by the heating part is performed, is configured to determine that the abnormality has occurred in the humidity detection parts in response to that the difference between the humidity signals exceeds the abnormality determination threshold and that a state in which the difference between the humidity signals exceeds the abnormality determination threshold continues for an abnormality determination time or longer.

18. The physical quantity measuring device according to claim 1, wherein
the two humidity detection parts are provided in one humidity sensor assembly, and
each of the two humidity detection parts is provided with the heating part.

19. The physical quantity measuring device according to claim 1, wherein
the abnormality determination part is configured not to determine that the abnormality has occurred in the humidity detection parts unless the state in which the difference between the humidity signals exceeds the abnormality determination threshold continues for the abnormality determination time or longer.

20. The physical quantity measuring device according to claim 1, further comprising:
a determination part configured to:
determine whether the difference between the humidity signals exceeds the abnormality determination threshold and
determine whether a state in which the difference between the humidity signals exceeds the abnormality determination threshold continues for an abnormality determination time or longer, wherein
the abnormality determination part is configured to determine:
that the abnormality has occurred in the humidity detection parts in response to determination of the determination part,
that the difference between the humidity signals exceeds the abnormality determination threshold, and
that the state in which the difference between the humidity signals exceeds the abnormality determination threshold continues for the abnormality determination time or longer.

21. An abnormality detection device for detecting an abnormality of a measuring component, the measuring component configured to measure a physical quantity of a fluid, the abnormality detection device comprising:
a signal obtaining part configured to obtain humidity signals each corresponding to a humidity of the fluid from at least two humidity detection parts included in the measuring component;
an abnormality determination part configured to determine that an abnormality has occurred in the humidity detection parts in response to that a difference between the humidity signals obtained from two of the humidity detection parts exceeds an abnormality determination threshold; and a heating part configured to heat the two humidity detection parts together on determination of the abnormality determination part that the abnormality has occurred in the humidity detection parts, wherein
the abnormality determination part is configured to, after heating by the heating part is performed, perform a re-determination of the abnormality based on the difference between the humidity signals obtained from the two humidity detection parts.

22. The physical quantity measuring device according to claim 21, further comprising:
a determination part configured to:
determine whether the difference between the humidity signals exceeds the abnormality determination threshold, and
determine whether a state in which the difference between the humidity signals exceeds the abnormality determination threshold continues for an abnormality determination time or longer, wherein
the abnormality determination part is configured to determine:
that the abnormality has occurred in the humidity detection parts in response to determination of the determination part,
that the difference between the humidity signals exceeds the abnormality determination threshold, and
that the state in which the difference between the humidity signals exceeds the abnormality determination threshold continues for the abnormality determination time or longer.

23. An abnormality detection method for detecting an abnormality in a measuring component, the measuring component configured to obtain a physical quantity of a fluid, the method comprising:
obtaining humidity signals each corresponding to a humidity of the fluid from at least two humidity detection parts included in the measuring component;
determining that an abnormality has occurred in the humidity detection parts in response to that a difference between the humidity signals obtained from of the two humidity detection parts exceeds an abnormality determination threshold
heating the two humidity detection parts together on determination that the abnormality has occurred in the humidity detection parts; and
performing, after the heating is performed, a re-determination of the abnormality based on the difference between the humidity signals obtained from the two humidity detection parts.

24. The abnormality detection method according to claim 23, further comprising:
determining whether the difference between the humidity signals exceeds the abnormality determination threshold and whether a state in which the difference between the humidity signals exceeds the abnormality determination threshold continues for an abnormality determination time or longer; and
determining that the abnormality has occurred in the humidity detection parts in response to determination that the difference between the humidity signals exceeds the abnormality determination threshold and that the state in which the difference between the humidity signals exceeds the abnormality determination threshold continues for the abnormality determination time or longer.

* * * * *